US011263335B2

(12) United States Patent
Parthasarathy

(10) Patent No.: US 11,263,335 B2
(45) Date of Patent: Mar. 1, 2022

(54) INTEGRATED SYSTEM AND METHOD FOR SENSITIVE DATA SECURITY

(71) Applicant: MENTIS INC, New York, NY (US)

(72) Inventor: Rajesh Krishnaswami Parthasarathy, New York, NY (US)

(73) Assignee: MENTIS INC, New York, NY (US)

( * ) Notice: Subject to any disclaimer, the term of this patent is extended or adjusted under 35 U.S.C. 154(b) by 168 days.

(21) Appl. No.: 16/656,341

(22) Filed: Oct. 17, 2019

(65) Prior Publication Data
US 2020/0311304 A1  Oct. 1, 2020

Related U.S. Application Data

(60) Provisional application No. 62/719,604, filed on Aug. 17, 2018.

(51) Int. Cl.
| | |
|---|---|
| G06F 21/62 | (2013.01) |
| G06F 16/2457 | (2019.01) |
| G06F 11/30 | (2006.01) |
| G06F 21/60 | (2013.01) |
| H04L 29/06 | (2006.01) |

(52) U.S. Cl.
CPC ...... *G06F 21/6218* (2013.01); *G06F 11/3006* (2013.01); *G06F 16/24578* (2019.01); *G06F 21/602* (2013.01); *G06F 21/6254* (2013.01); *H04L 63/083* (2013.01)

(58) Field of Classification Search
CPC .......... G06F 21/6218; G06F 16/24578; G06F 11/3006; G06F 21/602; G06F 21/6254; H04L 63/083
See application file for complete search history.

(56) References Cited

U.S. PATENT DOCUMENTS

| | | | |
|---|---|---|---|
| 9,043,894 B1* | 5/2015 | Dennison | H04L 63/1408 726/11 |
| 2011/0261049 A1* | 10/2011 | Cardno | G06Q 10/10 345/419 |
| 2012/0259877 A1* | 10/2012 | Raghunathan | G06F 21/6254 707/757 |

(Continued)

*Primary Examiner* — Joseph P Hirl
*Assistant Examiner* — Stephen T Gundry
(74) *Attorney, Agent, or Firm* — Barry Choobin; Patent 360LLC

(57) ABSTRACT

A system and a method are provided for integrating a sensitive data discovery engine (SDDE), a data anonymization engine (DAE), a data monitoring module (DMM), and a data retirement module (DRM) and managing sensitive data security across its lifecycle. The SDDE determines sensitive data in similar and variant data sources and applications, identifies their operating application codes, and generates sensitive data discovery intelligence (SDDI). The system generates and distributes one or more templates including the SDDI with metadata, discovery results, and data security rules to the DAE, the DMM, and the DRM deployed on each data source. Based on the templates, the DAE flexibly and consistently masks, encrypts, or tokenizes the sensitive data for static, dynamic, blended, and hybrid anonymization based on different data classifications and application environments; the DMM continuously monitors sensitive data access by users and applications; and the DRM retires inactive sensitive data without removing transactional data.

19 Claims, 31 Drawing Sheets

(56) References Cited

U.S. PATENT DOCUMENTS

| | | | |
|---|---|---|---|
| 2013/0318347 A1* | 11/2013 | Moffat | H04L 63/06 713/168 |
| 2015/0324606 A1* | 11/2015 | Grondin | G06F 3/0482 726/1 |
| 2016/0078245 A1* | 3/2016 | Amarendran | H04L 63/0428 713/193 |
| 2017/0207916 A1* | 7/2017 | Luce | G06Q 30/0201 |
| 2017/0243028 A1* | 8/2017 | LaFever | G06F 21/6263 |
| 2017/0251013 A1* | 8/2017 | Kirti | H04L 63/1408 |
| 2017/0272472 A1* | 9/2017 | Adhar | G06F 21/316 |
| 2018/0027006 A1* | 1/2018 | Zimmermann | H04L 63/0245 726/11 |
| 2018/0218446 A1* | 8/2018 | Ries | G06Q 40/02 |
| 2018/0247078 A1* | 8/2018 | Newman | G06F 16/93 |
| 2018/0307859 A1* | 10/2018 | LaFever | G16H 10/60 |
| 2019/0034976 A1* | 1/2019 | Hamedi | G06Q 30/0204 |
| 2019/0205773 A1* | 7/2019 | Ackerman | G06Q 10/00 |
| 2019/0228186 A1* | 7/2019 | Atreya | G06F 21/10 |
| 2019/0260787 A1* | 8/2019 | Zou | H04L 63/1425 |
| 2019/0332807 A1* | 10/2019 | LaFever | G06F 21/6254 |
| 2019/0372940 A1* | 12/2019 | Mcdougall | G06F 21/10 |
| 2021/0133350 A1* | 5/2021 | Kirti | G06F 21/6245 |
| 2021/0297443 A1* | 9/2021 | Crabtree | H04L 63/1441 |
| 2021/0297447 A1* | 9/2021 | Crabtree | H04L 63/1466 |

* cited by examiner

| ORIGINAL DATA | | | | |
|---|---|---|---|---|
| CRITERIA FOR DISPOSAL: END DATE EARLIER THAN 2011 | | | | |
| PERSON_ID | FIRST_NAME | LAST_NAME | NATIONAL_ID | EFFECTIVE_END_DATE |
| 21 | Carl | Douglas | 342-34-9847 | 27-08-2014 |
| 32 | Jamie | Frost | 901-66-8761 | 14-05-2015 |
| 33 | Kerry | Jones | 654-33-6511 | 12-06-2001 |
| 53 | Amy | Marlin | 253-46-8027 | 17-01-1999 |
| 98 | Howard | Sprague | 675-09-7876 | 10-01-1996 |
| 129 | Ellen | Palm | 149-23-2333 | 28-02-2016 |
| 137 | Art | Vandelay | 876-98-0451 | 14-03-2010 |
| 143 | Raymond | Welch | 144-56-3321 | 30-06-1995 |
| 152 | Henry | Chang | 156-23-2323 | 03-12-2014 |
| 161 | Brad | Goodwin | 123-65-9876 | 06-12-2015 |

FIG. 10A

| RETIRED DATA ||||| 
|---|---|---|---|---|
| PERSON_ID | FIRST_NAME | LAST_NAME | NATIONAL_ID | EFFECTIVE_END_DATE |
| 21 | Carl | Douglas | 342-34-9847 | 27-08-2014 |
| 32 | Jamie | Frost | 901-66-8761 | 14-05-2015 |
| 33 | Kerry | Jones | N00000000000000009532 | 12-06-2001 |
| 53 | Amy | Marlin | N00000000000000000880 | 17-01-1999 |
| 98 | Howard | Sprague | N00000000000000008440 | 10-01-1996 |
| 129 | Ellen | Palm | 149-23-2333 | 28-02-2016 |
| 137 | Art | Vandelay | N00000000000000003687 | 14-03-2010 |
| 143 | Raymond | Welch | N00000000000000001499 | 30-06-1995 |
| 152 | Henry | Chang | 156-23-2323 | 03-12-2014 |
| 161 | Brad | Goodwin | 123-65-9876 | 06-12-2015 |

PATTERNS 1305

| | Rule | Pattern | Validation Function | No of Checks |
|---|---|---|---|---|
| 1 | Include | NNN NN NNNN | Validate Social Security ▶ | 3 |
| 2 | Include | NNN-NN-NNNN | Validate Social Security ▶ | 3 |
| 3 | Include | NNNNNNNNN | Validate Social Security ▶ | 3 |
| 4 | Include | UU NN NN NN U | Validate Social Security ▶ | 3 |
| 5 | Include | UUNNNNNNU | No Validation ▶ | 1 |

FILTERS

Search

| Application | Classification Type | Classification | Owner | Table | Column | Total Score | Data Value |
|---|---|---|---|---|---|---|---|
| ●Healthcare Demo | Private Information | National Identifier | CLIENT_DATA | MEMBER | SSN | 100 | Very High |
| ●Healthcare Demo | Private Information | National Identifier | ROGUE_SCHEMA | EMPLOYEES_EXTRACT | National_Identifier | 80 | Very High |
| ●Healthcare Demo | Private Information | National Identifier | ROGUE_SCHEMA | MEMBER | SSN | 100 | Very High |

Dictionary Match: Column Name Equals (EM)
Score: 60          Occurrence: 1
Pattern: SSN Dictionary Match: Column Name Like (CN)
Score: 40          Occurrence: 1
Pattern: SSN

FIG. 13H

TEMPLATES

- Auto: HIGHDEV_11Aug2019_110546
- Auto: HIGHDEV_11Aug2019_204041
- Auto: HIGHDEV_12Aug2019_013214
- Auto: HIGHDEV_12Aug2019_024612
- DDM_Template: V2
- DDM_Template: V1
- HEALTHCARE_SCRAMBLE_TEMPLATE_DEV_REIDENTIFICATION
- SCRAMBLE_TEMPLATE_V1
- SDM: HEALTHDEV: V1
- SDM_DEMO_TEMPLATE
- SDM_FS_APPS: V1

FILTERS

- Application: Healthcare Demo
- Template: All Templates
- Created by: All Users
- Modified by: All Users
- Frozen? ☐ Enabled? ☐
- SORT: Template Name
- Page Version 8.1.6.B

DETAILS

- Description: SCRAMBLE_TEMPLATE_V1
- Application: Healthcare Demo
- Enabled 1. — Created by ANDREW
- Frozen? 2. — Updated by ANDREW
- Created on 11-Aug-2019
- Last Updated on 11-Aug-2019

Statistics as of: HEALTHDEV (05-Sep-2019 11:10:39) Last used:12-Aug-2019

☐ Table ▨ Column

Values: 40, 23, 19, 20, 3, 3, 0 — CLIENT_DATA, ROGUE_SCHEMA

| 2 | 6 | 42 | 13 | * |
|---|---|---|---|---|
| OWNERS | TABLES | COLUMNS | MAKING METHOD | ROWS |
| | | 0 | | |
| | | CLASSIFICATIONS | | |

COLUMNS FOR OWNER: ROGUE_SCHEMA.MEMBER

1312

| | Column Name | Mask | Method | Additional Information 1 | Additional Information 2 |
|---|---|---|---|---|---|
| *1 | AGREEMENT_NUMBER | ☑ | Non-relational Token | | |
| *2 | BANK_ACCOUNT | ☑ | Relational Token = Info1 | | |
| 3 | BIRTH_DATE | ☑ | Replace with Random D | | |
| 4 | FIRST_NAME | ☑ | Names Masking: TYPE | NM_FIRST_NAME | LOCAL |
| 5 | LAST_NAME | ☑ | Names Masking: TYPE | NM_LAST_NAME | LOCAL |
| *6 | SSN | ☑ | AES based Encryption | | |
| *7 | UNIQUE_MEMBER_ID | ☑ | AES based Encryption | | |

Select All ☐

FILTERS

Column Name

Nullable? ☑   Column Type: VARCHAR2   Column Length: 34

Column Description: BANK_ACCOUNT

FIG. 13M

▼ WELCOME: ADMIN

ISCRAMBLE

Choose a Non-production Instance*  HEALTHPROD (PRODUCTION INSTANCE) ▼

Choose a Template*  ▶

| PARAMETERS | |
|---|---|
| Parameter | |
| Agent based Discovery | DDM TEMPLATE: V2 |
| | DDM_TEMPLATE: V1 |
| | HEALTHCARE_SCRAMBLE_TEMPLATE |
| | _DEV_REIDENTIFICATION |
| | _SCRAMBLE TEMPLATE_V1 |
| | ............ |
| Blob Discovery Y/N | SDM_FS_APPS: V1 |
| Blob File Path | C:\UTL_FILE_DIR\BLOB_EXEC_UP |
| Blob Path | @C:\UTL_FILE_DIR\BLOB_EXEC_ |

▼WELCOME: ADMIN
DYNAMIC DATA MASKING

USER SETS

DUMMY: User Set: HIGHPROD

HIGHPROD: Unauthorized User Set

ACCESS RULES

| Set Type | Set Name | Include(Y) Or Exclude (N) | Masking Type | When to Fire? | | | |
|---|---|---|---|---|---|---|---|
| 1 PROG | DUMMY: Program Set: | ☑ | MASK | HIGHMARK_SCR | 1 ELEMENTS | 11-Aug-19 CREATION DATE | ANDREW CREATED BY |

| | | |
|---|---|---|
| 11-Aug-19 LAST UPDATE DATE | ANDREW LAST UPDATED BY | 11-Aug-19 LAST PUBLISH DATE |

▼ FILTERS

Instances: HEALTHPROD (Production instance) ▶

Set Level: Database ▶

Show only rule sets ☑

Page Version 8.1.6.5

INTEGRATED SYSTEM AND METHOD FOR SENSITIVE DATA SECURITY

CROSS-REFERENCE TO RELATED APPLICATIONS

This application claims the priority of the US Provisional Patent Application (PPA) with Ser. No. 62/719,604, filed on Aug. 17, 2018, with the title "AN INTEGRATED SYSTEM AND METHOD FOR SENSITIVE DATA SECURITY", and the US Non-provisional Patent Application (NPA) with Ser. No. 16/541,589, filed on Aug. 15, 2019, with the title "SYSTEM AND METHOD FOR DATA CLASSIFICATION CENTRIC SENSITIVE DATA DISCOVERY". The contents of the Provisional Patent Application and Non-provisional Patent Application are incorporated in their entirety by reference herein.

BACKGROUND

Technical Field

The embodiments herein are generally related to data security. The embodiments herein are particularly related to a system and a method for securing sensitive data. The embodiments herein are more particularly related to an integrated system and a method for integrating and managing security of sensitive data across a lifecycle of the sensitive data by discovering, anonymizing, monitoring, and retiring the sensitive data across multiple similar and variant data sources and applications.

Description of the Related Art

Large enterprises store a massive volume of both structured and unstructured data, including sensitive data used for software applications. This massive volume of data is difficult for most enterprises to process using conventional database and software techniques. Sensitive data is present at any location, for example, relational databases, hierarchical databases, file systems, text, documents, external files, complex data locations, composite data locations, unvalidated fields, binary large objects (BLOBs), character large objects (CLOBs), key value pairs, temporary tables such as phantom tables created by a database, structured data sources, unstructured data sources, cloud data sources, big data sources, etc. Sensitive data such as personal identification information, financial information, healthcare information, etc., contains information that causes security issues to individuals and enterprises, when compromised. As most of the enterprises operate in a cloud computing environment and as volume of big data increases, most of the enterprises lose track of the locations of the sensitive data and hence find difficulty in taking appropriate measures to protect the sensitive data.

Several organizations such as banking, insurance, telecom and healthcare organizations maintain thousands of sensitive applications that are exposed to thousands of end users, partners, clients, etc., daily. With the sensitive data being exploited by malicious hackers that steal user identities, the organizations need to detect and protect sensitive data. In addition to identifying sensitive data and the locations of the sensitive data, there is a need for determining and/or selecting the users and programs that have access to and that have accessed the sensitive data. Identifying sensitive data is a challenge for several reasons. Within an enterprise network, multiple databases store a massive number of data records that are incessantly modified, added, and deleted. Moreover, a database administrator or a functional expert does not have the functional knowledge and time to analyze every database in the enterprise network. Furthermore, the data sources in large enterprises are highly complex, thereby requiring enormous human effort to discover locations of the sensitive data. As the locations of the sensitive data are unknown, operations such as classifying, anonymizing, monitoring and detecting suspicious exfiltration events, and security of the data, become difficult tasks.

To avoid data breaches during an access of applications and databases, there is a need for protecting sensitive data in the underlying databases. The scope of data security has expanded from on-premise to the cloud. Moreover, compliance to data security regulations such as the General Data Protection Regulation (GDPR) and cross border production support, business operations demand a need for securing data. To protect the sensitive data, there is a need for identifying all the sensitive data present in a database and the locations of the sensitive data. Conventional discovery methods are not scalable across data sources and applications. The conventional methods of discovering sensitive data comprise pattern matching, dictionary matching, regular expressions, etc. Other conventional methods identify sensitive data based on classification rules that are set by using a conventional pattern matching approach, or solely by a dictionary matching approach. The conventional methods for identifying the locations of the sensitive data have numerous challenges. Identifying sensitive data in a database solely by conventional data dictionary-based methods are not reliable as these methods fail to identify most of the real sensitive data. For example, a dictionary match process typically identifies only a third of sensitive data and their locations.

A combination of pattern matching and regular expressions is also not adequate to reduce false positives to a practicable level. For example, usage of regular expressions and pattern matching results in more than 75% false positives. Moreover, regular expression (regex) and pattern-based searches are unable to find sensitive data in complex columns, composite columns, BLOBs, CLOBs, key value pairs, phantom tables, etc. Moreover, the conventional methods do not identify reasons and attributes for classifying sensitive data. Furthermore, the conventional methods are unable to distinguish data classifications with the same patterns as they are not data classification centric. While some conventional methods are configured to identify the sensitive data locations only, these methods do not generate metadata comprising information of the users and programs that have access to the sensitive data. Furthermore, the conventional discovery mechanisms typically do not have a common metadata of the sensitive data across disparate databases across the enterprise. The results obtained through these discovery mechanisms, therefore, are not effectively used in downstream data masking, data monitoring, etc. The conventional discovery solutions also lack the ability to consistently discover sensitive data located across data sources and across applications. Typically, the underlying database of any application is updated periodically, due to which, the sensitive data discovery process is typically performed using the conventional methods for the entire database again along with old and new data, which is time consuming and inefficient.

One of the downstream sensitive data security operations comprises an anonymization technique such as data masking, which is a method for obscuring or masking specific data elements within a data store. Data masking ensures that sensitive data is replaced with realistic but not real data. One goal of data masking is to obscure sensitive data such that the sensitive data is not available for any unauthorized access. Data masking is, therefore, one solution to protect data from internal and external threats by providing realistic data without the risk of exposing the sensitive data to unauthorized users. Other anonymization techniques such as format preserving encryption also allow a user to access usable data. Typically, in encryption, an authorized user decrypts data for access whereas in data masking, an authorized user continues to view real data without any change. Conventional technologies, however, do not provide an integrated approach to data anonymization comprising masking, encryption and tokenization de-identification methods. Moreover, based on business rules and security policy, if different data classifications have different de-identification requirements, a single technique may not be effective to sufficiently anonymize and de-identify all types of sensitive data. Hence, there is a need for an integrated system and a method for effective de-identification of the sensitive data.

Some conventional solutions provide standalone products for monitoring data without integrating with other data security operations. These solutions do not perform sensitive data-centric monitoring and do not log and analyze connections and statements or programs executed by the connections along with their origins to generate alerts for unauthorized activities.

Data retention policies within an organization comprise a set of guidelines that describe what data will be archived, how long the data will be stored, and what happens to the data at the end of a retention period. Conventional solutions for data disposal comprise deleting data records and archiving data records. Data records that are past the retention period are typically deleted through conventional delete operations that preclude recovery of the deleted data records. Conventional delete operations are typically not used for large volume production data. Historical transactional data records are typically archived or moved from production systems to other locations. There are various challenges with the adoption of data deletion and data archival, for example, complexity in application architectures, difference in data sources such as the Oracle® database of Oracle International Corporation versus the Microsoft® structured query language (SQL) server, etc., different data retention rules for different types of data, different geographies, ability to support architectural changes during data disposal, etc. One of the challenges with data deletion and data archival is the disposal of transactional data as most of the sensitive data is present in operational data. Transactional data comprises data that describes business events of an organization, whereas operational data comprises data that is used for managing technology and information assets of the organization. Data deletion and data archival require an accurate determination of all locations of the sensitive data to preclude risks. Data deletion and data archival also lead to inconsistent history, which adversely affects data analytics. Moreover, there is high likelihood that application integrity is compromised if the deletion and the archival are not complete. Furthermore, evaluating whether deletion rules and archival rules will still work after an upgrade or a patch is applied at a data source is time intensive.

Conventional data security systems are neither comprehensive nor integrated to enable discovery, anonymization, monitoring, and retirement of sensitive data across various data sources and applications. Some conventional solutions provide separate, discrete, standalone products for each sensitive data security operation, namely, sensitive data discovery, data anonymization, and data monitoring, and these separate standalone products are not integrated with each other. Other conventional solutions provide standalone products for data security that are loosely integrated with each other. This loose integration typically involves externalized loading of result datasets in related products. Some conventional solutions provide partially integrated, limited combinations of data protection tools or modules for data security needs which render them inefficient and incomplete. For example, some systems provide solutions that cover discovery and masking of sensitive data only, while others provide discovery and encryption of sensitive data only, while some others provide anonymization and monitoring of sensitive data only. These conventional solutions do not integrate products that protect sensitive data across its lifecycle, which is required for consistent anonymization and complete security of the sensitive data. Moreover, the metadata or intelligence of one data protection module is not shared or used by other data protection modules for downstream sensitive data security operations, for example, data masking, data monitoring, etc., due to a lack of integration.

Hence, there is a long-felt need for an integrated system and a method for integrating and managing security of sensitive data across a lifecycle of the sensitive data by discovering, anonymizing, monitoring, and retiring the sensitive data across a plurality of similar and variant data sources and applications in an integrated manner. Yet there is a need for a data classification centric method and a system for discovering sensitive data based on configurable and flexible data classifications, in source systems spanning a plurality of similar and variant data sources such as relational databases, hierarchical databases, structured data sources, unstructured data sources, cloud data sources, big data sources, file systems, text, documents, external files, mainframes, etc., data locations such as complex data locations, composite data locations, unvalidated fields, BLOBs, CLOBs, key value pairs, temporary tables such as phantom tables created by a database, etc., and applications, with minimal false positives. Further, there is a need for an integrated system and a method for generating metadata comprising a list of users and programs having access to the sensitive data by inspecting application codes that are used for downstream data security operations such as data masking, data encryption, data monitoring, data mapping, data tokenization, data retirement, etc. Still further, there is a need for a system and a method for performing a plurality of mutually different anonymization techniques that are integrated with sensitive data discovery in the system across all data sources. Yet further, there is a need for a system and a method for integrating data monitoring and data retirement with sensitive data discovery by using the metadata generated and shared from the discovery of sensitive data, to ensure that all the locations of the sensitive data are monitored or retired so that the risk is minimized.

The above-mentioned shortcomings, disadvantages, and problems are addressed herein and will be understood by reading and studying the following specification.

OBJECTS OF THE EMBODIMENTS HEREIN

A primary object of the embodiments herein is to provide an integrated system and a method for integrating and managing security of sensitive data from discovery to retirement across a lifecycle of the sensitive data.

Another object of the embodiments herein is to provide an integrated platform for discovering, anonymizing, pseudonymizing, monitoring, and retiring the sensitive data across multiple similar and variant data sources and applications in an integrated manner.

Yet another object of the embodiments herein is to provide a data classification centric method and a system for discovering sensitive data based on configurable and flexible data classifications, in source systems spanning a plurality of similar and variant data sources such as relational databases, hierarchical databases, structured data sources, unstructured data sources, cloud data sources, big data sources, file systems, text, documents, external files, mainframes, etc., data locations such as complex data locations, composite data locations, unvalidated fields, BLOBs, CLOBs, key value pairs, temporary tables such as phantom tables created by a database, etc., and applications, with minimal false positives.

Yet another object of the embodiments herein is to develop a system and a method that provides a data classification centric discovery process.

Yet another object of the embodiments herein is to provide a system and a method for scanning database tables, columns, rows, and application codes based on defined data classifications to provide results pertaining to locations and access of sensitive data.

Yet another object of the embodiments herein is to provide an integrated system and a method for sharing a common repository of metadata and discovery results comprising location and access to the sensitive data by inspecting application codes that are used for downstream data security operations such as data masking, data encryption, data monitoring, data mapping, data tokenization, data retirement, etc., wherein the metadata or intelligence of one data protection module in the integrated system is shared or used by other data protection modules by integration.

Yet another object of the embodiments herein is to provide an integrated system and a method for generating sensitive data discovery intelligence comprising metadata, results of the determination of the sensitive data, locations of the determined sensitive data, and information of users and programs that access the determined sensitive data by inspecting the identified application codes.

Yet another object of the embodiments herein is to provide an integrated system and a method for generating one or more templates comprising the sensitive data discovery intelligence and data security rules for managing the security of the determined sensitive data across the lifecycle of the determined sensitive data.

Yet another object of the embodiments herein is to provide an integrated system and a method for securing the determined sensitive data across the lifecycle of the sensitive data in a pre-production environment, a production environment, and a non-production environment.

Yet another object of the embodiments herein is to provide an integrated system and a method for a template comprising the sensitive data discovery intelligence, for storing the generated sensitive data discovery intelligence at a single location of the integrated platform, and for generating one or more templates that are configured for an extended use in subsequent or downstream data security operations such as data masking, data encryption, data monitoring, data mapping, data tokenization, data retirement, etc.

Yet another object of the embodiments herein is to provide a system and a method for performing a plurality of mutually different anonymization techniques such as masking including static data masking, dynamic data masking, blended data masking, and hybrid data masking, encryption, and tokenization that are integrated with sensitive data discovery in the system across all data sources.

Yet another object of the embodiments herein is to provide a system and a method for continuously monitoring access of the sensitive data by users and applications using the generated templates and for integrating data monitoring with sensitive data discovery by using the metadata generated and shared from the discovery of sensitive data, to ensure that all the locations of the sensitive data are identified and the risk is minimized.

Yet another object of the embodiments herein is to provide a system and a method for securely retiring inactive sensitive data and for integrating data retirement with sensitive data discovery by using the metadata generated and shared from the discovery of sensitive data, to ensure that all the locations of the sensitive data are identified and the risk is minimized.

The objects disclosed above will be realized and achieved at least by the elements, features, and combinations particularly pointed out in the claims. The objects disclosed above have outlined, rather broadly, the features of the embodiments disclosed herein in order that the detailed description that follows may be better understood. The objects disclosed above are not intended to determine the scope of the claimed subject matter and are not to be construed as limiting of the embodiments disclosed herein. Additional objects, features, and advantages of the embodiments disclosed herein are disclosed below. The objects disclosed above, which are believed to be characteristic of the embodiments disclosed herein, both as to its organization and method of operation, together with further objects, features, and advantages, will be better understood and illustrated by the technical features broadly embodied and described in the following description when considered in connection with the accompanying drawings.

SUMMARY

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the scope and the spirit thereof, and the embodiments herein include all such modifications.

This summary is provided to introduce a selection of concepts in a simplified form that are further disclosed in the detailed description. This summary is not intended to determine the scope of the claimed subject matter.

The various embodiments herein provide an integrated system or an integrated platform and a method for integrating and managing security of sensitive data across a lifecycle of the sensitive data. According to an embodiment herein, the integrated platform comprises a sensitive data discovery engine, a data anonymization engine, a data monitoring module, and a data retirement module that define computer program instructions executable by at least one processor in the integrated system. The sensitive data discovery engine determines and identifies sensitive data by executing one or more of multiple match operations in a scanning pathway on data in each of multiple similar and variant data sources and applications for a selected one of multiple unique data classifications. According to an embodiment herein, the match operations comprise, a master data field match operation, multiple dictionary match operations, a code match operation, multiple pattern match operations, and multiple exact data match operations. According to an embodiment herein, the result of the match operations is a scorecard-based determination for deterministic sensitive data discovery. The similar and variant data sources comprise relational databases, hierarchical databases, file systems, text, documents, external files, complex data locations, composite data locations, unvalidated fields, binary large objects, character large objects, key value pairs, phantom tables, structured data sources, unstructured data sources, mainframes, cloud data sources, big data sources, etc.

The sensitive data discovery engine identifies the application codes that operate on the determined sensitive data. The sensitive data discovery engine generates sensitive data discovery intelligence comprising metadata, results of the determination of the sensitive data, locations of the determined sensitive data, and information of users and programs that access the determined sensitive data by inspecting the identified application codes. According to an embodiment herein, the sensitive data discovery intelligence further comprises historical data related to the identified sensitive data and relationships of the users with the sensitive data. According to an embodiment herein, the sensitive data discovery engine stores the sensitive data discovery intelligence in a single location of the integrated platform.

The sensitive data discovery engine receives and inserts data security rules into the sensitive data discovery intelligence to generate templates for managing the security of the determined sensitive data across the lifecycle of the identified sensitive data. That is, the sensitive data discovery engine generates one or more templates comprising the sensitive data discovery intelligence and the data security rules. The data security rules comprise configuration rules for anonymization, monitoring, and retirement of the identified sensitive data. According to an embodiment herein, the configuration rules for the anonymization of the identified sensitive data comprise anonymization, authorization and monitoring information of the users. According to an embodiment herein, the integrated platform configures the generated templates as one or more anonymization templates, one or more monitoring templates, and one or more retirement templates. Each of the anonymization templates, the monitoring templates, and the retirement templates comprises the generated sensitive data discovery intelligence and the data security rules.

According to an embodiment herein, the sensitive data discovery engine distributes the generated templates to the data anonymization engine, the data monitoring module, and the data retirement module of the integrated platform deployed on each of the similar and variant data sources. According to an embodiment herein, the generated templates are configured to secure the determined sensitive data across the lifecycle of the determined sensitive data in a pre-production environment, a production environment, and a non-production environment. According to an embodiment herein, the integrated platform is an integrated engine that deploys agents on the similar and variant data sources and the applications for implementing the sensitive data discovery engine, the data anonymization module, the data monitoring module, and the data retirement module locally at the similar and variant data sources and the applications. The generation of the templates combining the sensitive data discovery intelligence with the data security rules to the data anonymization engine, the data monitoring module, and the data retirement module of the integrated platform deployed on each of the similar and variant data sources allows sharing or use of the metadata or intelligence of the sensitive data discovery engine by the data anonymization engine, the data monitoring module, and the data retirement module in the integrated platform.

According to an embodiment herein, the data anonymization engine flexibly and consistently anonymizes the identified sensitive data of multiple data types accessible by one or more of the applications using the templates based on an architecture of each of the applications. According to an embodiment herein, the data anonymization engine flexibly and consistently performs integrated anonymization on the determined sensitive data of multiple data types accessible by one or more of the applications using the generated templates based on the selected unique data classification and a nature of an application environment, for example, a pre-production environment, a production environment, and a non-production environment. According to an embodiment herein, the integrated anonymization performed by the data anonymization engine comprises masking, encryption, and tokenization of the sensitive data, where masking comprises static data masking, dynamic data masking, blended data masking, and hybrid data masking. According to an embodiment herein, the data anonymization engine statically masks the identified sensitive data in the locations of the identified sensitive data, incrementally when new sensitive data is introduced in the similar and variant data sources and the applications, or when the identified sensitive data is in transition between the similar and variant data sources and the applications, dynamically on-demand, and via an application programming interface.

According to an embodiment herein, the data anonymization engine dynamically masks the determined sensitive data at one or more of a database layer, an application layer via a database, an application layer via an application programming interface, and an application layer via a proxy. According to an embodiment herein, the data anonymization engine dynamically masks the determined sensitive data based on conditional criteria. The conditional criteria comprise, conditions and users accessing the identified sensitive data, the locations of the users, programs accessing the identified sensitive data, etc.

According to an embodiment herein, the data anonymization engine concurrently performs a combination of static data masking and/or dynamic data masking on the identified sensitive data accessible by one or a cluster of the applications. That is, according to an embodiment herein, the data anonymization engine performs blended data masking of the determined sensitive data accessible by a cluster of applications. According to another embodiment herein, the data anonymization engine performs hybrid data masking of the determined sensitive data accessible by a single application. According to an embodiment herein, the data anonymization engine encrypts the identified sensitive data of multiple data types, while preserving a format of the data types of the identified sensitive data. According to an embodiment herein, the data anonymization engine replaces the identified sensitive data with tokens using one or more tokenizers. The tokenizers implement, any one of a reversible cryptographic tokenization with a vault, a reversible non-cryptographic tokenization, an irreversible cryptographic authenticatable tokenization, an irreversible cryptographic non-authenticatable tokenization, an irreversible non-cryptographic authenticatable tokenization, an irreversible non-cryptographic non-authenticatable tokenization, and a reversible cryptographic tokenization without the vault.

According to an embodiment herein, the data monitoring module continuously monitors an access of the identified sensitive data by users and the programs using the generated templates.

According to an embodiment herein, the data retirement module determines and retires inactive sensitive data from the identified sensitive data without removing transactional data therefrom using the generated templates.

According to an embodiment herein, the related systems comprise circuitry and/or programming for effecting the methods disclosed herein. According to an embodiment herein, the circuitry and/or programming are any one of a combination of hardware, software, and/or firmware configured to effect/execute the methods disclosed herein depending upon the design choices of a system designer. According to an embodiment herein, various structural elements are employed depending on the design choices of the system designer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practised with modification within the spirit and scope of the appended claims.

BRIEF DESCRIPTION OF THE DRAWINGS

The other objects, features and advantages will occur to those skilled in the art from the following description of the embodiments and the accompanying drawings in which:

FIGS. 10A-10B illustrate tabular representations indicating a retirement of sensitive data executed by the data retirement module of the integrated platform;

Figure 1:
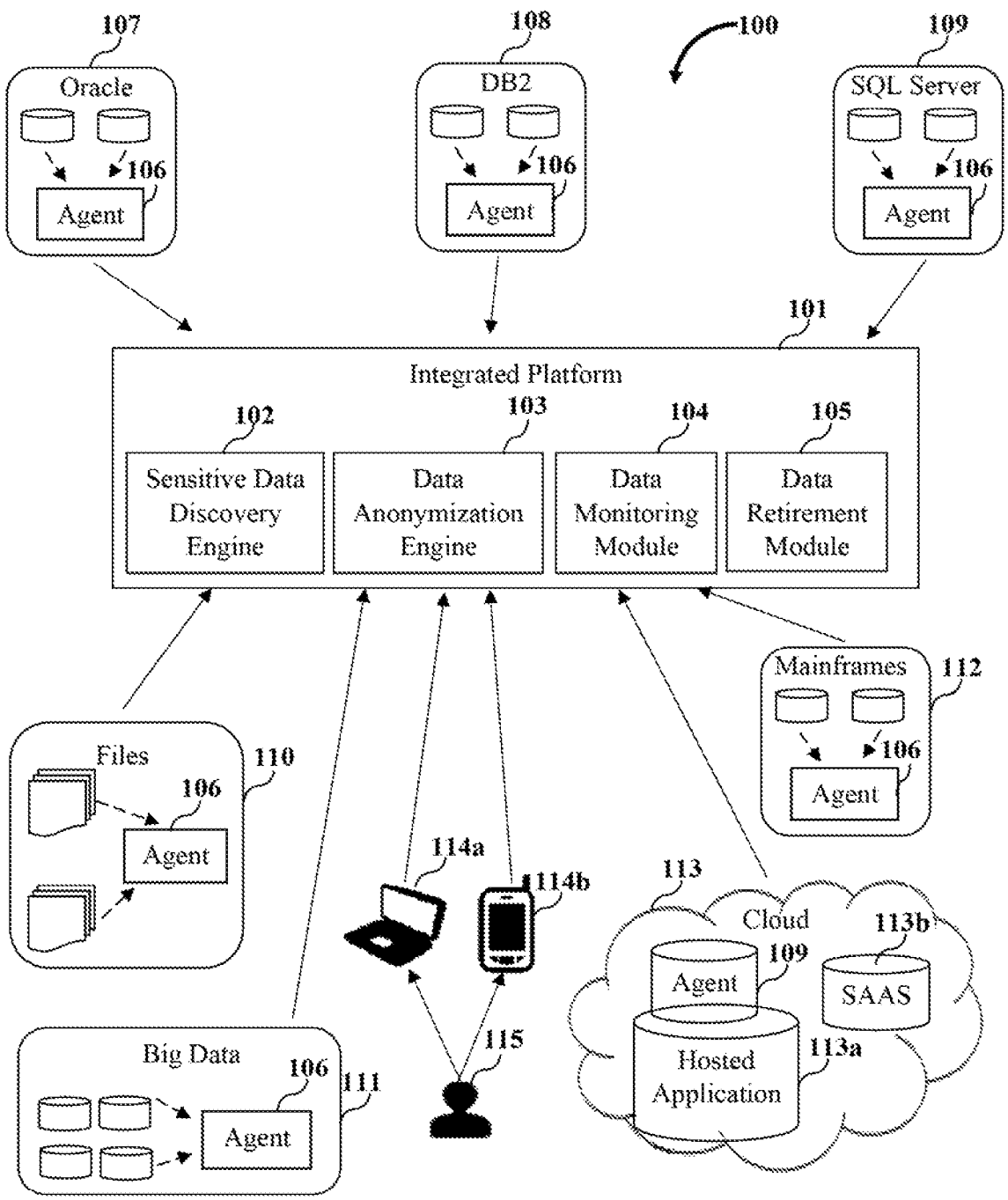
FIG. 1 illustrates a block diagram of a system for integrating and managing security of sensitive data across a lifecycle of the sensitive data, according to an embodiment herein.

The specific features of the embodiments herein are shown in some drawings and not in others for convenience only as each feature may be combined with any or all of the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

The various embodiments herein provide an integrated system and a method for integrating and managing security of sensitive data across a lifecycle of the sensitive data. The integrated system disclosed herein provides an integrated platform comprising a sensitive data discovery engine, a data anonymization engine, a data monitoring module, and a data retirement module. According to an embodiment herein, the sensitive data discovery engine determines sensitive data by executing one or more of a plurality of match operations in a scanning pathway on data in each of a plurality of similar and variant data sources and applications for a selected one of a plurality of unique data classifications. According to an embodiment herein, the plurality of match operations comprises a master data field match operation, a plurality of dictionary match operations, a code match operation, a plurality of pattern match operations, and a plurality of exact data match operations. The plurality of similar and variant data sources comprises relational databases, hierarchical databases, file systems, text, documents, external files, complex data locations, composite data locations, unvalidated fields, binary large objects, character large objects, key value pairs, phantom tables, structured data sources, unstructured data sources, mainframes, cloud data sources, and big data sources.

According to an embodiment herein, the sensitive data discovery engine identifies application codes that operate on the determined sensitive data. According to an embodiment herein, the sensitive data discovery engine generates sensitive data discovery intelligence comprising metadata, results of the determination of the sensitive data herein referred to as "discovery results", locations of the determined sensitive data, and information of users and programs that access the determined sensitive data by inspecting the identified application codes. According to an embodiment herein, the sensitive data discovery intelligence further comprises historical data related to the determination of the sensitive data and relationships of the users with the sensitive data. According to an embodiment herein, the sensitive data discovery engine stores discovery data and sensitive data discovery intelligence in a single location of the integrated platform.

According to an embodiment herein, the sensitive data discovery engine generates one or more templates comprising the sensitive data discovery intelligence and data security rules for managing the security of the determined sensitive data across the lifecycle of the determined sensitive data. The data security rules comprise configuration rules for anonymization, monitoring, and retirement of the determined sensitive data. According to an embodiment herein, the configuration rules for the anonymization of the determined sensitive data comprise anonymization methods and authorization information including programs, locations, and conditions of the users. According to an embodiment herein, the configuration rules for the anonymization of the determined sensitive data further comprise monitoring information of the users. According to an embodiment herein, the sensitive data discovery engine configures the templates as one or more anonymization templates, one or more monitoring templates, and one or more retirement templates. Each of the anonymization templates, the monitoring templates, and the retirement templates comprises the sensitive data discovery intelligence and the data security rules. According to an embodiment herein, the generated templates are configured to secure the determined sensitive data across the lifecycle of the determined sensitive data in a pre-production environment, a production environment, and a non-production environment.

According to an embodiment herein, the sensitive data discovery engine distributes the generated templates to the data anonymization engine, the data monitoring module, and the data retirement module of the integrated platform deployed on each of the plurality of similar and variant data sources. According to an embodiment herein, the integrated platform deploys agents on the plurality of similar and variant data sources and the applications for implementing the sensitive data discovery engine, the data anonymization engine, the data monitoring module, and the data retirement module locally at the plurality of similar and variant data sources and the applications.

According to an embodiment herein, the data anonymization engine flexibly and consistently anonymizes the determined sensitive data of a plurality of data types accessible by one or more of the applications using the generated templates based on an architecture of each of the applications. According to another embodiment herein, the data anonymization engine flexibly and consistently performs integrated anonymization on the determined sensitive data of a plurality of data types accessible by one or more of the applications using the generated templates based on the selected unique data classification and a nature of an application environment. According to an embodiment herein, the integrated anonymization comprises one of masking, encryption, tokenization, and any combination thereof. According to an embodiment herein, the data anonymization engine statically masks the determined sensitive data in the locations of the determined sensitive data, incrementally when new sensitive data is introduced in the plurality of similar and variant data sources and the applications, when the determined sensitive data is in transition between the plurality of similar and variant data sources and the applications, dynamically on-demand, and via an application programming interface. According to another embodiment herein, the data anonymization engine dynamically masks the determined sensitive data at one or more of a database layer, an application layer via a database, an application layer via an application programming interface, and an application layer via a proxy. According to another embodiment herein, the data anonymization engine dynamically masks the determined sensitive data based on conditional criteria. The conditional criteria comprise conditions and users accessing the determined sensitive data, the locations of the determined sensitive data, and programs accessing the determined sensitive data. According to another embodiment herein, the data anonymization engine concurrently performs a combination of static data masking and dynamic data masking on the determined sensitive data accessible by one or a cluster of the applications. According to another embodiment herein, the data anonymization engine performs blended data masking of the determined sensitive data accessible by a cluster of applications. According to another embodiment herein, the data anonymization engine performs hybrid data masking of the determined sensitive data accessible by a single application. According to another embodiment herein, the data anonymization engine encrypts the determined sensitive data of the plurality of data types, while preserving a format of the plurality of data types of the determined sensitive data. According to another embodiment herein, the data anonymization engine replaces the determined sensitive data with tokens using one or more of a plurality of tokenizers. According to an embodiment herein, the plurality of tokenizers implements a reversible cryptographic tokenization with a vault, a reversible non-cryptographic tokenization, an irreversible cryptographic authenticatable tokenization, an irreversible cryptographic non-authenticatable tokenization, an irreversible non-cryptographic authenticatable tokenization, an irreversible non-cryptographic non-authenticatable tokenization, and a reversible cryptographic tokenization without the vault.

According to an embodiment herein, the data monitoring module continuously monitors access of the determined sensitive data by users and the applications using the generated templates.

According to an embodiment herein, the data retirement module determines and retires inactive sensitive data from the determined sensitive data without removing transactional data therefrom using the generated templates. According to another embodiment herein, the data retirement module retires the sensitive data by tokenization using a plurality of tokenizers as disclosed above.

FIG. 1 illustrates a block diagram of a system 100 for integrating and managing security of sensitive data across a lifecycle of the sensitive data, according to an embodiment herein. The sensitive data comprises, for example, personal identification information, financial information, healthcare information, etc. According to an embodiment herein, the system 100 comprises an integrated platform 101 in communication with multiple similar and variant data sources, for example, 107, 108, 109, 110, 111, 112, and 113. According to an embodiment herein, the integrated platform 101 is implemented in a cloud computing environment. As used herein, "cloud computing environment" refers to a processing environment comprising configurable computing physical and logical resources, for example, networks, servers, storage media, virtual machines, applications, services, etc., and data distributed over a network, for example, the internet. The cloud computing environment provides an on-demand network access to a shared pool of the configurable computing physical and logical resources. According to another embodiment herein, the integrated platform 101 is a cloud computing-based platform implemented as a service for integrating and managing security of sensitive data across a lifecycle of the sensitive data. According to another embodiment herein, the integrated platform 101 is implemented as an on-premise software installed and run on computers on the premises of an organization. According to another embodiment herein, modules of the integrated platform 101 are deployed and implemented on a software agent 106 on each of the similar and variant data sources. For example, the modules of the integrated platform 101 are deployed and implemented on an agent 106 on each of the data sources comprising, for example, the Oracle® server 107 of Oracle International Corporation, the DB2® relational database management system (RDBMS) 108 of International Business Machines Corporation, a structured query language (SQL) server 109, files 110, big data sources 111, mainframes 112, and cloud data sources 113 as shown in FIG. 1. According to an embodiment herein, in the cloud data sources 113, the modules of the integrated platform 101 are implemented, for example, in a software agent 106 on a hosted application 113a in communication with a software as a system (SaaS) component 113b. Through the agent 106 on each of the similar and variant data sources, the integrated platform 101 implements engine-based scanning and the agent-based scanning to provides flexibility to users in the discovery of the sensitive data. According to an embodiment herein, the integrated platform 101 performs scanning operations on the data at each of the similar and variant data sources. According to another embodiment herein, the integrated platform 101 retrieves the data from the similar and variant data sources and then performs the scanning operations on the retrieved data.

According to an embodiment herein, the integrated platform 101 is accessible to user devices, for example, 114a and 114b, through a broad spectrum of technologies and devices such as personal computers with access to the internet, internet enabled cellular phones, tablet computing devices, etc. The user devices, for example, 114a and 114b, are electronic devices, for example, one or more of personal computers, tablet computing devices, mobile computers, mobile phones, smart phones, portable computing devices, laptops, personal digital assistants, wearable computing devices such as smart glasses, smart watches, etc., touch centric devices, workstations, client devices, portable electronic devices, network enabled computing devices, interactive network enabled communication devices, or any other suitable computing equipment and combinations of multiple pieces of computing equipment. Each of the user devices, for example, 114a and 114b, implements applications comprising, for example, web browsing applications, mapping applications, electronic mail (email) applications, etc. In the system 100 disclosed herein, the integrated platform 101 interfaces with computer systems comprising the data sources for example, 107, 108, 109, 110, 111, 112, and 113 and the user devices, for example, 114a and 114b, and therefore more than one specifically programmed computer system is used for integrating and managing security of sensitive data across a lifecycle of the sensitive data.

According to an embodiment herein, the integrated platform 101 comprises a sensitive data discovery engine 102, a data anonymization engine 103, a data monitoring module 104, and a data retirement module 105. The sensitive data discovery engine 102 determines sensitive data by executing one or more of multiple match operations in a scanning pathway on data in each of the similar and variant data sources and applications for a selected unique data classification as disclosed in the US Non-provisional Patent Application with Ser. No. 16/541,589, filed on Aug. 15, 2019. The sensitive data discovery engine 102 receives administration and system privileges to access the data from multiple similar and variant data sources and applications. The applications accessed by the sensitive data discovery engine 102 comprise, for example, application forms, pages, queries, reports, etc. According to an embodiment herein, the sensitive data discovery engine 102 categorizes the data sources that are potentially sensitive and identifies the sensitive data there within.

According to an embodiment herein, the sensitive data discovery engine 102 configures unique data classifications of the data based on definitions for the unique data classifications received from a user device via a graphical user interface (GUI) provided by the sensitive data discovery engine 102 or retrieved from a data store. The unique data classifications are predefined or configurable via the GUI. The unique data classifications comprise, for example, a national identifier, a credit card number, bank account information, first name, last name, other names, address, phone, electronic mail (email) addresses, internet protocol (IP) addresses, date of birth, salary, nationality, religion, home country, home city, airport code, insurance category, people groups, grades, positions, etc. According to an embodiment herein, the unique data classifications are predefined by the application logic. The application logic defines the constitution of sensitive data in source systems spanning multiple similar and variant data sources and applications. The sensitive data discovery engine 102 configures unique data classifications of direct customer-identifying data comprising, for example, first name, last name, email address, phone number, postal address, etc. The sensitive data discovery engine 102 also configures unique data classifications of indirect customer-identifying data comprising, for example, passport identification number, account number, social security number, internet protocol address, company information, etc. The sensitive data discovery engine 102 also configures unique data classifications of potential customer-identifying data comprising, for example, birth information, language, marital status, credit rating, gender, etc. The sensitive data discovery engine 102 preconfigures unique data classifications of direct, indirect and potential customer-identifying data.

According to an embodiment herein, the unique data classifications are configured through the GUI provided by the sensitive data discovery engine 102. In this embodiment, a user enters the unique data classifications through the GUI rendered on a user device. The sensitive data discovery engine 102 receives the entered unique data classifications from the user device via the GUI. The unique data classifications input to the sensitive data discovery engine 102 are transformed, processed, and executed by an algorithm in the sensitive data discovery engine 102. The sensitive data discovery engine 102 renders the data classifications configurable to allow flexible definitions of the data classifications. The sensitive data discovery engine 102 distinguishes the data classifications having the same patterns. The sensitive data discovery engine 102 implements classification methods based on patterns that support validation functions and validations based on master data. For data classifications that have the same patterns, the sensitive data discovery engine 102 runs validations to identify the type of data. For example, a credit card number would have 16 digits and would pass a checksum validation. Any other 16-digit number would not pass the checksum validation. According to an embodiment herein, the sensitive data discovery engine 102 executes the Luhn algorithm, also referred to as a modulus 10 algorithm, for validating identification numbers, for example, credit card numbers, international mobile equipment identity (IMEI) numbers, national provider identifier numbers, social insurance numbers, social security numbers, etc., that constitute sensitive data in accordance with the application logic. According to an embodiment herein, the sensitive data discovery engine 102 renders a GUI for allowing a user to enter multiple variations of a pattern, for example, NNNN-NNNN-NNNN, NNNNNNNNNNNNNNNN, NNNN, NNNN/NNNN/NNNN/NNNN, etc. The sensitive data discovery engine 102 allows users to configure the patterns while also having an option to include or exclude certain patterns as required via the GUI. In addition to patterns, the sensitive data discovery engine 102 inspects the source code of the applications to configure unique data classifications. The sensitive data discovery engine 102 also scans source code to identify difficult-to-find locations, for example, temporary tables, backup tables, etc., containing sensitive data. The sensitive data discovery engine 102 therefore supports the configuration of the unique data classifications and allows addition of custom data classifications.

According to an embodiment herein, the sensitive data discovery engine 102 configures a scanning pathway for scanning the data based on a selected one of the unique data classifications. The scanning pathway defines a sequence of one or more match operations to be performed on the data for the selected unique data classification. The scanning pathway configures an order of execution of the match operations by the sensitive data discovery engine 102. The match operations comprise, for example, a master data field match operation, multiple dictionary match operations, a code match operation, multiple pattern match operations, and multiple exact data match operations. For facilitating a master data field match operation, a user, for example, an application owner or a customer flags an internal repository containing sensitive data as a master data table. The master data field match operation comprises matching the data against fields and values defined in the master data table. In the master data field match operation, the sensitive data discovery engine 102 matches the data against fields, for example, column names and values defined in the master data table. If a match of the data with the sensitive data contained in the master data table is found and if a score assigned to the data exceeds a predefined threshold, the sensitive data discovery engine 102 deems the data as sensitive data.

According to an embodiment herein, the sensitive data discovery engine 102 configures a dictionary of patterns or strings. According to another embodiment herein, the sensitive data discovery engine 102 retrieves available data dictionaries for performing a dictionary analysis and the dictionary match operations. In the dictionary match operations, the sensitive data discovery engine 102 determines all the occurrences of any pattern or string of the dictionary in the data. The dictionary match operations comprise matching the data against primary key and foreign key references, matching the data against exact column names, and matching the data against similar column names. The dictionary match operations comprise, for example, "Dictionary Match: Relationship", "Dictionary Match: Column Name", and "Dictionary Match: Column Name Expression". According to an embodiment herein, the sensitive data discovery engine 102 by determining documented relationships at a database level. For example, in the dictionary match operation, "Dictionary Match: Relationship", the sensitive data discovery engine 102 matches the data against primary key and foreign key references. According to another embodiment herein, the sensitive data discovery engine 102 identifies columns and tables for classification by comparing known table and column names, for example, address, against a data dictionary. In the dictionary match operation, "Dictionary Match: Column Name", the sensitive data discovery engine 102 matches the data against the exact column names defined. In the dictionary match operation, "Dictionary Match: Column Name", the sensitive data discovery engine 102 scans a heading of a column to identify the type of data contained within the column. For example, the sensitive data discovery engine 102 determines that a column with a heading "Nat_Iden" or other similar variations are likely to contain national identifiers and therefore classify the data contained in the column as sensitive data. However, sometimes sensitive data can be present in columns that are flagged as "not sensitive" by a simple column match. In this case, the sensitive data discovery engine 102 performs a pattern match operation or a code match operation to verify the sensitivity of the column. According to another embodiment herein, the sensitive data discovery engine 102 identifies columns and tables for classification by performing a partial match or comparison of known table and column names, for example, Address_line_01, against the data dictionary. In the dictionary match operation, "Dictionary Match: Column Name Expression", the sensitive data discovery engine 102 matches the data against like or similar column names defined. In addition to performing dictionary match operations, the sensitive data discovery engine 102 performs matching based on values and application logic. For example, the sensitive data discovery engine 102 makes use of the validation function called a Luhn checksum calculation along with dictionary match operations to identify credit card numbers.

According to an embodiment herein, the sensitive data discovery engine 102 performs a code analysis to eliminate false positives and to document columns that may not contain any data, for example, in key-value temporary tables. As used herein, "false positive" refers to an error in data reporting where a result of a match operation falsely indicates a presence of sensitive data. The sensitive data discovery engine 102 reviews database code, application code, and master data fields, for example, using a procedural language for structured query language (PL/SQL) procedures. According to an embodiment herein, the code match operation comprises matching the data against database objects based on master data fields. The database objects refer to defined objects in a database that is used to store or reference data. In the code match operation, the sensitive data discovery engine 102 matches the data against database objects based on master data fields. According to an embodiment herein, the sensitive data discovery engine 102 performs a pattern analysis by implementing pattern recognition to identify known patterns of sensitive data. In the pattern match operations, the sensitive data discovery engine 102 determines the presence of patterns, for example, in the form of tress structures or sequence patterns such as text strings, in the data. For example, for a data classification such as a credit card number, which is a 16-digit number, the sensitive data discovery engine 102 includes all possible pattern combinations NNNN-NNNN-NNNN-NNNN, NNNNNNNNNNNNNNNN, NNNN NNNN NNNN NNNN, NNNN/NNNN/NNNN/NNNN, etc., in the pattern match operations to capture all such patterns. The pattern combinations are configurable via the GUI. The pattern match operations comprise matching the data against character-based patterns. The pattern match operations comprise, for example, "Pattern Match", "Pattern Match: Validated with Functions", and "Pattern Match: Validated against Master Data". In the pattern match operation, "Pattern Match", the sensitive data discovery engine 102 matches the data against patterns defined like U—Uppercase, L—Lowercase, and N—Numeric. According to an embodiment herein, the sensitive data discovery engine 102 validates results of the pattern match operations against master data fields, or master validation functions, or any combination thereof. The sensitive data discovery engine 102 performs the validations based on the validation functions or by matching with master data. When the pattern match operation alone cannot be used to confidently establish whether the data is sensitive or not, the sensitive data discovery engine 102 uses the pattern match operations, "Pattern Match: Validated with Functions" and/or "Pattern Match: Validated against Master Data".

According to an embodiment herein, the pattern match operation, "Pattern Match: Validated with Functions", depends on the configured scanning pathway. In the pattern match operation, "Pattern Match: Validated with Functions", the sensitive data discovery engine 102 validates the results of the pattern match operation, "Pattern Match", against validation functions configured by the sensitive data discovery engine 102. The sensitive data discovery engine 102 utilizes multiple types of validation functions in conjunction with the results of the pattern match operations. For example, to validate a 16-digit credit card number 9876 5432 1012 3456, which could be any number, the sensitive data discovery engine 102 implements a validation function defined by the Luhn algorithm. In another example, since credit cards and debit cards follow a set pattern and associated conditions, the sensitive data discovery engine 102 validates a Mastercard number by determining whether the number begins with the numbers "51" through "55". The sensitive data discovery engine 102 configures such validation functions in the scanning pathway while searching for credit card numbers and debit card numbers. The sensitive data discovery engine 102 performs the pattern match operation, "Pattern Match: Validated with Functions", when master data fields are not available across the similar and variant data sources. The pattern match operation, "Pattern Match: Validated against Master Data", depends on the configured scanning pathway. In the pattern match operation, "Pattern Match: Validated against Master Data", the sensitive data discovery engine 102 validates the results of the pattern match operation, "Pattern Match", against master data fields to minimize or eliminate false positives.

According to an embodiment herein, the sensitive data discovery engine 102 implements natural language processing comprising named entity recognition (NER) for classifying text into predefined categories called entities, for example, "person", "organization", etc. The entities are predefined categories generated by the NER for identifying and classifying data in free text. Entities are not equivalent to data classifications, for example, card identification numbers (CIDs) but provide additional context. The sensitive data discovery engine 102 assigns the entities to data classifications in a one-to-many mapping similar to assigning patterns to data classifications.

According to an embodiment herein, the sensitive data discovery engine 102 performs a data analysis in the exact data match operations. According to an embodiment herein, the exact data match operations comprise matching the data against column values, or master data values defined in master data tables, or a preconfigured repository of values, or any combination thereof. In the exact data match operations, the sensitive data discovery engine 102 also searches for a specific string value. For example, if a particular employee identifier (ID) needs to be discovered within a data source for subsequent deletion, the sensitive data discovery engine 102 scans the data source to identify all data locations where the input employee ID has been entered. The exact data match operations comprise, for example, "Exact Data Match: Master Data", "Exact Data Match: Repository", and "Exact Data Match: Entered Value". In the exact data match operation, "Exact Data Match: Master Data", the sensitive data discovery engine 102 matches the data against master data values defined in a master data table. To eliminate false positives, the exact data match operation, "Exact Data Match: Master Data", compares discovered column data against known column data. In the exact data match operation, "Exact Data Match: Repository", the sensitive data discovery engine 102 matches the data against a repository of values created by the sensitive data discovery engine 102. In the exact data match operation, "Exact Data Match: Entered Value", the sensitive data discovery engine 102 matches the data against column values defined in the exact data match operation.

According to an embodiment herein, the sensitive data discovery engine 102 renders a graphical user interface (GUI) on a user device to allow a user to select one or more match operations. The sensitive data discovery engine 102 receives the selected match operations via the GUI and configures the scanning pathway for the selected unique data classifications. For example, the sensitive data discovery engine 102 configures a scanning pathway defining a sequence of a master data field match operation, a dictionary match operation based on a column name, another dictionary match operation based on a column name expression, a pattern match, and a pattern match validated with functions for discovery of a national identifier. The scanning pathway that defines the sequence of match operations to be performed for discovering the sensitive data is fully configurable and is dependent on the data classification to be discovered. For example, the sensitive data discovery engine 102 configures the following scanning pathway to identify the data classification, "National Identifier": (1) Master Data Field; (2) Dictionary Match: Column Name; (3) Dictionary Match: Column Name Expression; (4) Pattern Match; and (5) Pattern Match: Validated with Functions. In another example, the sensitive data discovery engine 102 configures the following scanning pathway to identify the data classification, "first name": (1) Master Data Field and (2) Dictionary Match: Column Name. According to an embodiment herein, the sensitive data discovery engine 102 configures a predefined sequence of the match operations for a default data classification based on past operations.

According to an embodiment herein, the sensitive data discovery engine 102 executes the selected match operations in the configured scanning pathway on the data for the selected unique data classification based on the received selection of a scan level. The scan level comprises a full scan of the entirety of the data from the similar and variant data sources and applications, a sample scan of a predefined number of data locations in the similar and variant data sources and applications, and an incremental scan of newly added data locations. The sensitive data discovery engine 102 executes the match operations selected, for example, from a master data field match operation, multiple dictionary match operations, a code match operation, multiple pattern match operations, and multiple exact data match operations in the configured scanning pathway on the data for the selected unique data classification. The sensitive data discovery engine 102 executes the selected match operations sequentially as defined in the configured scanning pathway. If the user selects the full scan via the GUI, the sensitive data discovery engine 102 executes the selected match operations on the entirety of the data within the source systems spanning multiple similar and variant data sources and applications. If the user selects the sample scan via the GUI, the sensitive data discovery engine 102 executes the selected match operations on a predefined number of data locations, for example, rows or columns within a data source. If the user selects the incremental scan via the GUI, the sensitive data discovery engine 102 executes the selected match operations on newly added columns, files, or other data sources. According to an embodiment herein, the sensitive data discovery engine 102 allows users to reconfigure the scanning pathway and reorder the sequence of execution of the selected match operations via the GUI. The users may also deselect one or more of the match operations for execution in the scanning pathway. The sensitive data discovery engine 102 provides a check or uncheck option on the GUI to allow the users to include or exclude a match operation in the scanning pathway. The sensitive data discovery engine 102 therefore scans database tables, columns and rows based on defined unique data classifications, for example, national identifier, first name, last name, credit card number, etc., and provides results pertaining to the location of sensitive data. The method of scanning is data classification centric with scanning pathways and a scorecard mechanism as disclosed in the US Non-provisional Patent Application with Ser. No. 16/541,589.

According to an embodiment herein, the sensitive data discovery engine 102 determines sensitive data, for example, within 2 or 3 iterations. In the determination of the sensitive data, the sensitive data discovery engine 102 classifies the data as sensitive data, or potentially sensitive data, or not sensitive data based on the executed match operations in the configured scanning pathway. The sensitive data discovery engine 102 configures the scanning pathway defining the sequence of the selected match operations to be performed on the accessed data to scan and flag a data location, for example, a column as sensitive to ensure optimal performance for classifying the data as sensitive, potentially sensitive, or not sensitive, thereby minimizing false positives and ensuring a comprehensive discovery of sensitive data. In addition to determining the sensitive data, the sensitive data discovery engine 102 renders the locations of the sensitive data in source systems spanning multiple similar and variant data sources and applications that are identified using the configured scanning pathway and the scorecard mechanism.

The sensitive data discovery engine 102 identifies application codes that operate on the determined sensitive data. Apart from patterns, the sensitive data discovery engine 102 also inspects source codes of the applications to determine whether the data is sensitive or not. The sensitive data discovery engine 102 analyzes SQL code to determine what operations are being performed, particularly those that involve data locations, for example, tables and columns, containing sensitive data. On determining the data locations, for example, tables and columns that are sensitive, the sensitive data discovery engine 102 identifies actions concerning these data locations. The sensitive data discovery engine 102 scans application code and user information comprising user behavioural information, and determines what users and programs access the sensitive data. The sensitive data discovery engine 102 provides details of the application programs accessing the sensitive data and the users who have access to and access the sensitive data. The sensitive data discovery engine 102 performs an analysis of user access and maps the user access to the sensitive data.

The sensitive data discovery engine 102 generates sensitive data discovery intelligence comprising metadata, results of the determination of the sensitive data, locations of the determined sensitive data, and information of users and programs that access the determined sensitive data by inspecting the identified application codes. The locations of the determined sensitive data comprise, for example, schema, tables, columns, complex columns, rows, free text fields, description fields, unvalidated fields, key value pairs, etc. According to an embodiment herein, the sensitive data discovery intelligence further comprises historical data related to the determination of the sensitive data and relationships of the users with the sensitive data. The sensitive data discovery intelligence provides a complete determination of where the sensitive data is, how the sensitive data is being used, and who or what has access to the sensitive data. The sensitive data discovery intelligence allows maintenance of data relationships and referential integrity. The sensitive data discovery engine 102, therefore, provides sensitive data discovery intelligence comprising the locations of the sensitive data and who has access to the sensitive data based on predefined and configurable unique data classifications of the data stored in multiple similar and variant data sources.

The sensitive data discovery engine 102 implements a discovery process based on metadata of an application using different data classifications to further generate a template or a data map that is a result of the discovery process. According to an embodiment herein, the sensitive data discovery engine 102 generates one or more templates comprising the sensitive data discovery intelligence and data security rules for managing the security of the determined sensitive data across the lifecycle of the determined sensitive data. The generated templates provide a data map of sensitive data with complete information of the discovery of the sensitive data and relationships present. The generated templates are configured for extended use in downstream data security operations. The downstream data security operations for which the generated templates are used comprise, for example, data anonymization including data masking, data encryption, data tokenization, etc., data monitoring, data retirement, etc. The sensitive data discovery engine 102 generates metadata within source systems spanning multiple similar and variant data sources and applications for enterprise data security operations. The sensitive data discovery engine 102 discovers sensitive data by inspecting data and metadata with respect to the data classification and by introspecting application code to determine which users and what programs access the sensitive data. The sensitive data discovery intelligence generated by the sensitive data discovery engine 102 is used for downstream data security operations. The results of running the sensitive data discovery engine 102 on the data sources and the applications are used, for example, for data mapping, data lineage related uses, and other data security operations. According to an embodiment herein, the sensitive data discovery engine 102 performs the generation of the sensitive data discovery intelligence and the templates simultaneously or in parallel. According to an embodiment herein, the sensitive data discovery engine 102 stores the sensitive data discovery intelligence in a single location of the integrated platform 101.

According to an embodiment herein, the sensitive data discovery engine 102 receives and inserts the data security rules into the sensitive data discovery intelligence for managing the security of the determined sensitive data across the lifecycle of the determined sensitive data. The data security rules comprise information pertaining to the subsequent downstream data protection operations, for example, data anonymization to be executed by the data anonymization engine 103, data monitoring to be executed by the data monitoring module 104, and data retirement to be executed by the data retirement module 105. The data security rules comprise configuration rules for anonymization, monitoring, and retirement of the determined sensitive data. According to an embodiment herein, the configuration rules for the anonymization of the determined sensitive data comprise authorization information of the users, that is, information regarding authorized and unauthorized users. According to another embodiment herein, the configuration rules for the anonymization of the determined sensitive data comprise anonymization, authorization and monitoring information of the users. According to an embodiment herein, the sensitive data discovery engine 102 configures the templates as one or more anonymization templates, one or more monitoring templates, and one or more retirement templates. Each of the anonymization templates, the monitoring templates, and the retirement templates comprises the sensitive data discovery intelligence and the data security rules.

According to an embodiment herein, the sensitive data discovery engine 102 distributes the generated templates to the data anonymization engine 103, the data monitoring module 104, and the data retirement module 105 of the integrated platform 101 deployed on each of the similar and variant data sources. The distribution of the generated templates to the data anonymization engine 103, the data monitoring module 104, and the data retirement module 105 of the integrated platform 101 deployed on each of the similar and variant data sources allows sharing or use of the metadata or intelligence of the sensitive data discovery engine 102 by the data anonymization engine 103, the data monitoring module 104, and the data retirement module 105 in the integrated platform 101. By integrating the data anonymization engine 103, the data monitoring module 104, and the data retirement module 105 with the sensitive data discovery engine 102, the sensitive data discovery intelligence of the sensitive data discovery engine 102 is shared or used by the data anonymization engine 103, the data monitoring module 104, and the data retirement module 105 for downstream data security.

According to an embodiment herein, the integrated platform 101 executes the sensitive data discovery intelligence, the data security rules and other metadata stored in the templates at each of the similar and variant data sources using an agent 106 deployed by the integrated platform 101 in each of the similar and variant data sources. According to an embodiment herein, the integrated platform 101 generates agents 106 for the downstream data security operations comprising data anonymization, data monitoring, and data retirement and deploys the agents 106 locally at the similar and variant data sources, for example, 107, 108, 109, 110, 111, 112, 113, etc., as shown in FIG. 1. According to another embodiment herein, the data anonymization engine 103, the data monitoring module 104, and the data retirement module 105 are deployed in and executed by the agent 106 of each of the similar and variant data sources.

The data anonymization engine 103 flexibly and consistently anonymizes the determined sensitive data of multiple data types accessible by one or more of the applications using the generated templates based on application architecture. According to an embodiment herein, the data anonymization engine 103 flexibly and consistently performs integrated anonymization on the determined sensitive data of multiple data types accessible by one or more of the applications using the generated templates based on the selected unique data classification and a nature of an application environment, for example, a pre-production environment, a production environment, and a non-production environment. The integrated anonymization comprises masking, encryption, tokenization, and any combination thereof. Various anonymization methods are predefined for each data classification that is present across various data sources for ease of implementation. According to an embodiment herein, the data anonymization engine 103 performs anonymization operations, for example, static data masking, dynamic data masking, blended data masking, hybrid data masking, data encryption, and tokenization. Static data masking changes real data to fake data using various methods as disclosed in the detailed description of FIG. 4. Static data masking is an irretrievable process and is used in testing, development, etc. According to an embodiment herein, the data anonymization engine 103 comprises a static data masking module for statically masking the determined sensitive data in the locations of the determined sensitive data, incrementally when new sensitive data is introduced in the similar and variant data sources and the applications, when the determined sensitive data is in transition between the similar and variant data sources and the applications, dynamically on-demand, and via an application programming interface (API). According to an embodiment herein, the static data masking module scrambles the sensitive data in a non-production instance using the sensitive data discovery intelligence to replace the sensitive data with meaningful data, thereby preserving data functionality for development and testing purposes.

In static data masking of the sensitive data, the static data masking module replaces the sensitive data with realistic data using different data masking techniques available at each of the data sources. The different data masking techniques comprise, for example, "in-place" data masking, "in-transit" data masking, "as-it-happens" data masking, and "REST API" data masking as disclosed in the detailed description of FIG. 4. The data anonymization engine 104 supports various anonymization methods comprising, for example, masking, format-preserving encryption, tokenization, data shuffling, substitution, generalizing the sensitive data into a range or a group, replacing the sensitive data with constants, replacing the sensitive data with null, etc. In format-preserving encryption, the static data masking module encrypts the sensitive data such that the format of the input sensitive data is the same as the format of the output sensitive data. For example, the static data masking module performs format-preserving encryption on a 16-digit credit card number to generate another 16-digit number. According to an embodiment herein, the static data masking module performs data shuffling by randomly shuffling data from a dataset within an attribute, for example, a column, or a set of attributes, for example, a set of columns. According to an embodiment herein, the static data masking module performs data substitution by replacing the sensitive data with realistic but non-meaningful data.

According to an embodiment herein, the static data masking module performs static data masking on both structured and unstructured data to update the sensitive data with dummy data. The static data masking module also generates specific rules as a template for each data classification. The template comprises a collection of sensitive data locations, for example, schema, tables, and columns with associated data masking methods. According to an embodiment herein, the static data masking module supports custom masking techniques along with predefined masking, encryption and tokenization methods. Thereafter, the integrated platform 101 deploys agents 106 that implement the static data masking module on target data sources and applications to initiate the static data masking process. The integrated platform 101 sends masking rules to the target data sources and applications and initiates the static data masking at the target data sources and applications. After completion of static data masking, the sensitive data is replaced with realistic but non-meaningful data in the target data sources and applications. The static data masking that is performed at the target data sources and applications has low performance impact and ensures that the sensitive data does not leave the target data sources and applications.

Figure 5:
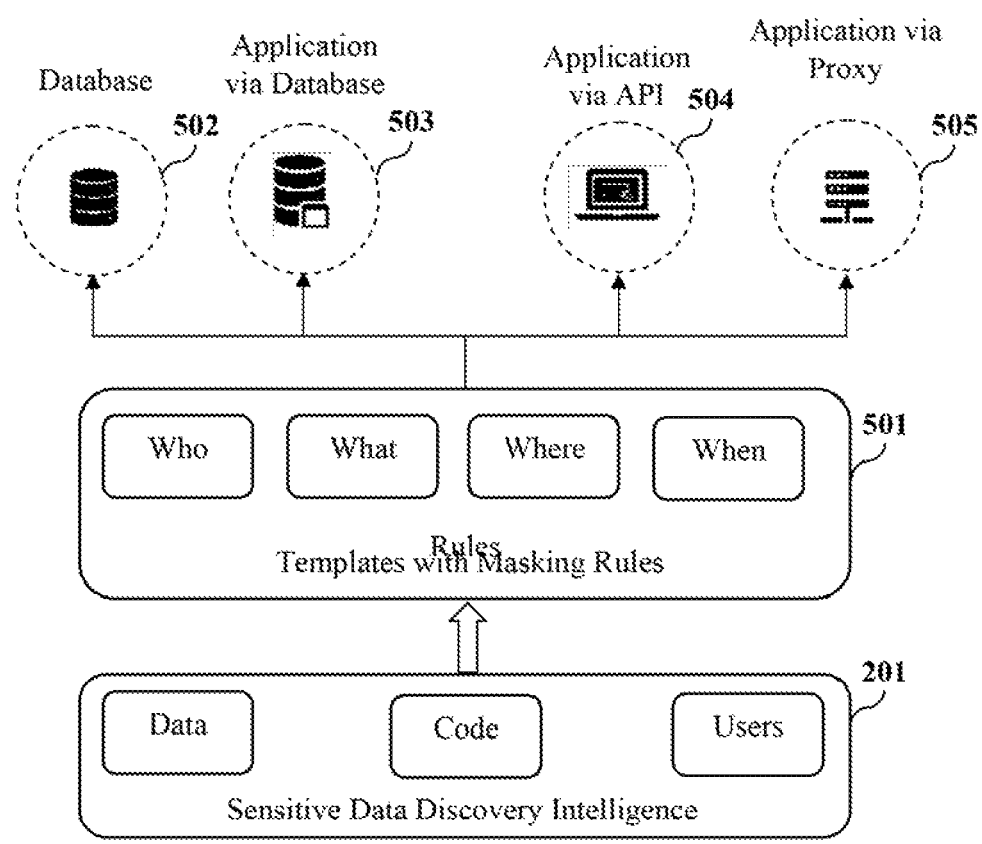
FIG. 5 illustrates a block diagram indicating a usage of sensitive data discovery intelligence and corresponding templates for dynamically masking sensitive data.

Dynamic data masking does not change underlying real data but changes only a view of the data to fake data in case of an unauthorized access using various methods as disclosed in the detailed description of FIG. 5. According to an embodiment herein, the data anonymization engine 103 comprises a dynamic data masking module for dynamically masking the determined sensitive data at one or more of a database layer, an application layer via a database, an application layer via an application programming interface, and an application layer via a proxy as disclosed in the detailed description of FIG. 5. According to another embodiment herein, the dynamic data masking module dynamically masks the determined sensitive data based on conditional criteria. The conditional criteria comprise, for example, conditions and users accessing the determined sensitive data, the locations of the users, and programs accessing the determined sensitive data. According to an embodiment herein, the dynamic data masking module performs flexible dynamic data masking at a database layer, an application layer using a database or an API, and a proxy layer. According to an embodiment herein, the dynamic data masking module allows a user or a role to view the original sensitive data or the masked sensitive data based on rules without changing the underlying data in a production environment. The dynamic data masking module performs data masking based on predefined rules and policies, thereby ensuring that an authorized user has access to the original sensitive data and an unauthorized user is prevented from viewing the original sensitive data. According to an embodiment herein, the dynamic data masking module implements dynamic data masking using different data masking techniques, for example, in-place database masking, application masking using APIs, application masking using a proxy, application masking using a proxy redirect, etc. According to another embodiment herein, the dynamic data masking module performs condition-based masking, user-based masking, location aware masking, program-based masking, and result set-based masking. The dynamic data masking module provides flexible options for dynamic data masking to suit various application architectures and provide comprehensive security with a minimal performance impact. According to an embodiment herein, the dynamic data masking module performs dynamic data masking for applications at a field level based on user connections or conditions and adds application code, for example, to a form or a page. According to an embodiment herein, the integrated platform 101 deploys agents 106 that implement the dynamic data masking module on target data sources and applications to initiate the dynamic data masking process. The dynamic data masking module creates a masked view of the sensitive data, thereby ensuring that the underlying sensitive data is unchanged in the target data sources and applications.

According to an embodiment herein, the data anonymization engine 103 concurrently performs a combination of static data masking and dynamic data masking on the determined sensitive data accessible by one or a cluster of the applications. That is, according to an embodiment herein, the data anonymization engine 103 performs blended data masking of the determined sensitive data accessible by a cluster of applications. Concurrent application of static data masking and dynamic data masking in the same instance is referred to as "blended data masking". According to this embodiment, the data anonymization engine 103 performs blended data masking when there are a cluster of applications, where static data masking is applied on sensitive data of one application and dynamic data masking is applied on sensitive data of another application. Consider an example where there are 100 sensitive data columns out of which 20 sensitive data columns cannot be scrambled for business reason. In this example, the data anonymization engine 103 performs static data masking by scrambling 80 sensitive data columns and then performs dynamic data masking by masking the remaining 20 sensitive data columns at the same instance. In this example, the data anonymization engine 103 performs intra-application blended data masking. According to another embodiment herein, the data anonymization engine 103 also performs blended data masking between applications, also referred to as inter-application blended data masking, where the data anonymization engine 103 performs static data masking of sensitive data in one application and dynamic data masking of sensitive data in another application. The data anonymization engine 103 performs inter-application blended data masking in application clusters when not all instances can be scrambled at the same time.

According to another embodiment herein, the data anonymization engine 103 performs hybrid data masking of the determined sensitive data accessible by a single application. Similar to blended data masking, the data anonymization engine 103 performs hybrid data masking where static data masking and dynamic data masking are applied on sensitive data of a single application. According to an embodiment herein, the integrated platform 101 deploys agents 106 that implement the data anonymization engine 103 on target data sources and applications to initiate concurrent static data masking and/or dynamic data masking processes on the sensitive data at the target data sources and the applications.

According to another embodiment herein, the data anonymization engine 103 performs anonymization, for example, masking, encryption, and/or tokenization, of the determined sensitive data, while preserving a format of the data types of the determined sensitive data.

According to another embodiment herein, the data anonymization engine 103 encrypts the determined sensitive data of multiple data types, while preserving a format of the data types of the determined sensitive data. In cases where the original sensitive data needs to be restored from the anonymized sensitive data, the data anonymization engine 103 performs data encryption to anonymize the sensitive data. According to an embodiment herein, as a column in a database cannot accept data of different data types, the data anonymization engine 103 performs format preserving encryption of the sensitive data to allow the column in the database to accept and store the encrypted sensitive data in the column. According to an embodiment herein, the data anonymization engine 103 executes advanced encryption standard (AES)-based format preserving encryption algorithms for encrypting sensitive data of numeric, alphabetic and alphanumeric data types. According to another embodiment herein, the data anonymization engine 103 executes other encryption algorithms, for example, a secure hash algorithm (SHA), permutation-substitution (PS) based format preserving encryption algorithms, etc., for encrypting the sensitive data. According to an embodiment herein, the integrated platform 101 deploys agents 106 that implement the data anonymization engine 103 on target data sources and applications to initiate the format preserving encryption process on the sensitive data at the target data sources and the applications.

According to another embodiment herein, the data anonymization engine 103 replaces the determined sensitive data with tokens using one or more of multiple tokenizers. The data anonymization engine 103 implements different types of tokenization methods such as reversible and irreversible tokenization, authenticatable and non-authenticatable tokenization, and cryptographic and non-cryptographic tokenization as per classifications and standards defined by the payment card industry data security standard (PCI DSS). For example, the tokenizers implement a reversible cryptographic tokenization with a vault, a reversible non-cryptographic tokenization, an irreversible cryptographic authenticatable tokenization, an irreversible cryptographic non-authenticatable tokenization, an irreversible non-cryptographic authenticatable tokenization, an irreversible non-cryptographic non-authenticatable tokenization, and a reversible cryptographic tokenization without the vault. According to an embodiment herein, the data anonymization engine 103 generate tokens with which to replace the sensitive data using, for example, the advanced encryption standard (AES), secure hash algorithms (SHAs), elementary cellular automata (ECA), etc. According to an embodiment herein, the integrated platform 101 deploys agents 106 that implement the data anonymization engine 103 on target data sources and applications to initiate tokenization processes on the sensitive data at the target data sources and the applications.

According to another embodiment herein, the data anonymization engine 103 performs pseudonymization by replacing the sensitive data with one or more artificial identifiers or pseudonyms. According to an embodiment herein, the integrated platform 101 deploys agents 106 that implement the data anonymization engine 103 on target data sources and applications to initiate pseudonymization processes on the sensitive data at the target data sources and the applications. According to another embodiment herein, the data anonymization engine 103 is executed through a graphical user interface provided by the integrated platform 101. In another embodiment, an API script is appended to an existing database administrator (DBA) replication process to execute the data anonymization engine 103. According to another embodiment herein, the data anonymization engine 103 is executed as database management system (DBMS) jobs at the target data sources and the applications for improved scalability and performance.

According to another embodiment herein, the data monitoring module 104 continuously monitors access of the determined sensitive data by users and the applications or programs using the generated templates. The data monitoring module 104 continuously documents access of the determined sensitive data by users and the applications in production and non-production environments. The data monitoring module 104 analyzes connections and statements or programs along with their origins and generates alerts for unauthorized activities. When the data anonymization engine 103 completes data anonymization of the sensitive data, the data monitoring module 104 performs continuous and proactive user activity monitoring on the similar and variant data sources and the applications. Subsequently, the data monitoring module 104 provides reports based on user connections and their program executions. The data monitoring module 104 also performs code change monitoring to allow clients to understand how changes in code affected the locations and access of the sensitive data and caused a variation in the locations of the sensitive data and user-level access to programs and application codes. According to an embodiment herein, the data monitoring module 104 monitors connections, that is, who and what connects to the data sources and the applications, where and how connections are made to the data sources and the applications, etc. According to another embodiment herein, the data monitoring module 104 monitors statement access, that is, usage of data manipulation language (DML) statements and data definition language (DDL) statements of SQL queries including dynamic SQL queries to access the sensitive data. The DML statements comprise "select", "update", and "insert" statements. The DDL statements comprise "create", "drop", "delete", and "truncate" statements. According to another embodiment herein, the data monitoring module 104 performs sensitive data centric monitoring where logs are recorded and rules are configured for generating alerts. The data monitoring module 104 monitors user connections across users, terminals, IP addresses, connection protocols, user executed statements, and results. The data monitoring module 104 also filters and/or exports the results of monitoring and the generated alerts to a third-party tool or application. According to an embodiment herein, the integrated platform 101 deploys agents 106 that implement the data monitoring module 104 on target data sources and applications to initiate the monitoring of the sensitive data at the target data sources and the applications. According to an embodiment herein, the data monitoring module 104 continuously monitors the sensitive data at a data source and ensures no access to the sensitive data is missed. According to an embodiment herein, the data monitoring module 104 is implemented in a memory unit at the data source. According to this embodiment herein, the data monitoring module 104 stores logs comprising results of the monitoring post transactions, thereby ensuring no performance impact from monitoring and no requirement for specialized high availability systems.

According to an embodiment herein, the data retirement module 105 determines and retires inactive sensitive data from the determined sensitive data without removing transactional data therefrom using the generated templates. The data retirement module 105 is a sensitive data deidentification module that allows an organization to tokenize or archive inactive sensitive data after a functional use of the inactive sensitive data. According to an embodiment herein, the data retirement module 105 retires the sensitive data based on defined policies and rules that specify inactive sensitive data. According to another embodiment herein, the data retirement module 105 performs minimization of the sensitive data by allowing an organization, for example, an enterprise, to tokenize inactive sensitive data. According to another embodiment herein, the data retirement module 105 performs minimization of the sensitive data by allowing an organization to archive inactive sensitive data. Therefore, on completion of a beneficial lifecycle of the sensitive data, the data retirement module 105 allows enterprises to hide and/or deidentify the sensitive data to prevent unnecessary exposure. For example, if an employee has resigned from an organization, there is no need to maintain the sensitive data related to the employee and increase the risk of exposure of that employee's sensitive data. According to an embodiment herein, the data retirement module 105 allows the organization to hide and/or deidentify that employee's sensitive data by tokenizing the inactive sensitive data and securely deidentifying the inactive sensitive data to reduce the risk of exposure. According to an embodiment herein, the integrated platform 101 deploys agents 106 that implement the data retirement module 105 on target data sources and applications to initiate the retirement of the sensitive data at the target data sources and the applications. The integrated platform 101 allows a user 115 to view results of the analysis performed by the integrated platform 101 on a user device 114a or 114b and receive alerts when the sensitive data is accessed using monitoring templates.

Figure 2:
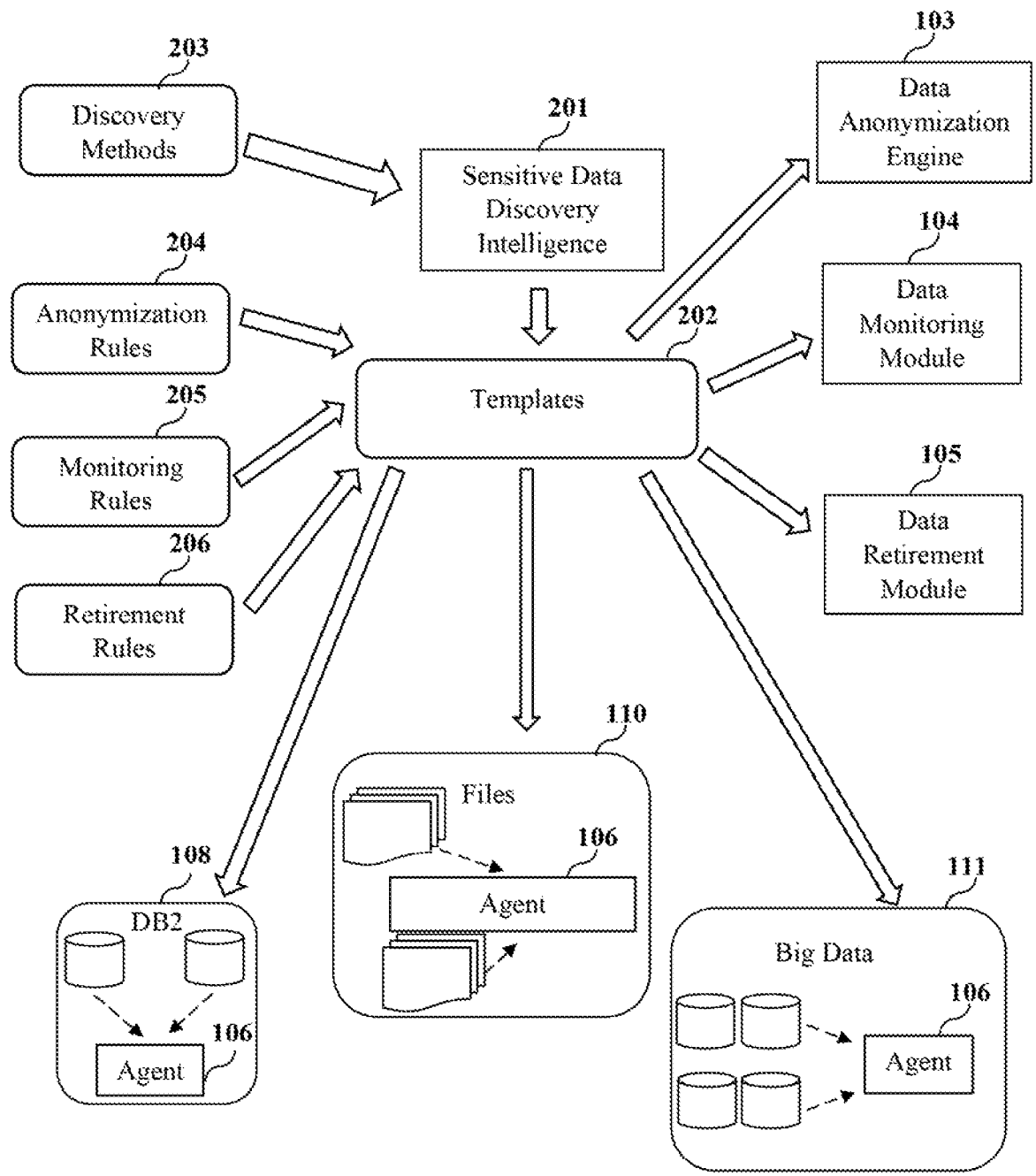
FIG. 2 illustrates a functional block diagram indicating generation and sharing of sensitive data discovery intelligence by a sensitive data discovery engine with a data anonymization engine, a data monitoring module, and a data retirement module of an integrated platform, for managing security of sensitive data across a lifecycle of the sensitive data, according to an embodiment herein.

FIG. 2 illustrates a functional block diagram showing generation and sharing of sensitive data discovery intelligence 201 by the sensitive data discovery engine 102 with the data anonymization engine 103, the data monitoring module 104, and the data retirement module 105 of the integrated platform 101 shown in FIG. 1, for managing security of sensitive data across a lifecycle of the sensitive data, according to an embodiment herein. The integrated platform 101 is a single platform that implements comprehensive and complete sensitive data security from providing peripheral security in terms of access management of sensitive data to a data classification centric security of discovery, anonymization, monitoring, and retirement or minimization of the sensitive data. The integrated platform 101 monitors sensitive data continuously through the data monitoring module 104 and securely deidentifies sensitive data through the data anonymization engine 103. The integrated platform 101 not only provides an integrated approach to data security, but also supports a wide range and number of enterprise data sources from relational databases such as the DB2® relational database management system (RDBMS) 108, files 110, big data sources 111, cloud data sources, mainframes, etc.

The integrated platform 101 implements a number of methods for data protection by means of data discovery, data anonymization, data monitoring, and data retirement. The integrated platform 101 implements data security through a systematic approach by first discovering all the sensitive data within a data source by using the sensitive data discovery engine 102. The integrated platform 101 then executes applicable data protection mechanisms comprising, for example, data masking, encryption, and tokenization to the determined sensitive data by using the data anonymization engine 103. Apart from these anonymization options, the integrated platform 101 also monitors the sensitive data for users as well applications that access the sensitive data by using the data monitoring module 104. The integrated platform 101 then retires any inactive sensitive data from the data source by using the data retirement module 105 that deletes or tokenizes inactive sensitive data, thereby eliminating unnecessary risk.

The sensitive data discovery engine 102 determines sensitive data and identifies application codes that operate on the determined sensitive data as disclosed in the detailed description of FIG. 1. The sensitive data discovery engine 102 scans database tables, columns, and rows using various discovery methods 203 based on defined data classifications consistently across multiple similar and variant data sources to provide discovery results pertaining to the locations of sensitive data. The sensitive data discovery engine 102 generates sensitive data discovery intelligence 201 comprising metadata, data, programs, discovery results such as locations of the determined sensitive data, information of users and programs that access the determined sensitive data by inspecting the identified application codes, etc. According to an embodiment herein, the sensitive data discovery intelligence 201 is an inventory of applications, databases, tables, rows, and columns. The sensitive data discovery engine 102 generates templates 202 comprising the sensitive data discovery intelligence 201 and data security rules. The data security rules comprise masking or anonymization rules 204, monitoring rules 205, and retirement rules 206. The sensitive data discovery engine 102 generates the templates 202 from the results of the discovery process and the shared sensitive data discovery intelligence 201. The integrated platform 101 stores a set of methods and rules, for example, discovery methods 203, anonymization rules 204, monitoring rules 205, and retirement rules 206 in a data store and applies to the set of methods and rules to the templates 202. The discovery methods 203 comprise data classification rules and data discovery rules that identifies which location contains what type of data. The discovery methods 203, the anonymization rules 204, the monitoring rules 205, and the retirement rules 206 are further used for downstream anonymization, pseudonymization, masking, encryption, monitoring, and retirement of the sensitive data. According to an embodiment herein, the sensitive data discovery engine 102 shares the templates 202 with the data anonymization engine 103, the data monitoring module 104, and the data retirement module 105 for performing downstream anonymization, monitoring, and retirement of the sensitive data respectively, as disclosed in the detailed description of FIG. 1. The sensitive data discovery engine 102 shares the templates 202 across pre-production, production and non-production environments as disclosed in the detailed description of FIG. 3. The integrated platform 101 then deploys the agents 106 on the target data sources, for example, 108, 110, 111, etc., in the pre-production, production and non-production environments as required.

Figure 3:
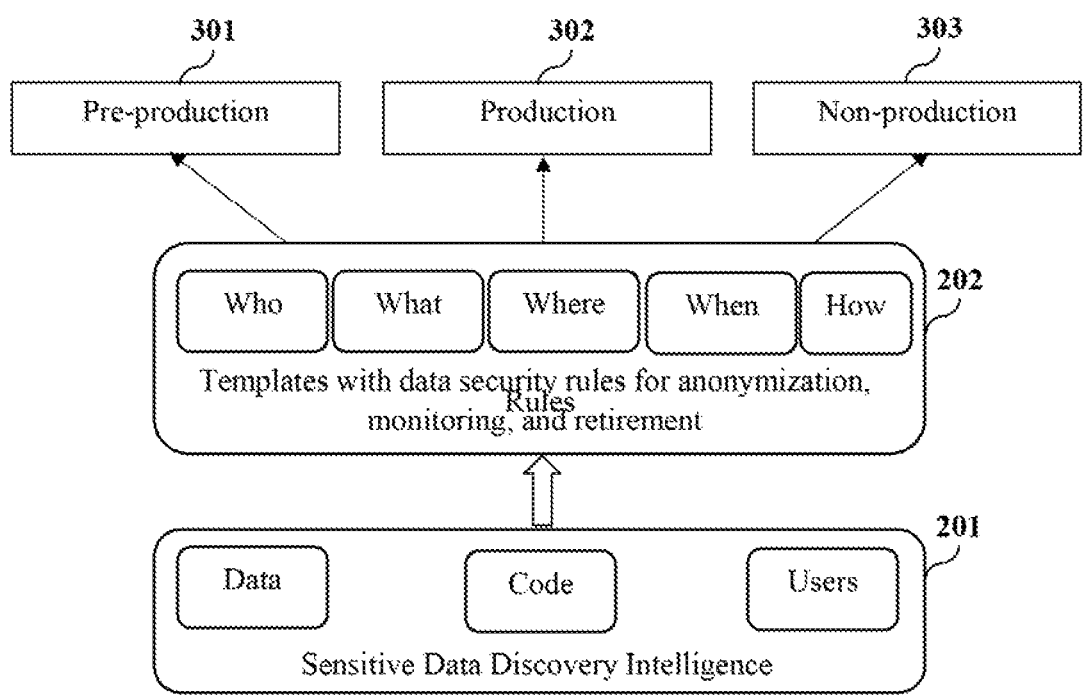
FIG. 3 illustrates a block diagram indicating a usage of sensitive data discovery intelligence and corresponding templates in pre-production, production and non-production environments, according to an embodiment herein.

FIG. 3 illustrates a block diagram showing a usage of sensitive data discovery intelligence 201 in a pre-production environment 301, a production environment 302, and a non-production environment 303 according to an embodiment herein. The sensitive data discovery engine 102 of the integrated platform 101 shown in FIG. 1, generates the sensitive data discovery intelligence 201 and templates 202 with the data security rules as disclosed in the detailed description of FIG. 1. The templates 202 provide information on who accesses the sensitive data, what sensitive data is accessed, from where connections are made to the sensitive data, when the sensitive data is accessed, and how the sensitive data is accessed. According to an embodiment herein, the sensitive data discovery engine 102 receives and inserts data security rules, for example, discovery methods, anonymization rules, and other configuration rules for anonymizing, monitoring, and retiring the sensitive data, into the templates 202 for managing the security of the sensitive data across the lifecycle of the sensitive data. According to an embodiment herein, the sensitive data discovery engine 102 receives the data security rules based on user selection inputs and configuration inputs entered via a graphical user interface (GUI) rendered on a user device by the sensitive data discovery engine 102. The sensitive data discovery engine 102 shares the templates 202 with the data security rules across the pre-production environment 301, the production environment 302, and the non-production environment 303. The sensitive data discovery engine 102 configures the templates 202 to secure the determined sensitive data across the lifecycle of the determined sensitive data in the pre-production environment 301, the production environment 302, and the non-production environment 303.

In the pre-production environment 301, the production environment 302, and the non-production environment 303, the agents 106 deployed by the integrated platform 101 at each of the similar and variant data sources, receive and process the templates 202 with the data security rules from the sensitive data discovery engine 102 for performing downstream anonymization such as masking, encryption, tokenization, etc., monitoring, and retirement of the sensitive data. The agents 106 deployed by the integrated platform 101 at each of the similar and variant data sources execute computer programs defined by the downstream data protection modules, that is, the data anonymization engine 103, the data monitoring module 104, and the data retirement module 105 for performing downstream anonymization, monitoring, and retirement of the sensitive data respectively. According to an embodiment herein, the agents 106 deployed by the integrated platform 101 at each of the similar and variant data sources perform static data masking and dynamic data masking in the pre-production environment 301. According to an embodiment herein, the agents 106 deployed by the integrated platform 101 at each of the similar and variant data sources perform dynamic data masking, data monitoring, and data retirement in the production environment 302. According to an embodiment herein, the agents 106 deployed by the integrated platform 101 at each of the similar and variant data sources perform static data masking and sub-setting in the non-production environment 303, for example, a development environment, a testing environment, a training environment, etc.

Figure 4:
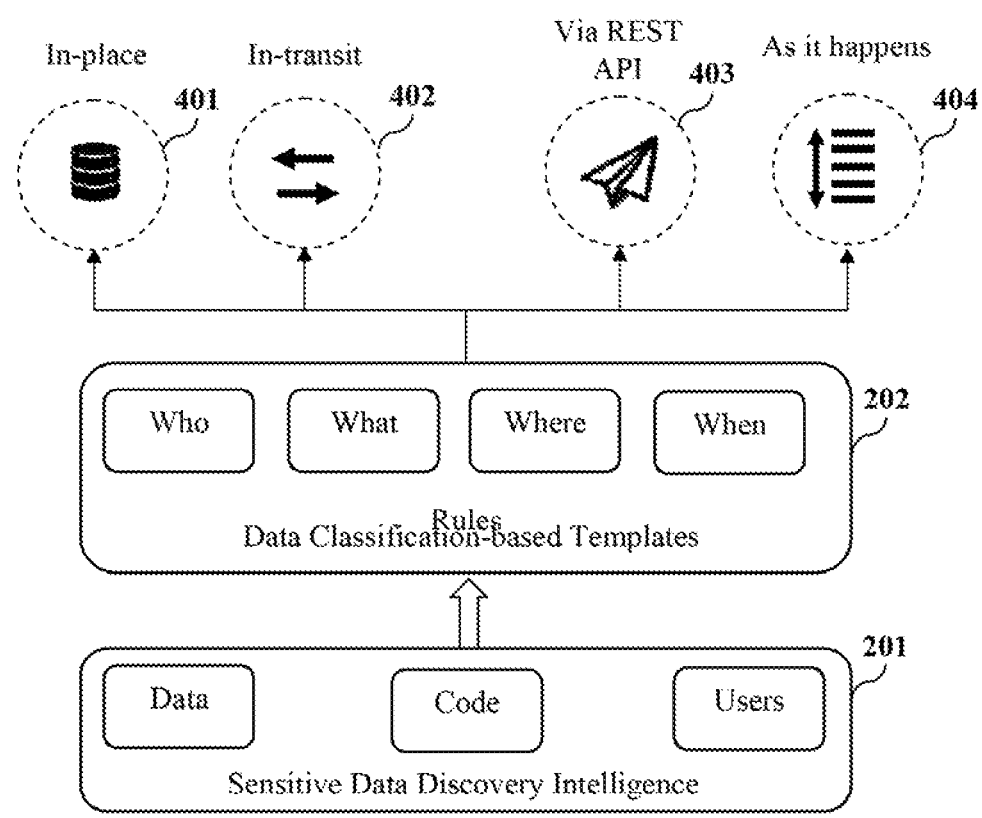
FIG. 4 illustrates a block diagram indicating a usage of sensitive data discovery intelligence and corresponding templates for statically masking sensitive data.

FIG. 4 illustrates a block diagram indicating a usage of sensitive data discovery intelligence 201 and corresponding templates 202 for statically masking sensitive data. The sensitive data discovery engine 102 of the integrated platform 101 shown in FIG. 1, generates the sensitive data discovery intelligence 201 and data classification-based templates 202 with the data security rules as disclosed in the detailed description of FIG. 1. According to an embodiment herein, the templates 202 provide information on who is allowed to access the sensitive data, what sensitive data is accessible, from where connections are allowed to be made to the sensitive data, and when the sensitive data is accessible. Using the data classification-based templates 202, the static data masking module statically masks the sensitive data using different data masking techniques available at each of the data sources. The different data masking techniques comprise, for example, "in-place" data masking 401, "in-transit" data masking 402, "REST API" data masking 403, and "as-it-happens" data masking 404.

In the "in-place" data masking technique 401, the static data masking module implemented in the agent 106 shown in FIG. 1, deployed at each of the data sources masks the sensitive data. The static data masking module executes the "in-transit" data masking technique 402 when data scrambling cannot be performed in applications, for example, mainframes. In the "in-transit" data masking technique 402, the static data masking module extracts the sensitive data from a data source, masks the extracted sensitive data, and returns the masked sensitive data to the same data source or another data source. The static data masking module executes the "REST API" data masking technique 403 when there are files that enter a landing zone. Via the representational state transfer (REST) API, the sensitive data discovery engine 102 scans an incoming file, finds sensitive data using natural language processing and then, the static data masking module uses data anonymization methods to create a new anonymized file that enters an anonymized landing zone. The static data masking module performs this data anonymization near real time without any manual intervention. In the "as-it-happens" data masking technique 404, the static data masking module masks the sensitive data incrementally as and when new data is added into each of the data sources. According to another embodiment herein, the static data masking module executes an "on-demand" data masking technique when sensitive data cannot be copied to another data location due to infrastructural constraints. In the "on-demand" data masking technique, the static data masking module performs dynamic data masking on the sensitive data to generate static results. In the "on-demand" data masking technique, the static data masking module creates masked views of the sensitive data at a data source using dynamic data masking templates, scrambles and copies the sensitive data on demand. The integrated platform 101 sends masking rules to the target data sources and applications and initiates the static data masking at the target data sources and applications. After completion of static data masking, the sensitive data is replaced with realistic but non-meaningful data in the target data sources and applications. According to another embodiment herein, the static data masking module completely secures the sensitive data in pre-production, production, and non-production environments.

FIG. 5 illustrates a block diagram indicating a usage of sensitive data discovery intelligence 201 and corresponding templates 501 for dynamically masking sensitive data. The sensitive data discovery engine 102 of the integrated platform 101 shown in FIG. 1, generates the sensitive data discovery intelligence 201 and templates 501 with masking rules as disclosed in the detailed description of FIG. 1. According to an embodiment herein, the templates 501 provide information on who is allowed to access the sensitive data, what sensitive data is accessible, from where connections are allowed to be made to the sensitive data, and when the sensitive data is accessible. Using the templates 501, the dynamic data masking module dynamically masks the sensitive data using different data masking techniques, for example, at a database layer 502, an application layer via a database 503, an application layer via an application programming interface (API) 504, and an application layer via a proxy 505. According to an embodiment herein, the dynamic data masking module optimizes dynamic data masking for production controls. According to another embodiment herein, the dynamic data masking module completely secures the sensitive data in pre-production, production, and non-production environments.

Figure 6A:
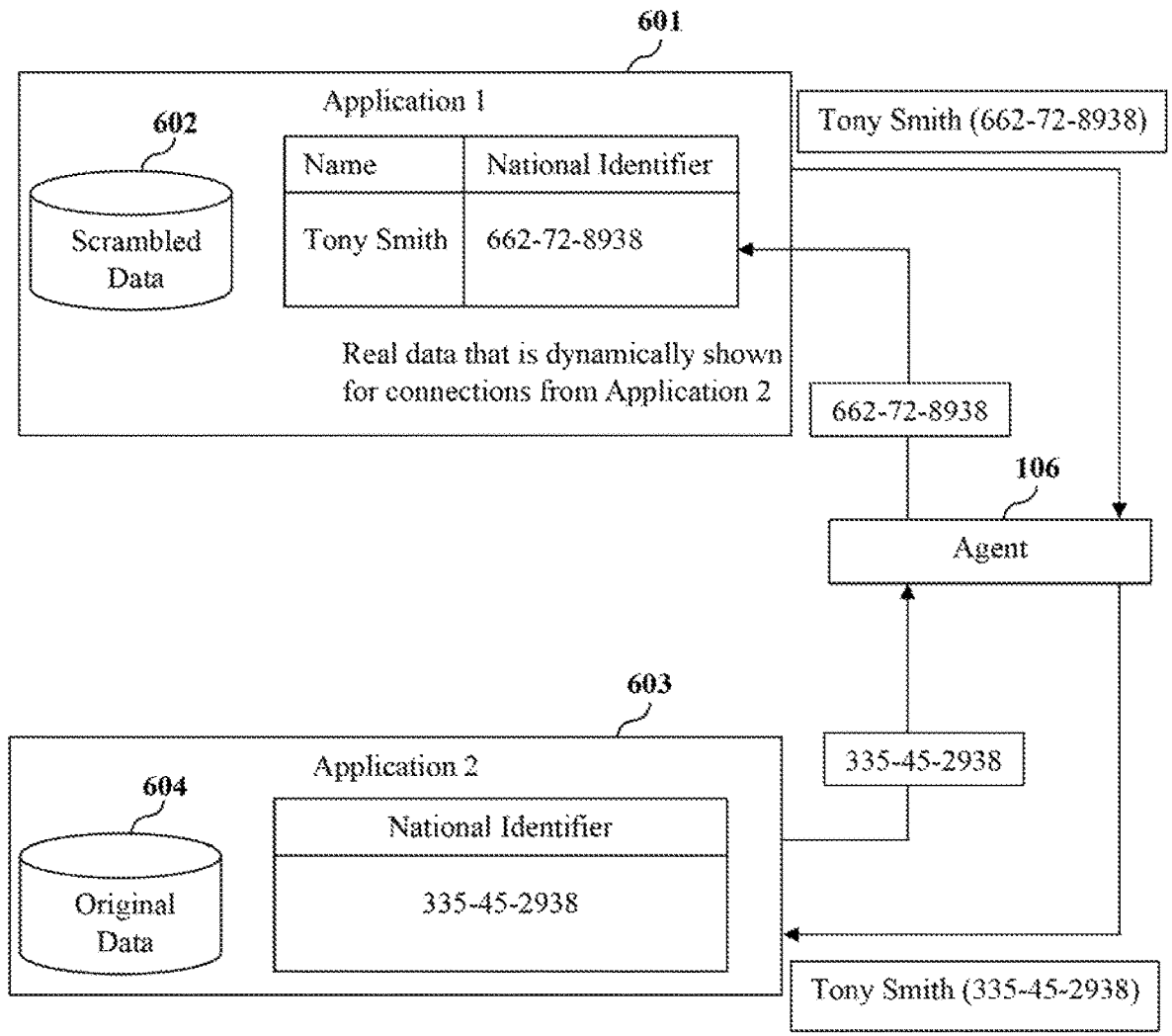
FIG. 6A illustrates a block diagram indicating a process of blended data masking of sensitive data executed by the data anonymization engine of the integrated platform through an agent deployed in an application, according to an embodiment herein.

FIG. 6A illustrates an implementation of blended data masking of sensitive data by the data anonymization engine 103 of the integrated platform 101 shown in FIG. 1, through an agent 106 deployed in an application, according to an embodiment herein. The data anonymization engine 103 in the integrated platform 101 implements flexible blended data masking depending on the application architecture. Deployment of the agent 106 that executes the data anonymization engine 103 internally within a database allows parallel processing and job engines to deliver performance-efficient blended data masking speeds. Consider an example where the agent 106 is deployed in an application, namely, Application 1 601, comprising a database 602 as shown in FIG. 6A. As shown in FIG. 6A, the agent 106 implementing the data anonymization engine 103 scrambles or masks the sensitive data stored in a "national identifier" column in the database 602. Application 1 601, therefore, has the "national identifier" column scrambled in the database 602. That is, the name tagged to a particular national identifier in the database 602 is fake. For example, the name "Tony Smith" that is tagged to the national identifier "662-72-8938" in the database 602 shown in FIG. 6A, does not actually have the national identifier "662-72-8938". Application 2 603 that contains real data, that is, the national identifier "335-45-2938" in a database 604, connects to Application 1 601 via the agent 106 deployed in Application 1 601. The agent 106 then performs dynamic data masking (DDM) on Application 2 603 and temporarily masks the national identifier from "335-45-2938" to "662-72-8938". The connection from Application 2 603, therefore, finds a match in Application 1 601 that has a name associated with the national identifier to which Application 2 603 connects, and therefore, returns the name "Tony Smith". Data that is then retrieved into Application 2 603 passes through the agent 106 again, which converts the national identifier back to the original national identifier "335-45-2938", while keeping the name "Tony Smith" the same.

Figure 6B:
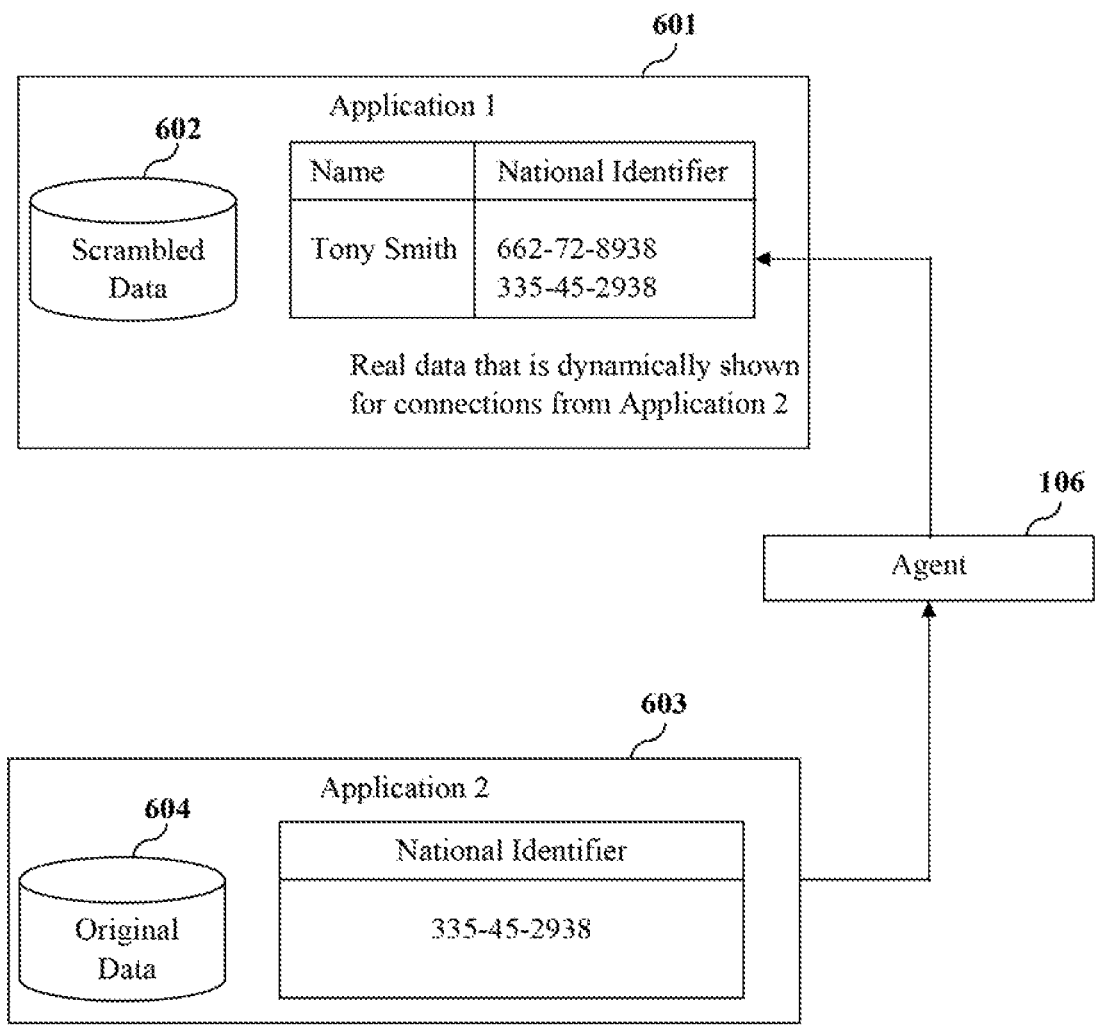
FIG. 6B illustrates a block diagram indicating a process of hybrid data masking of sensitive data executed by the data anonymization engine of the integrated platform through an agent deployed in an application, according to an embodiment herein.

FIG. 6B illustrates an implementation of hybrid data masking of sensitive data by the data anonymization engine 103 of the integrated platform 101 shown in FIG. 1, through an agent 106 deployed in an application, according to an embodiment herein. The data anonymization engine 103 in the integrated platform 101 implements flexible hybrid data masking. Deployment of the agent 106 that executes the data anonymization engine 103 internally within the database allows parallel processing and job engines to deliver performance-efficient hybrid data masking speeds. Consider an example where the agent 106 is deployed in an application, namely, Application 1 601, comprising a database 602 as shown in FIG. 6B. As shown in FIG. 6B, the agent 106 implementing the data anonymization engine 103 scrambles or masks the sensitive data stored in a "national identifier" column in the database 602. Application 1 601, therefore, has the "national identifier" column scrambled in the database 602. That is, the name tagged to a particular national identifier in the database 602 is fake. For example, the name "Tony Smith" that is tagged to the national identifier "662-72-8938" in the database 602 shown in FIG. 6B, does not actually have the national identifier "662-72-8938". Application 2 603 that contains real data, that is, the national identifier "335-45-2938" in a database 604, connects to Application 1 601 via the agent 106 deployed in Application 1 601. The agent 106 is configured to recognize all connections from Application 2 603 as trusted or authorized connections. Since the connection from Application 2 603 is considered as an authorized connection, the agent 106 performs dynamic data masking on Application 1 601 such that for connections from Application 2 603, the agent 106 reverses the masked national identifier to show the real data, that is, the real national identifier "335-45-2938". Application 2 603 therefore sees the real national identifier "335-45-2938".

The integrated platform 101 provides an integrated solution that offers encryption and tokenization along with masking methods across multiple similar and variant data sources and applications. Through the agent 106, the data anonymization engine 103 of the integrated platform 101 implements multiple anonymization methods comprising masking methods, encryption methods, and tokenization methods for anonymizing the sensitive data based on the requirements. For example, the data anonymization engine 103 masks the sensitive data by replacing the sensitive data randomly; replacing the sensitive data with a constant; replacing the sensitive data with a number within a range; retaining or changing a few digits of the sensitive data; performing data masking using repositories; shuffling characters of the sensitive data; executing cryptographic function based masking algorithms such as an advanced encryption standard (AES)-based masking algorithm, a secure hash algorithm (SHA), etc. Moreover, the data anonymization engine 103 encrypts the sensitive data, for example, by performing permutation-substitution (PS) based format preserving encryption methods; by executing AES-based format preserving encryption algorithms, etc. Furthermore, the data anonymization engine 103 tokenizes the sensitive data, for example, by performing reversible cryptographic tokenization with a vault, reversible non-cryptographic tokenization with a vault, irreversible cryptographic authenticatable tokenization without a vault, irreversible cryptographic non-authenticatable tokenization without a vault, irreversible non-cryptographic authenticatable tokenization without a vault, irreversible non-cryptographic non-authenticatable tokenization without a vault, and reversible cryptographic tokenization without a vault.

Figure 7:
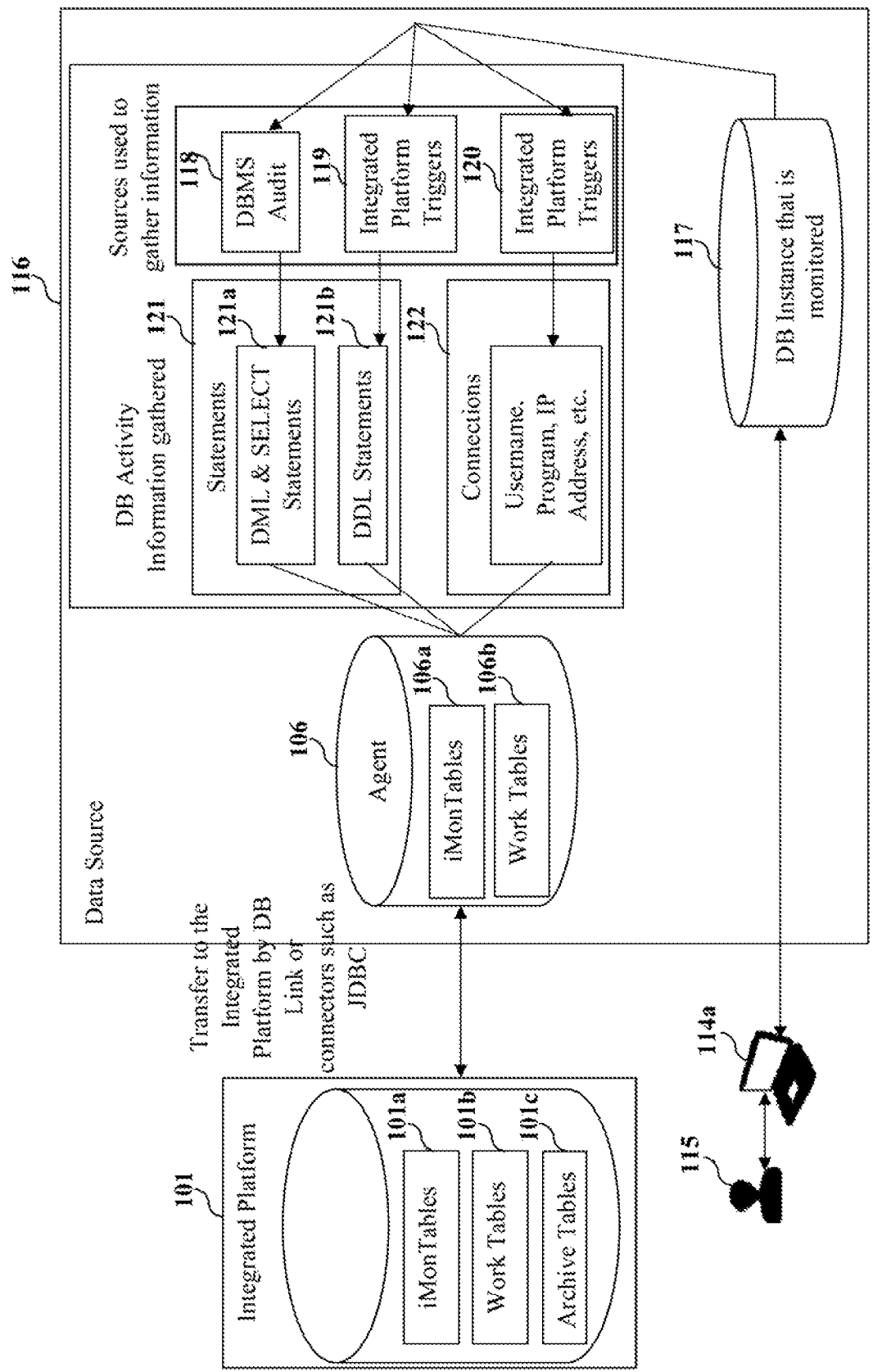
FIG. 7 illustrates a functional block diagram showing an implementation of continuous monitoring of access of sensitive data by the data monitoring module of the integrated platform through an agent deployed at a data source, according to an embodiment herein.

FIG. 7 illustrates a functional block diagram showing an implementation of continuous monitoring of access of sensitive data by the data monitoring module 104 of the integrated platform 101 shown in FIG. 1, through an agent 106 deployed at a data source 116, according to an embodiment herein. According to an embodiment herein, the data monitoring module 104 monitors connections to the sensitive data in terms of who and what connects to the data sources and the applications having the sensitive data, to what sensitive data a user connects, where and how connections are made to the data sources and the applications having the sensitive data, etc. The data monitoring module 104 monitors the connections and statements, that is, the programs executed. The data monitoring module 104 logs connections to a data source, for example, an Oracle® database through database triggers, or to an SQL server database through archived log data. The data monitoring module 104 defines procedures called database triggers that are executed, for example, when "insert", "update", "delete", and other DDL and DML statements of SQL queries are issued against a table in an Oracle® database. That is, when a user enters "insert", "update", and "delete" statements in SQL queries to access sensitive data in a table of the Oracle® database, the data monitoring module 104 executes the database triggers for logging the connections to the Oracle® database. The data monitoring module 104 also accesses the archived log data from an SQL server database to determine and log the connections to the SQL server database. The data monitoring module 104 retrieves user login data from system tables on a target system and collects the login data on the integrated platform 101. According to another embodiment herein, the data monitoring module 104 monitors access to the sensitive data through statements, for example, "select", "insert", "update", "delete", and "alter", of SQL queries. The data monitoring module 104 collects the statements executed by each connection into the integrated platform 101 from system tables of an Oracle® database or an SQL server database using logon triggers or archive logs. According to another embodiment herein, the data monitoring module 104 performs sensitive data classification-centric monitoring. Once the information of the connections and the statements are received by the integrated platform 101, the integrated platform 101 matches the information against the sensitive data discovery intelligence generated by the sensitive data discovery engine 102 shown in FIG. 1, to determine which statements are accessing the sensitive data.

Consider an example where a user 115 logs into a data source 116 through a user device 114a shown in FIG. 7, and accesses sensitive data. The integrated platform 101 deploys an agent 106 that implements the data monitoring module 104 and tables 106a and 106b in the data source 116. The user device 114a connects to a database instance 117 that is monitored by the agent 106. The agent 106 gathers user activity information by performing a database management system (DBMS) audit 118 and by using triggers 119 and 120. The agent 106 gathers connection information 122 comprising, for example, username, program, IP address, etc., and statements 121, for example, data manipulation language (DML) statements and select statements 121a, data definition language (DDL) statements 121b, etc., executed by each connection to the data source 116 into the integrated platform 101 and processes the gathered activity information. At configurable polling intervals, the agent 106 transfers the processed activity information to the integrated platform 101, for example, by creating a database link to the integrated platform 101, or by using connectors such as Java database connectivity (JDBC). The data monitoring module 104 implemented in the integrated platform 101 stores the transferred activity information in tables 101a, 101b, and 101c. The data monitoring module 104 also analyzes the transferred activity information using monitoring templates comprising the sensitive data intelligence and the monitoring rules and generates data security alerts based on interest specified as configuration parameters. The configuration parameters comprise, for example, unique data classifications, users, frequency, volume of data, etc.

Figure 8:
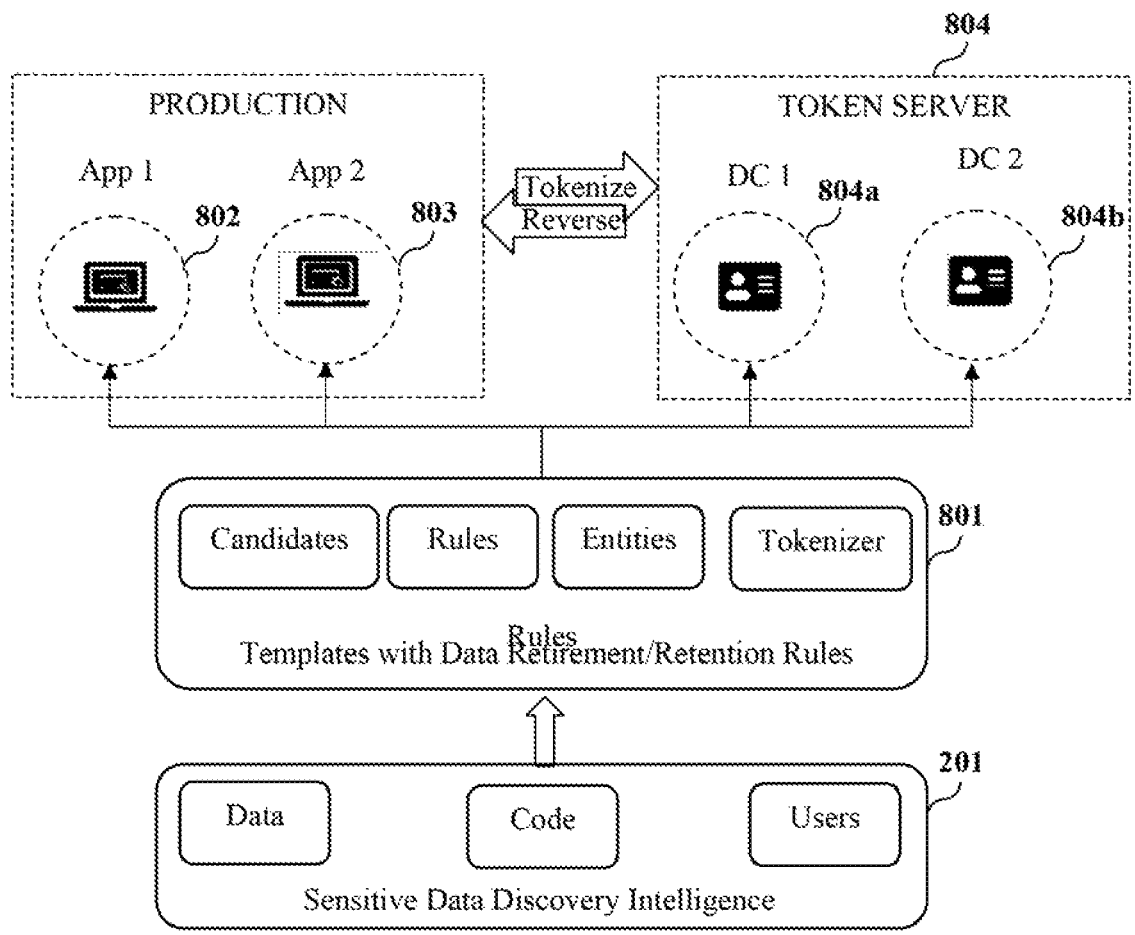
FIG. 8 illustrates a block diagram indicating a usage of sensitive data discovery intelligence and corresponding templates for retiring sensitive data, according to an embodiment herein.

FIG. 8 illustrates a block diagram indicating a usage of sensitive data discovery intelligence 201 and corresponding templates 801 for retiring sensitive data, according to an embodiment herein. The sensitive data discovery engine 102 of the integrated platform 101 shown in FIG. 1, generates the sensitive data discovery intelligence 201 and templates 801 with data retirement or retention rules as disclosed in the detailed description of FIG. 1. According to an embodiment herein, the templates 801 provide information on candidates, retirement rules, entities, and tokenizers for tokenizing the sensitive data. According to an embodiment herein, "candidates" refer, for example, to data sources or locations of the sensitive data undergoing data retirement, and "entities" refer to business areas, for example, employees, customers, vendors, etc. According to an embodiment herein, the data retirement module 105 of the integrated platform 101 shown in FIG. 1, tokenizes the inactive sensitive data instead of removing the inactive sensitive data. The data retirement module 105 configures a token format to suit a unique data classification. The data retirement module 105 encrypts and stores a token-to-original data mapping in a token server 804. According to an embodiment herein, the data retirement module 105 removes the token-to-original data mapping from the token server 804 post testing. The data retirement module 105 executes data retirement without changes to the structures of the locations of the sensitive data, for example, schemas, tables, etc., and without changing performance of the data sources. Using the templates 801, in an example, the data retirement module 105 retires or tokenizes inactive sensitive data from applications 802 and 803 in a production environment and stores the token-to-data mapping in data centers 804a and 804b of the token server 804 respectively as shown in FIG. 8. Furthermore, in an example, the data retirement module 105 reverses the tokenization post testing.

Figure 9:
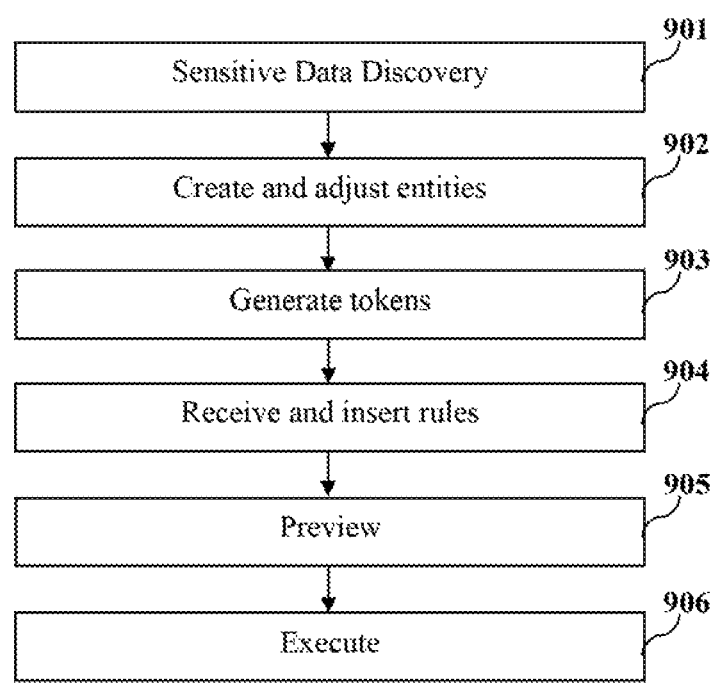
FIG. 9 illustrates a flowchart indicating a data retirement process executed by a data retirement module of the integrated platform for retiring sensitive data, according to an embodiment herein.

FIG. 9 illustrates a flowchart indicating a data retirement process executed by a data retirement module 105 of the integrated platform 101 shown in FIG. 1, for retiring sensitive data, according to an embodiment herein. The sensitive data discovery engine 102 of the integrated platform 101 shown in FIG. 1, performs sensitive data discovery 901 to find and classify sensitive data. The data retirement module 105 then creates and adjusts 902 entities, for example, employees, customers, vendors, etc. For example, the data retirement module 105 selects a "driving table" and data classifications to include in the tokenization. Each data classification has an associated tokenization method or tokenizer. In the step of tokenization, the data retirement module 105 generates 903 tokens across all data sources as a validation step. A user, for example, a system administrator, authors retirement rules, for example, "Remove employee data of all employees who are not in employment over 5 years", via a graphical user interface (GUI) provided by the integrated platform 101. The data retirement module 105 receives and inserts 904 the retirement rules via the GUI into one or more retirement templates generated by the sensitive data discovery engine 102. The retirement templates, therefore, comprise the sensitive data discovery intelligence and the retirement rules. The retirement rules are configurable, for example, based on "where" clauses or complex SQL statements. To determine whether the retirement rules are capturing the correct candidates, the data retirement module 105 allows the user to preview 905 the retirement rules and confirm their accuracy. The data retirement module 105 then executes or runs 906 the retirement rules. The execution time depends on the number of candidates. Subsequent runs performed periodically consumer less time.

FIGS. 10A-10B illustrate tabular representations indicating a retirement of sensitive data executed by the data retirement module 105 of the integrated platform 101 shown in FIG. 1. Consider an example where the data retirement module 105 performs a retirement of sensitive data in a data source, for example, a table, as shown in FIG. 10A. In this example, a user, for example, a system administrator, configures a retirement rule to dispose sensitive data of employees whose end date of employment with an organization is earlier than 2011. According to an embodiment herein, the data retirement module 105 tokenizes the sensitive data without removing the sensitive data. The system administrator configures a token format according to a unique data classification, for example, national identifier. As shown in FIG. 10B, the data retirement module 105 tokenizes the sensitive data, for example, the national identifiers, of employees who left employment with the organization earlier than 2011. For example, the data retirement module 105 tokenizes the national identifier "654-33-6511" of Kerry Jones shown in FIG. 10A into "N00000000000000009532" as shown in FIG. 10B. The data retirement module 105 stores the token-to-original data mapping in a token server 804 as shown in FIG. 8. According to an embodiment herein, the data retirement module 105 removes the token-to-original data mapping from the token server 804 post testing.

Figure 11A:
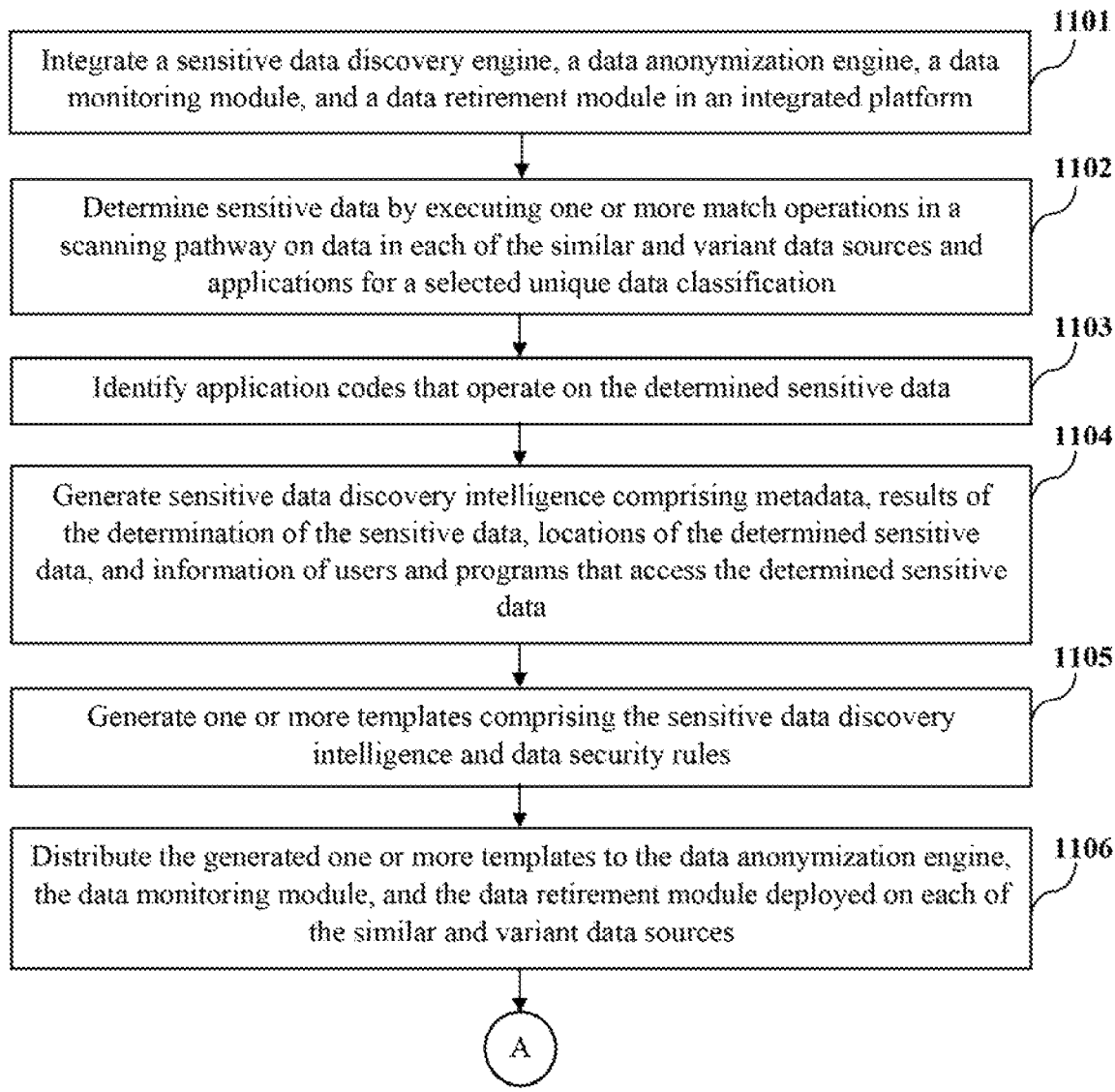
FIGS. 11A-11B jointly illustrate a flowchart explaining a computer-implemented method for integrating and managing security of sensitive data across a lifecycle of the sensitive data, according to an embodiment herein.
Figure 11B:
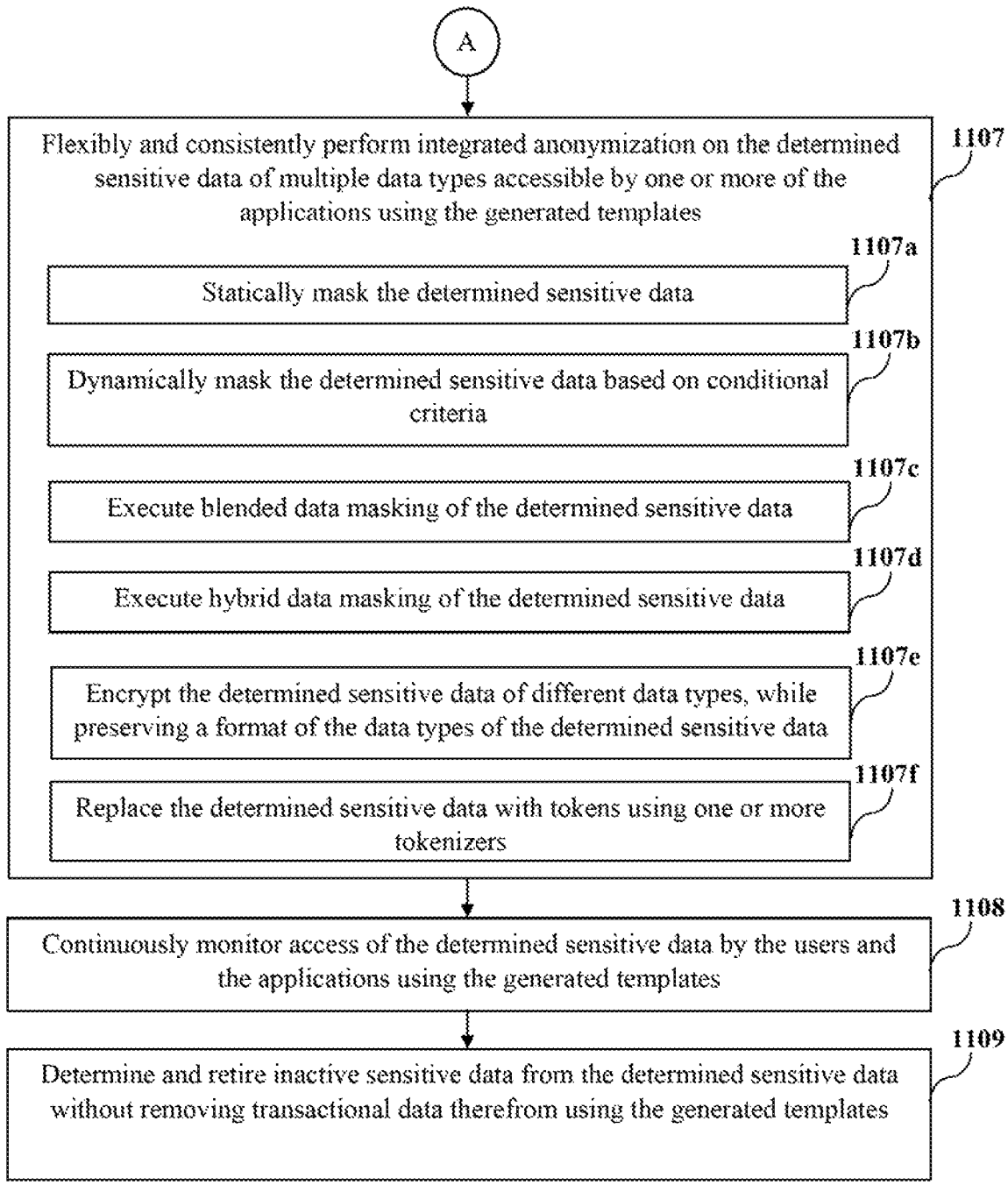

FIGS. 11A-11B jointly illustrate a flowchart explaining a computer-implemented method for integrating and managing security of sensitive data across a lifecycle of the sensitive data, according to an embodiment herein. The computer-implemented method disclosed herein comprises integrating 1101 a sensitive data discovery engine 102, a data anonymization engine 103, a data monitoring module 104, and a data retirement module 105 in an integrated platform 101 as shown in FIG. 1. The integrated platform 101 is in communication with each of multiple similar and variant data sources and applications comprising, for example, relational databases, hierarchical databases, file systems, text, documents, external files, complex data locations, composite data locations, unvalidated fields, binary large objects, character large objects, key value pairs, phantom tables, structured data sources, unstructured data sources, mainframes, cloud data sources, big data sources, etc. The computer-implemented method disclosed herein further comprises: determining 1102 sensitive data by executing one or more match operations in a scanning pathway on data in each of the similar and variant data sources and applications for a selected unique data classification; identifying 1103 application codes that operate on the sensitive data; generating 1104 sensitive data discovery intelligence comprising metadata, results of the determination of the sensitive data, locations of the determined sensitive data, and information of users and programs that access the determined sensitive data by inspecting the identified application codes, generating 1105 one or more templates comprising the sensitive data discovery intelligence and data security rules for managing the security of the sensitive data across the lifecycle of the sensitive data; distributing 1106 the generated templates to the data anonymization engine 103, the data monitoring module 104, and the data retirement module 105 deployed on each of the similar and variant data sources; flexibly and consistently performing an integrated anonymization 1107 on the sensitive data of different data types accessible by one or more of the applications using the generated templates based on a selected data classification and a nature of an application environment; continuously monitoring 1108 access of the sensitive data by the users and the applications using the generated templates; and determining and retiring 1109 inactive sensitive data from the sensitive data without removing transactional data therefrom using the generated templates as disclosed in the detailed description of FIGS. 1-2.

In the flexible and consistent anonymization 1107 of the sensitive data, the data anonymization engine 103 statically masks 1107a the sensitive data in the locations of the determined sensitive data, incrementally when new sensitive data is introduced in the similar and variant data sources and the applications, when the sensitive data is in transition between the similar and variant data sources and the applications, and via an application programming interface as disclosed in the detailed description of FIG. 1 and FIG. 4. Moreover, the data anonymization engine 103 dynamically masks 1107b the sensitive data at one or more of a database layer, an application layer via a database, an application layer via an API, and an application layer via a proxy as disclosed in the detailed description of FIG. 1 and FIG. 5. Furthermore, the data anonymization engine 103 executes blended data masking 1107c as disclosed in the detailed description of FIG. 1 and FIG. 6A. Furthermore, the data anonymization engine 103 executes hybrid data masking 1107d as disclosed in the detailed description of FIG. 1 and FIG. 6B. Furthermore, the data anonymization engine 103 encrypts 1107e the sensitive data of different data types, while preserving a format of the data types of the sensitive data; and replaces 1107f the sensitive data with tokens using one or more tokenizers as disclosed in the detailed description of FIG. 1.

According to an embodiment herein, the integrated platform 101 disclosed herein implements one or more specific computer programs for integrating and managing security of sensitive data across a lifecycle of the sensitive data. The computer-implemented method disclosed herein improves the functionality of a computer and provides an improvement in data security technology related to integrating and managing security of sensitive data across a lifecycle of the sensitive data as follows: On implementing the method disclosed herein, multiple data protection modules such as the sensitive data discovery engine 102, the data anonymization engine 103, the data monitoring module 104, and the data retirement module 105 are integrated in the integrated platform 101 for managing security of sensitive data across a lifecycle of the sensitive data. The sensitive data discovery engine 102 in the integrated platform 101 configures scanning pathways and implements a scorecard mechanism to identify a majority of the sensitive data, for example, within 2 or 3 iterations. The sensitive data discovery engine 102 discovers sensitive data even in difficult to find locations, for example, complex columns, free text fields, description fields, unvalidated fields, binary large objects, character large objects, key value pairs, phantom tables, etc. The sensitive data discovery engine 102 identifies complex columns, free text fields, description fields, etc., using the match operations disclosed in the detailed description of FIG. 1.

According to an embodiment herein, in addition to source systems spanning multiple similar and variant data sources and applications, the sensitive data discovery engine 102 further scans code to identify which users or programs have access to the sensitive data. The sensitive data discovery engine 102 initiates the discovery process by interpreting the metadata of a database. The sensitive data discovery engine 102 then determines the sensitive data by executing one or more match operations in a scanning pathway on data in each of the similar and variant data sources and applications for a selected unique data classification. The sensitive data discovery engine 102 then, through the use of integrated computer programs, identifies application codes that operate on the sensitive data, generates sensitive data discovery intelligence, and generates templates comprising the sensitive data discovery intelligence and the data security rules. The sensitive data discovery engine 102 then distributes the templates to other data protection modules such as the data anonymization engine 103, the data monitoring module 104, and the data retirement module 105 across an enterprise for use in downstream data security operations, for example, data anonymization such as data masking, data encryption, data tokenization, etc., data mapping, data monitoring, data retirement, etc.

Then, through the use of integrated computer programs and the templates, the data anonymization engine 103 flexibly and consistently performs integrated anonymization on the sensitive data of different data types accessible by one or more of the applications, the data monitoring module 104 continuously monitors access of the sensitive data by the users and the applications, and the data retirement module 105 determines and retires or tokenizes inactive sensitive data from the sensitive data without removing transactional data therefrom. According to an embodiment herein, the integrated platform 101 deploys the data anonymization engine 103, the data monitoring module 104, and the data retirement module 105 on agents 106 running locally on the similar and variant data sources and the applications for performing the downstream data security operations.

According to an embodiment herein, the focus of the integrated platform 101 and the computer-implemented method is on an improvement to data security technology and computer functionalities, and not on tasks for which a generic computer is used in its ordinary capacity. Rather, the integrated platform 101 and the computer-implemented method disclosed herein are directed to a specific improvement to the way the processors in the system 100 shown in FIG. 1 operate, embodied in, for example, integrating the sensitive data discovery engine 102, the data anonymization engine 103, the data monitoring module 104, and the data retirement module 105 in the integrated platform 101; determining sensitive data; identifying application codes that operate on the sensitive data; generating sensitive data discovery intelligence; generating the templates; distributing the templates with the data security rules to the data anonymization engine 103, the data monitoring module 104, and the data retirement module 105 deployed on each of the similar and variant data sources; flexibly and consistently anonymizing the sensitive data; continuously monitoring access of the sensitive data by the users and the applications; and determining and retiring inactive sensitive data from the sensitive data without removing transactional data therefrom.

According to an embodiment herein, in the computer-implemented method, the design and the flow of data and interactions between the sensitive data discovery engine 102, the data anonymization engine 103, the data monitoring module 104, and the data retirement module 105 in the integrated platform 101 and in the agents 106 deployed on the similar and variant data sources and applications are deliberate, designed, and directed. The interactions between the sensitive data discovery engine 102, the data anonymization engine 103, the data monitoring module 104, and the data retirement module 105 in the integrated platform 101 and in the agents 106 deployed on the similar and variant data sources and applications allow the integrated platform 101 to integrate and manage security of sensitive data across a lifecycle of the sensitive data. The steps performed by the integrated platform 101 disclosed above requires nine or more separate computer programs and subprograms, the execution of which cannot be performed by a person using a generic computer with a generic program. The steps performed by the integrated platform 101 disclosed above are tangible, provide useful results, and are not abstract. The hardware and software implementation of the system 100 disclosed herein comprising the integrated platform 101 and one or more processors is an improvement in computer related and data security technology.

The computer-implemented method and the system 100 disclosed herein integrate data anonymization, data monitoring, and data retirement with sensitive data discovery by using the sensitive data discovery intelligence generated and shared from the discovery of the sensitive data, which ensures that all the locations of the sensitive data across complex source systems are identified and the manual effort and risk are minimized. The system 100 disclosed herein covers a large number of data sources, on-premise and on cloud, enterprise applications, etc., and is closely integrated with shared, sensitive data discovery intelligence, where the sensitive data discovery intelligence is shared for downstream data security operations such as data anonymization, data monitoring, and data retirement. The integrated platform 101 is implemented enterprise-wide across structured, unstructured, cloud and big data sources. The computer-implemented method and the system 100 disclosed herein, therefore, scales discovery of the sensitive data across multiple similar and variant data sources including complex columns, composite columns, binary large objects, character large objects, key value pairs, phantom tables, etc., and applications, and allows enterprises to conveniently track the locations of the sensitive data and take appropriate measures to protect the sensitive data.

In addition to identifying the sensitive data and the locations of the sensitive data, the computer-implemented method and the system 100 disclosed herein determines the users and the programs or the application codes that have access to and that have accessed the sensitive data and also identify reasons and attributes for classifying sensitive data. The computer-implemented method and the system 100 disclosed herein integrate and manage security of sensitive data across a lifecycle of the sensitive data from discovery to anonymization, monitoring, and retirement, thereby ensuring consistent anonymization and complete protection of the sensitive data. The integration provided by the computer-implemented method and the system 100 disclosed herein allows the sensitive data discovery intelligence of one data protection module, for example, the sensitive data discovery engine 102, to be shared or used by other data protection modules, for example, the data anonymization engine 103, the data monitoring module 104, and the data retirement module 105 for downstream sensitive data security operations, for example, data anonymization or masking, data monitoring, data retirement, etc. Although architecture of an application is distributed, the computer-implemented method and the system 100 disclosed herein stores the sensitive data discovery intelligence in one location in the integrated platform 101. The integrated platform 101 provides consistency of discovery results across all data sources, preserves data, preserves performance integrity, has enterprise coverage, is minimally invasive, has low performance overheads, etc.

Figure 12:
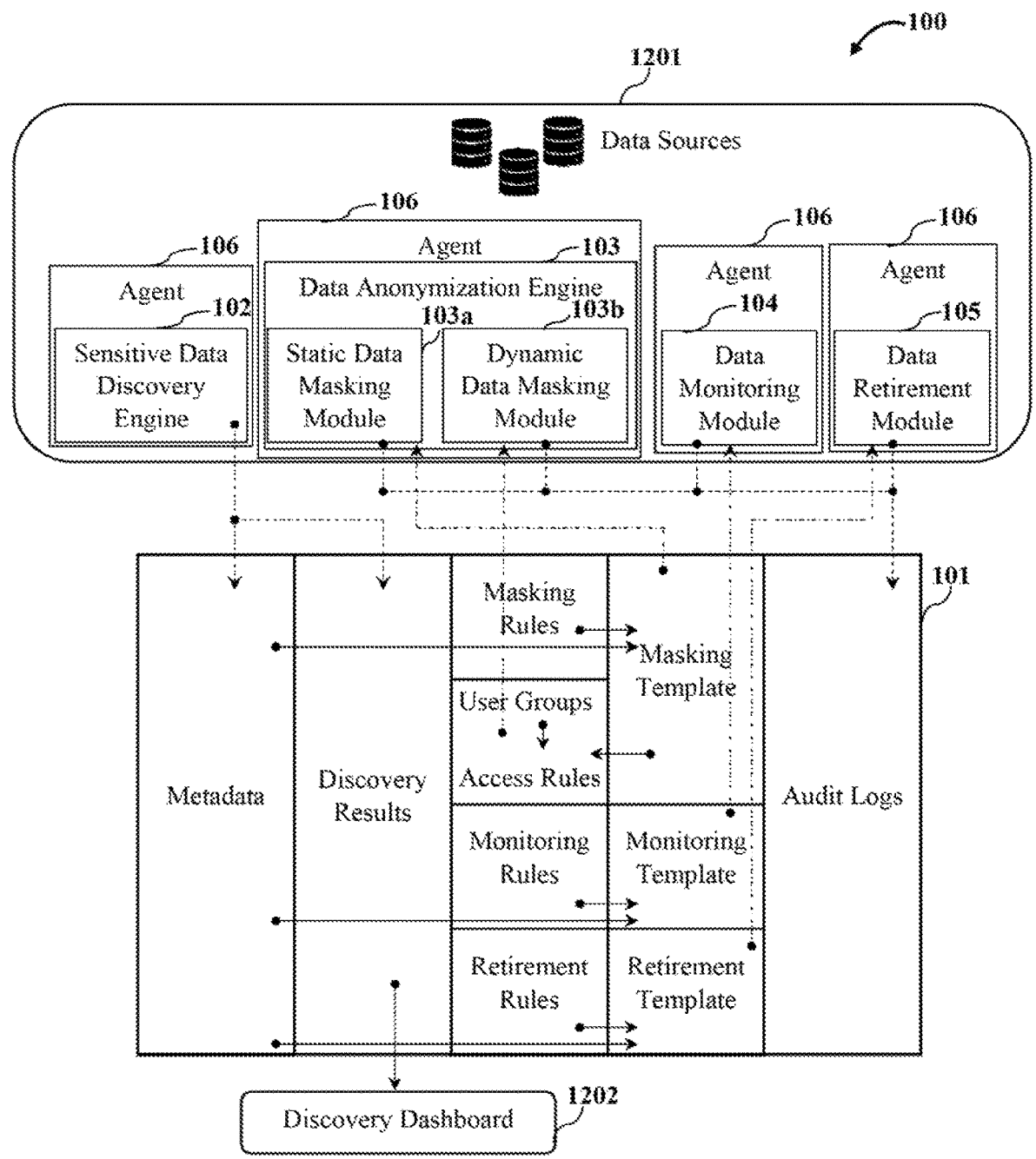
FIG. 12 illustrates a functional block diagram indicating the interactions between agents deployed at data sources and the integrated platform for integrating and managing security of sensitive data across a lifecycle of the sensitive data, according to an embodiment herein.

FIG. 12 illustrates a functional block diagram indicating the interactions between agents 106 deployed at data sources 1201 and the integrated platform 101 for integrating and managing security of sensitive data across a lifecycle of the sensitive data, according to an embodiment herein. According to an embodiment herein, the integrated platform 101 implements an agent-based discovery of the sensitive data in each of the data sources 1201. According to this embodiment, the sensitive data discovery engine 102 is executed by an agent 106 deployed at each of the data sources 1201. The sensitive data discovery engine 102 sends metadata and the results of the discovery process, herein referred to as "discovery results", to the integrated platform 101. The metadata and the discovery results constitute the sensitive data discovery intelligence. According to an embodiment herein, the integrated platform 101 graphically represents the discovery results on a discovery dashboard 1202. Furthermore, the sensitive data discovery engine 102 generates templates comprising the sensitive data discovery intelligence and the data security rules to the integrated platform 101. According to an embodiment herein, the integrated platform 101 receives the metadata and the discovery results from the sensitive data discovery engine 102 and generates the templates by inserting the data security rules.

According to an embodiment herein, the integrated platform 101 configures the templates, for example, as anonymization or masking templates, monitoring templates, and retirement templates, where each template comprises the sensitive data discovery intelligence and the data security rules. The data security rules comprise, for example, the discovery results, the configuration rules for anonymization, monitoring, and retirement, etc. As used herein, "template" refers to a combination of rules that is configured along with the sensitive data discovery intelligence that is generated during the discovery process. For example, the integrated platform 101 configures the template as a masking template, a monitoring template, and a retirement template. The masking template which is used for the static data masking process by the static data masking module 103a of the data anonymization engine 103 comprises a combination of the sensitive data discovery intelligence along with masking rules. For dynamic data masking, the integrated platform 101 implements an additional layer called "user groups" comprising authorization information regarding authorized and unauthorized users. The authorization information along with the masking rules constitute "access rules". Similar to the masking template, the monitoring template and the retirement template comprise a combination of the sensitive data discovery intelligence along with monitoring rules and retirement rules respectively.

After generation of the templates, the integrated platform 101 sends the masking template, the monitoring template, and the retirement template to the respective agents 106 at the data sources 1201 for respective downstream data security operations. For example, the integrated platform 101 sends the masking template to the agent 106 executing the static masking module 103a of the data anonymization engine 103 for static data masking of the sensitive data in each of the data sources 1201. Similarly, the integrated platform 101 sends the masking template along with the access rules to the agent 106 executing the dynamic data masking module 103b of the data anonymization engine 103 for dynamic data masking of the sensitive data in each of the data sources 1201. Moreover, the integrated platform 101 sends the monitoring template to the agent 106 executing the data monitoring module 104 for continuous monitoring of the sensitive data in each of the data sources 1201. Furthermore, the integrated platform 101 sends the retirement template to the agent 106 executing the data retirement module 105 for retiring the sensitive data in each of the data sources 1201. The agent 106 deployed at each of the data sources 1201 then sends audit logs of the respective data security operations and processes back to the integrated platform 101 for storage in the integrated platform 101.

Figure 13A:
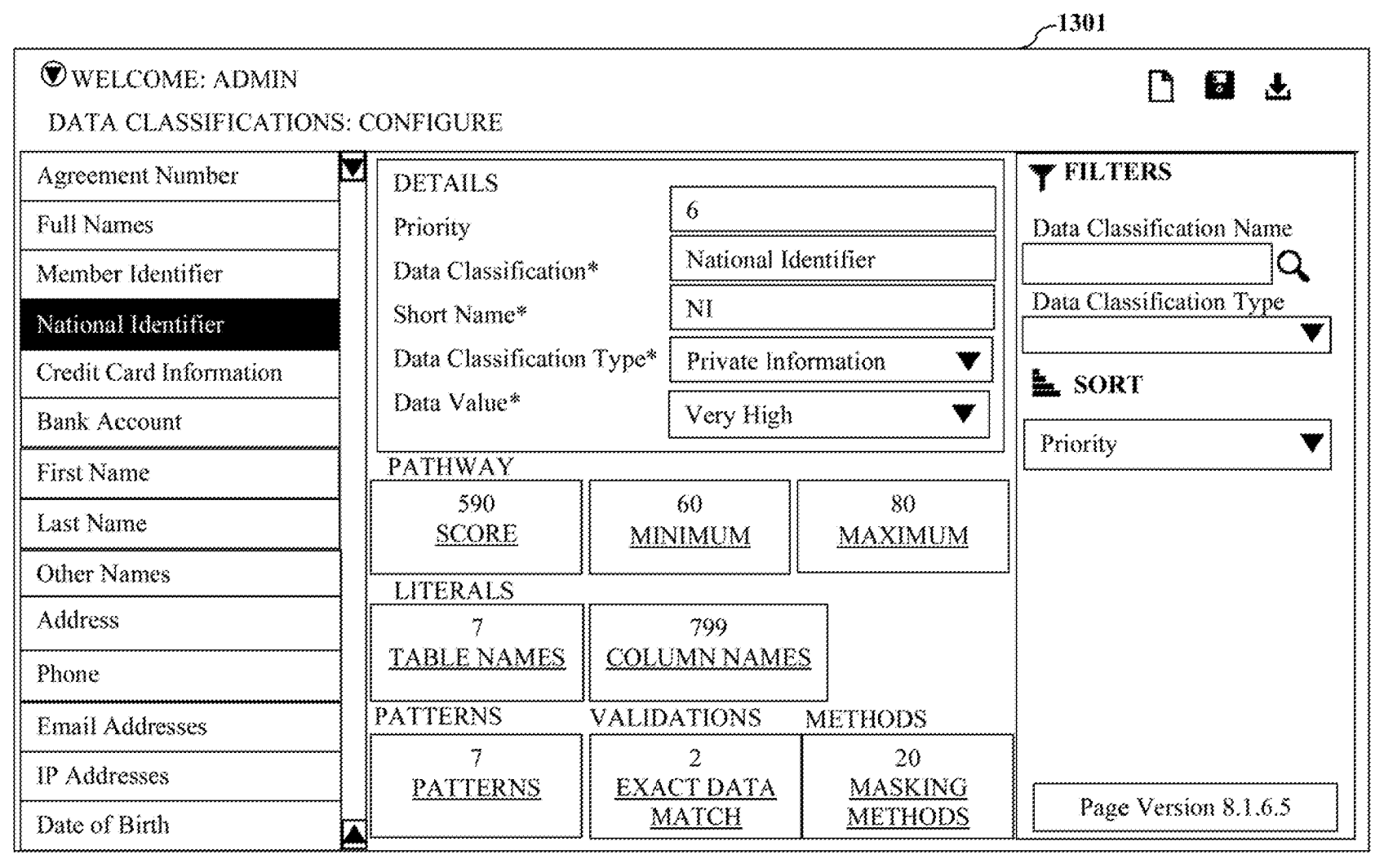
Figure 13B:
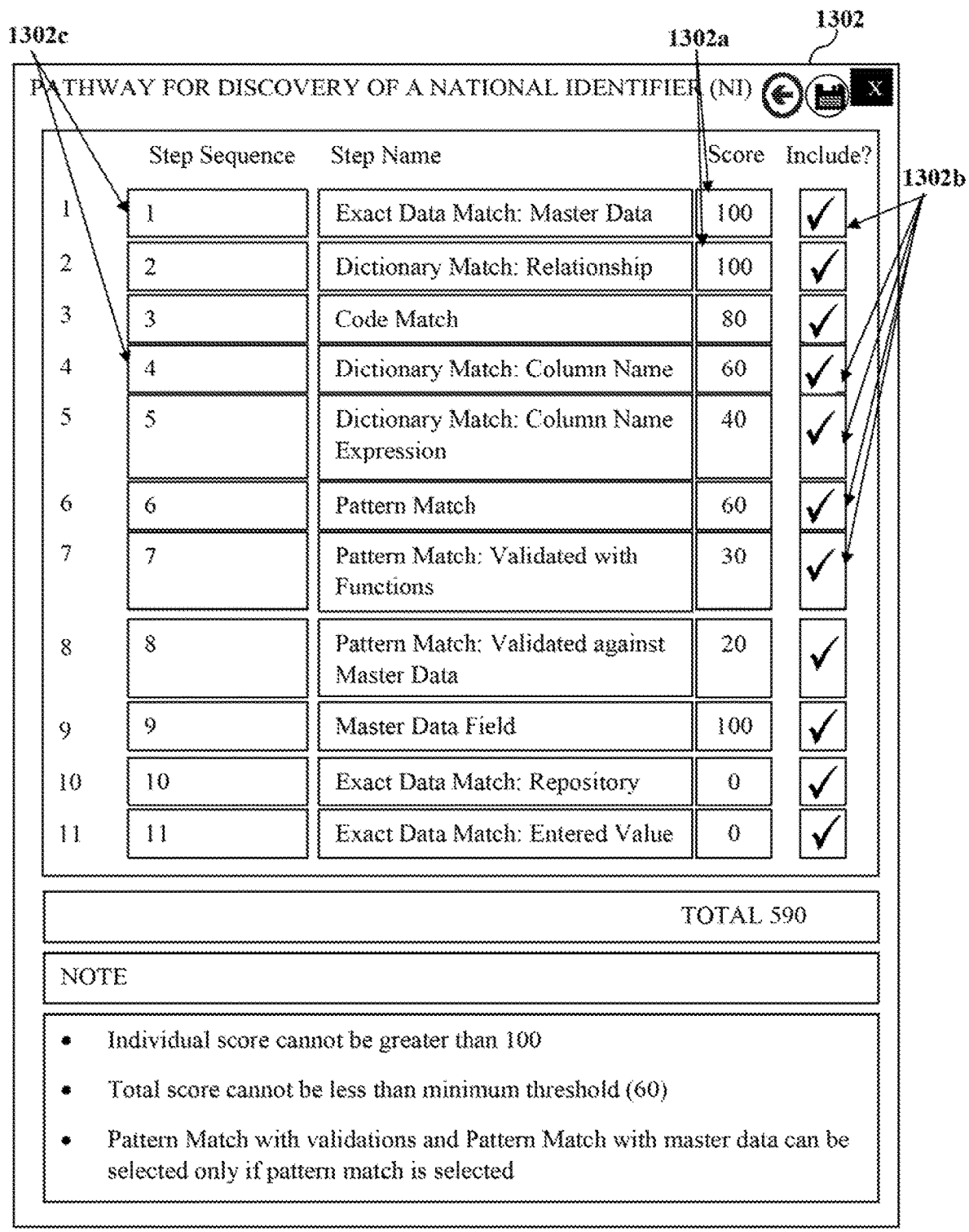
FIGS. 13A-13Q illustrate screenshots of graphical user interfaces provided by the integrated platform for integrating and managing security of sensitive data across a lifecycle of the sensitive data, according to various embodiments herein.
Figure 13C:
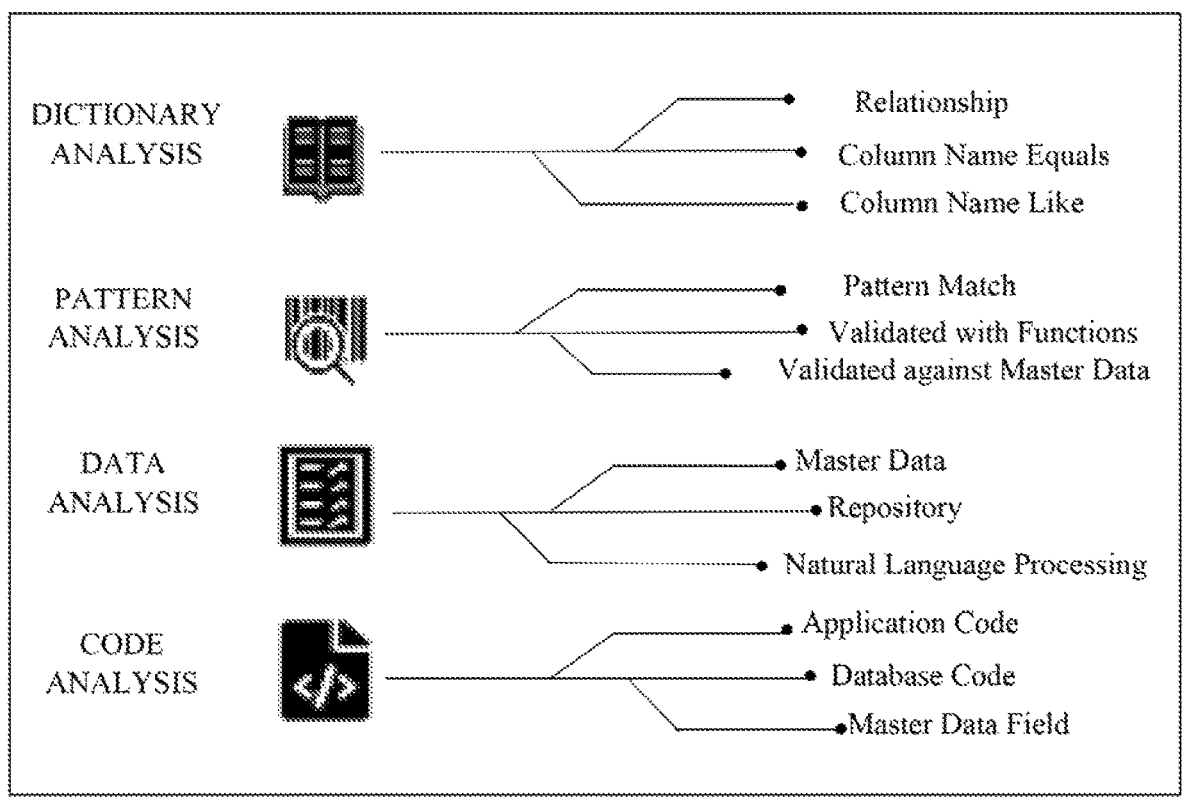
Figure 13D:
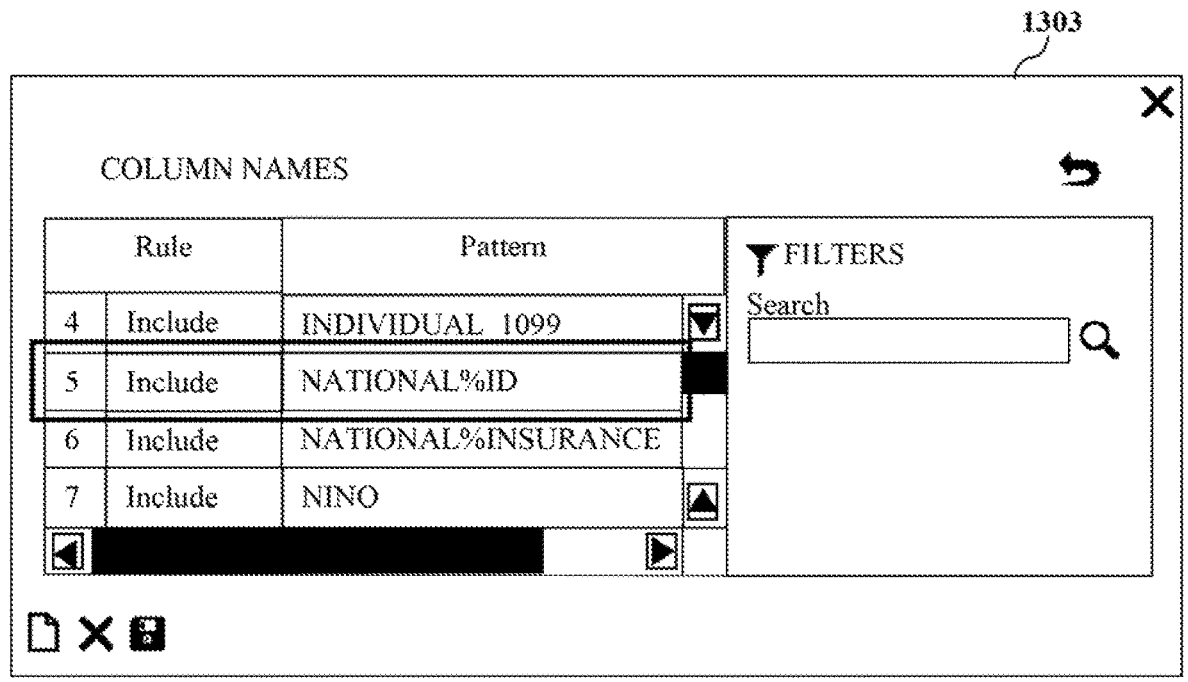
Figure 13E:
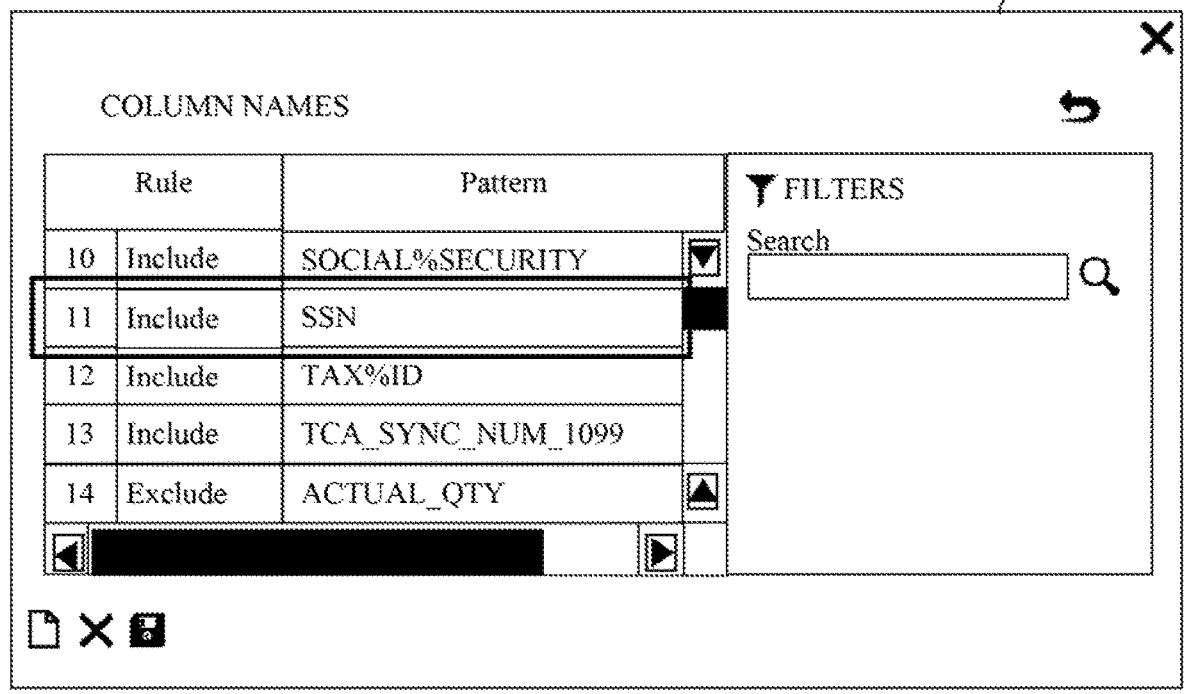
Figure 13G:
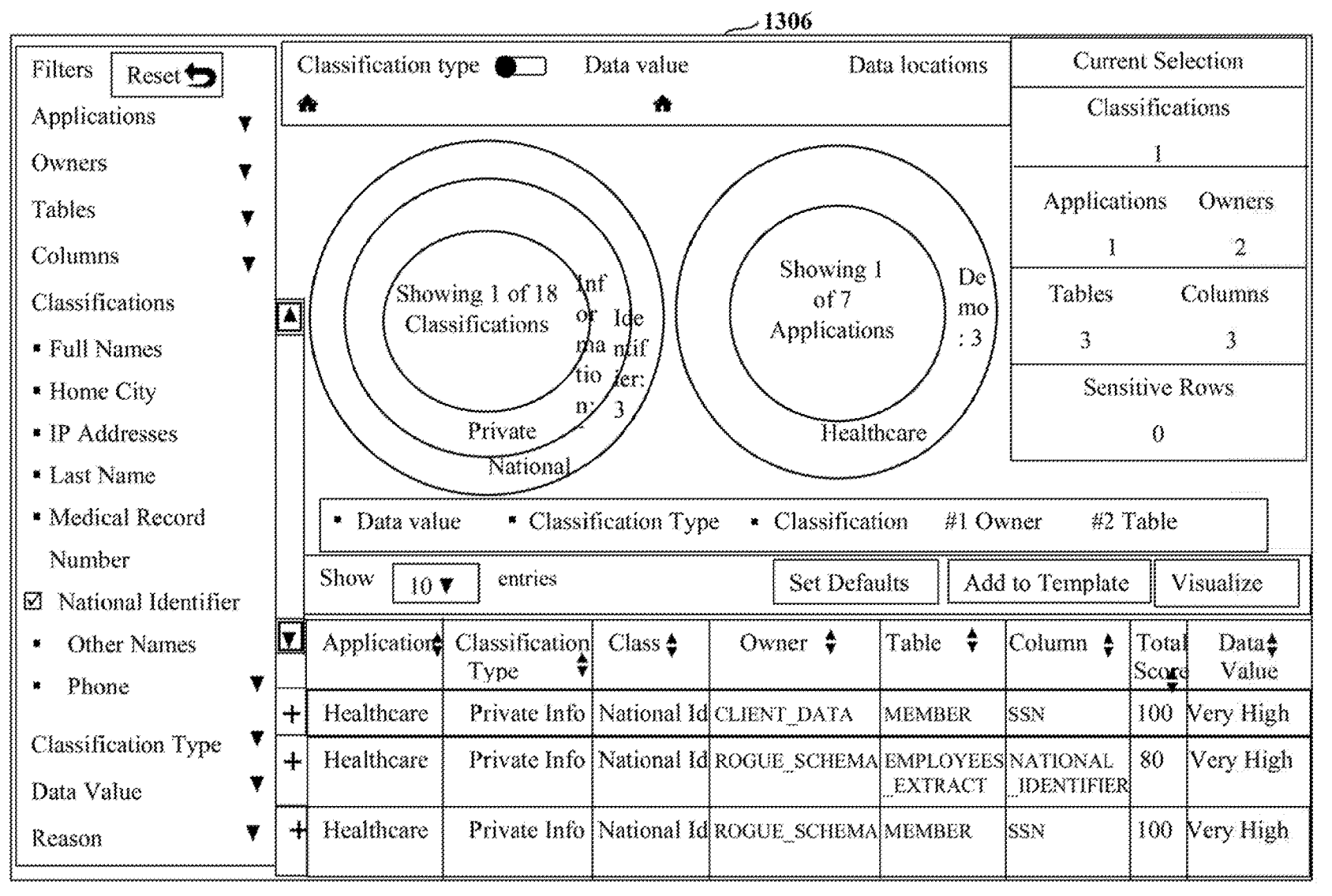
Figure 13I:
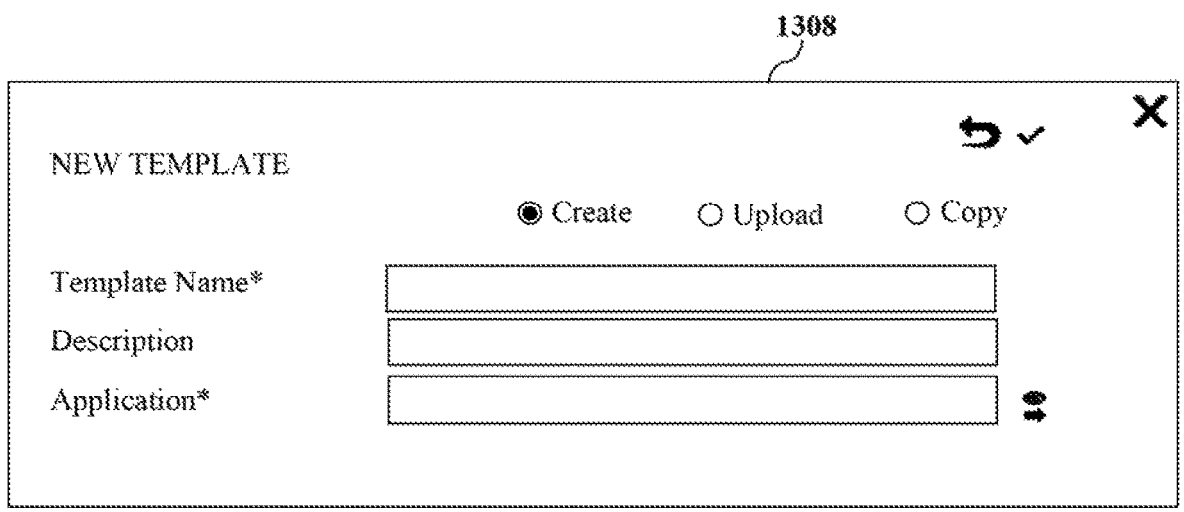
Figure 13K:
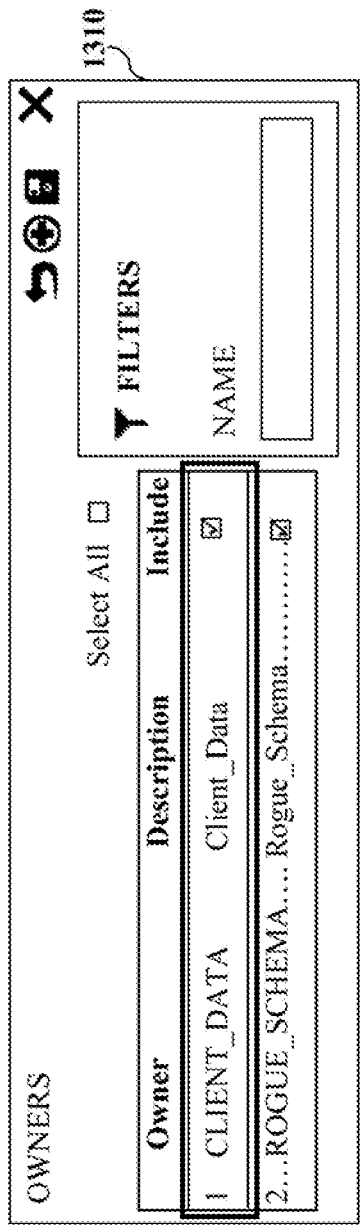
Figure 13L:
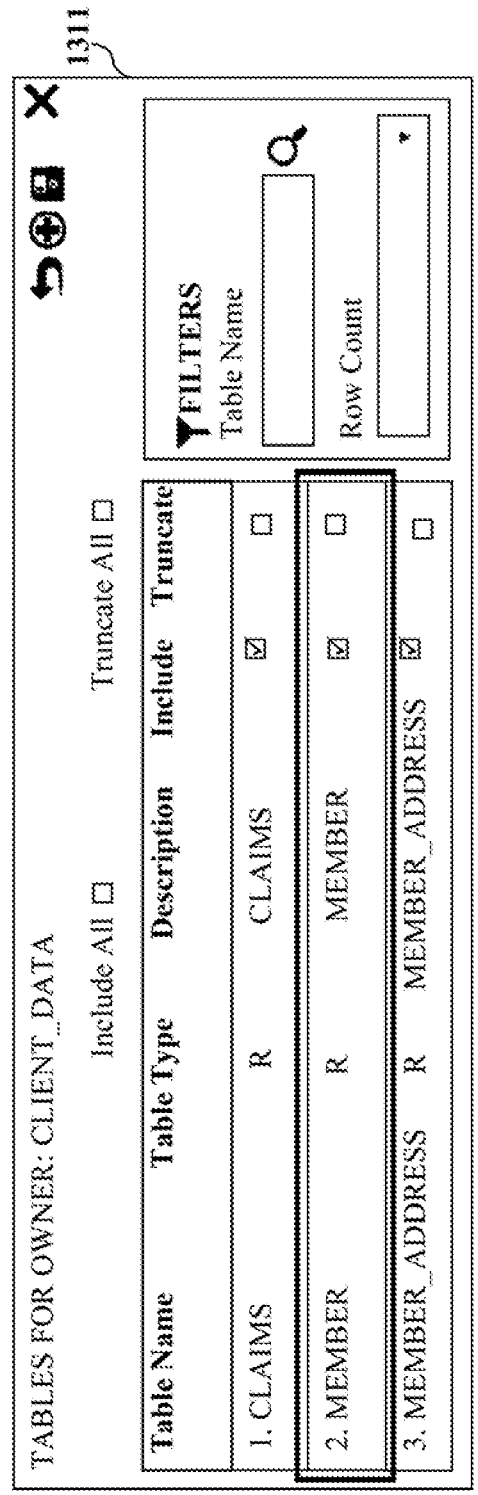
Figure 13N:
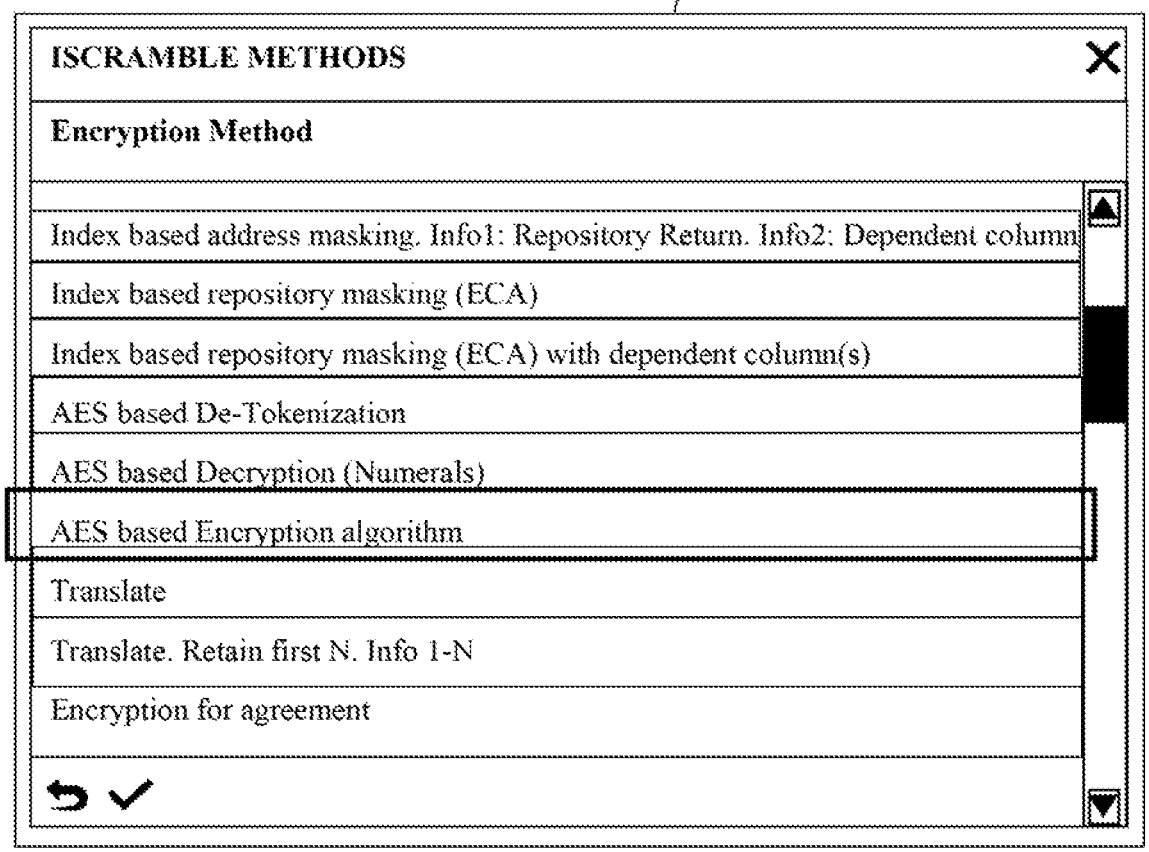
Figure 13Q:
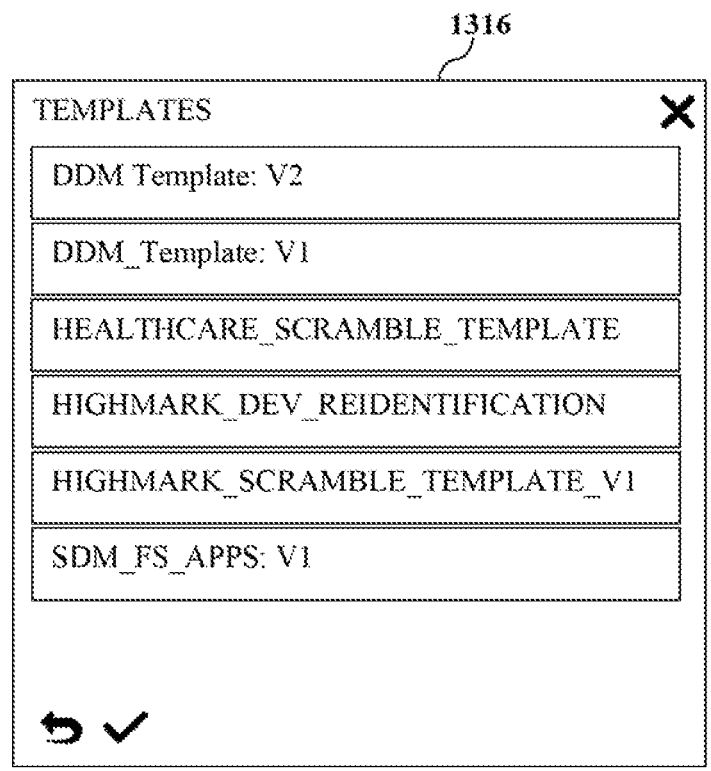

FIGS. 13A-13Q illustrate screenshots of graphical user interfaces (GUIs) provided by the integrated platform 101 shown in FIG. 1, for integrating and managing security of sensitive data across a lifecycle of the sensitive data, according to various embodiments herein. Consider an example where the integrated platform 101 integrates and manages security of sensitive data based on a unique data classification, "National Identifier". Before the sensitive data discovery engine 102 shown in FIG. 1 is executed on a data source, an administrator configures rules comprising, for example, pathways, patterns, scoring mechanisms, etc., for discovering sensitive data based on a selected unique data classification. According to an embodiment herein, the sensitive data discovery engine 102 renders a GUI 1301 as shown in FIG. 13A, on an administrator device, for example, a workstation, a laptop, a tablet computing device, a smart phone, etc., that displays a configuration home screen with options for selecting a data classification and configuring rules for the data classification. The sensitive data discovery engine 102 allows the administrator to select a data classification from a list of data classifications comprising, for example, agreement number, full names, member identifier, national identifier, credit card information, bank account, first name, last name, other names, address, phone, electronic mail (email) addresses, IP addresses, date of birth, etc., on the GUI 1301. In this example, the administrator selects the data classification, "National Identifier". The sensitive data discovery engine 102 also allows the administrator to configure rules comprising, for example, patterns and match operations to be performed on the sensitive data, tables and columns to be scanned, a scorecard mechanism, maximum and minimum thresholds for validating scores assigned to data locations, for example, columns of a table, based on results of the match operations, anonymization or masking methods, etc., on the GUI 1301.

In this example, for discovering national identifiers in source systems spanning multiple similar and variant data sources and applications, the sensitive data discovery engine 102 renders a GUI 1302 shown in FIG. 13B, on the administrator device, to allow the administrator to configure a scanning pathway for scanning data based on the selected unique data classification, "National Identifier". The sensitive data discovery engine 102 displays a list of match operations, for example, "Exact Data Match: Master Data", "Dictionary Match: Relationship", "Code Match", "Dictionary Match: Column Name", "Dictionary Match: Column Name Expression", "Pattern Match", "Pattern Match: Validated with Functions", "Pattern Match: Validated against Master Data", "Master Data Field", "Exact Data Match: Repository", and "Exact Data Match: Entered Value" on the GUI 1302 as shown in FIG. 13B. According to an embodiment herein, the sensitive data discovery engine 102 allows the administrator to enter a score for each of the match operations, select one or more match operations, and enter a sequence for the selected match operations to be performed on the data for the unique data classification into user interface elements, for example, text fields 1302a, checkboxes 1302b, and text fields 1302c provided on the GUI 1302 respectively.

In an example, for configuring the scanning pathway for discovering the unique data classification "National Identifier", the administrator enters the scores 100, 100, 80, 60, 40, 60, 30, 20, 100, 0, and 0 adjacent to the names of the match operations "Exact Data Match: Master Data", "Dictionary Match: Relationship", "Code Match", "Dictionary Match:

Column Name", "Dictionary Match: Column Name Expression", "Pattern Match", "Pattern Match: Validated with Functions", "Pattern Match: Validated against Master Data", "Master Data Field", "Exact Data Match: Repository", and "Exact Data Match: Entered Value", respectively, in the text fields 1302*a* on the GUI 1302 as shown in FIG. 13B. The administrator also selects the match operations, "Exact Data Match: Master Data", "Dictionary Match: Relationship", "Code Match", "Dictionary Match: Column Name", "Dictionary Match: Column Name Expression", "Pattern Match", "Pattern Match: Validated with Functions", "Pattern Match: Validated against Master Data", "Master Data Field", "Exact Data Match: Repository", and "Exact Data Match: Entered Value" by checking the associated checkboxes 1302*b* on the GUI 1302 as shown in FIG. 13B. The sensitive data discovery engine 102 allows the administrator to enter the sequence for the selected match operations to be performed on the data for the selected unique data classification "National Identifier" in the text fields 1302*c* on the GUI 1302 as shown in FIG. 13B. On receiving the selections from the administrator via the GUI 1302, the sensitive data discovery engine 102 configures the scanning pathway for scanning the data in the discovery process based on the selected unique data classification "National Identifier".

The various match operations and methods performed by the sensitive data discovery engine 102 for determining the sensitive data are shown in FIG. 13C. For example, the sensitive data discovery engine 102 performs a dictionary analysis by executing the match operations, namely, "Dictionary Match: Relationship", "Dictionary Match: Column Name" or "Column Name Equals", and "Dictionary Match: Column Name Expression" or "Column Name Like". The sensitive data discovery engine 102 also performs pattern analysis by executing the match operations, namely, "Pattern Match", "Pattern Match: Validated with Functions", and "Pattern Match: Validated against Master Data". The sensitive data discovery engine 102 also performs a data analysis by executing the match operations, namely, "Exact Data Match: Master Data" and "Exact Data Match: Repository", and/or by implementing natural language processing as disclosed in the detailed description of FIG. 1. The sensitive data discovery engine 102 also performs a code analysis based on an application code and a database code, and/or by executing a match operation, namely, "Master Data Field".

FIGS. 13D-13E exemplarily illustrate GUIs 1303 and 1304 provided by the integrated platform 101 for entering names of columns to be scanned for discovery of sensitive data. As shown in FIGS. 13D-13E, the administrator enters column names national identifier and social security number (SSN) on the GUIs 1303 and 1304 respectively, for executing a dictionary match operation for the selected unique data classification. FIG. 13F exemplarily illustrates a GUI 1305 provided by the integrated platform 101, displaying patterns to be scanned while searching for the presence of the unique data classification, for example, national identifier, in the data source. The sensitive data discovery engine 102 flags any column that has an entry which matches the patterns entered in the GUI 1305 as a potential positive for the presence of the unique data classification, for example, national identifier. When the integrated platform 101 executes the sensitive data discovery engine 102 that performs the discovery process, the sensitive data discovery engine 102 generates the sensitive data discovery intelligence, and publishes and displays the sensitive data discovery intelligence with the discovery results in a user-intuitive graphical representation, herein referred to as a "discovery dashboard", on a GUI 1306 as shown in FIG. 13G. The sensitive data discovery intelligence with the discovery results displayed on the GUI 1306 comprise, for example, a table summarizing details of the preset unique data classification and details such as schema, tables, columns, etc., where the sensitive data is present. The sensitive data discovery engine 102 enters the sensitive data discovery intelligence and the discovery results into the template.

FIG. 13H exemplarily illustrates a GUI 1307 provided by the integrated platform 101, displaying metadata comprising a reason why a column has been flagged as sensitive. FIG. 13I exemplarily illustrates a GUI 1308 provided by the integrated platform 101 for identifying a template generated by the sensitive data discovery engine 102 and associating an application to the template. The GUI 1308 allows the administrator to enter a name for the template, a description for the template, and a name of the application associated with the template. FIG. 13J exemplarily illustrates a GUI 1309 provided by the integrated platform 101, displaying a list of templates generated by the sensitive data discovery engine 102. The GUI 1309 also displays the schema, tables, and columns associated with each template. Consider an example where the administrator selects a template XXXX_SCRAMBLE_TEMPLATE_V1 on the GUI 1309. As shown in FIGS. 13J-13K, the template comprises two schemas or owners, for example, CLIENT_DATA and ROGUE_SCHEMA. In this example, the administrator selects the schema CLIENT_DATA on the GUI 1310 as shown in FIG. 13K. The schema CLIENT_DATA comprises three tables, namely, CLAIMS, MEMBER, and MEMBER_ADRESS as displayed on the GUI 1311 shown in FIG. 13L. In this example, the administrator selects the table MEMBER on the GUI 1311.

On receiving the selection of the table MEMBER, the integrated platform 101 displays the details of the table on the GUI 1312 as shown in FIG. 13M. The GUI 1312 displays associated columns that are classified as sensitive by the sensitive data discovery engine 102 during the discovery process. The GUI 1312 also shows that the table contains the column named "SSN", which contains the selected unique data classification "National Identifier". The GUI 1312 allows the administrator to assign applicable anonymization or masking, encryption and tokenization methods to specific columns within the template as shown in FIG. 13M. In this example, the administrator assigns the column named SSN to the anonymization method "AES based Encryption" using the GUIs 1312 and 1313 shown in FIGS. 13M-13N. Once the administrator assigns the anonymization method in the template, this template can be used for anonymization operations. While configuring static data masking or dynamic data masking, the application requires the administrator to select an applicable template based on which the selected masking method needs to be run. In this example, the administrator selects the template "XXXX_SCRAMBLE_TEMPLATE_V1" on the GUI 1314 as shown in FIG. 13O. Once the template is generated by the sensitive data discovery engine 102 from the discovery process, the administrator inputs the data security rules comprising details pertaining to subsequent downstream data protection such as anonymization, monitoring, and retirement into the template on the GUIs 1315 and 1316 as shown in FIGS. 13P-13Q. The integrated platform 101 then generates agents 106 shown in FIG. 12, for executing the anonymization process, the monitoring process, and the retirement or minimization process. In this example, the integrated platform 101 generates and deploys an agent 106 to execute the static data masking module 103*a* or the dynamic data masking module 103*b* of the data anonymization engine 103 shown in FIG. 12, on the table, to perform the masking process based on the inputs provided in the template. In this example, during the masking process, the data anonymization engine 103 executes an AES based encryption algorithm as specified in the template "XXXX_SCRAMBLE_TEMPLATE_V1" for encrypting the identified column with the column name "SSN".

Figure 14:
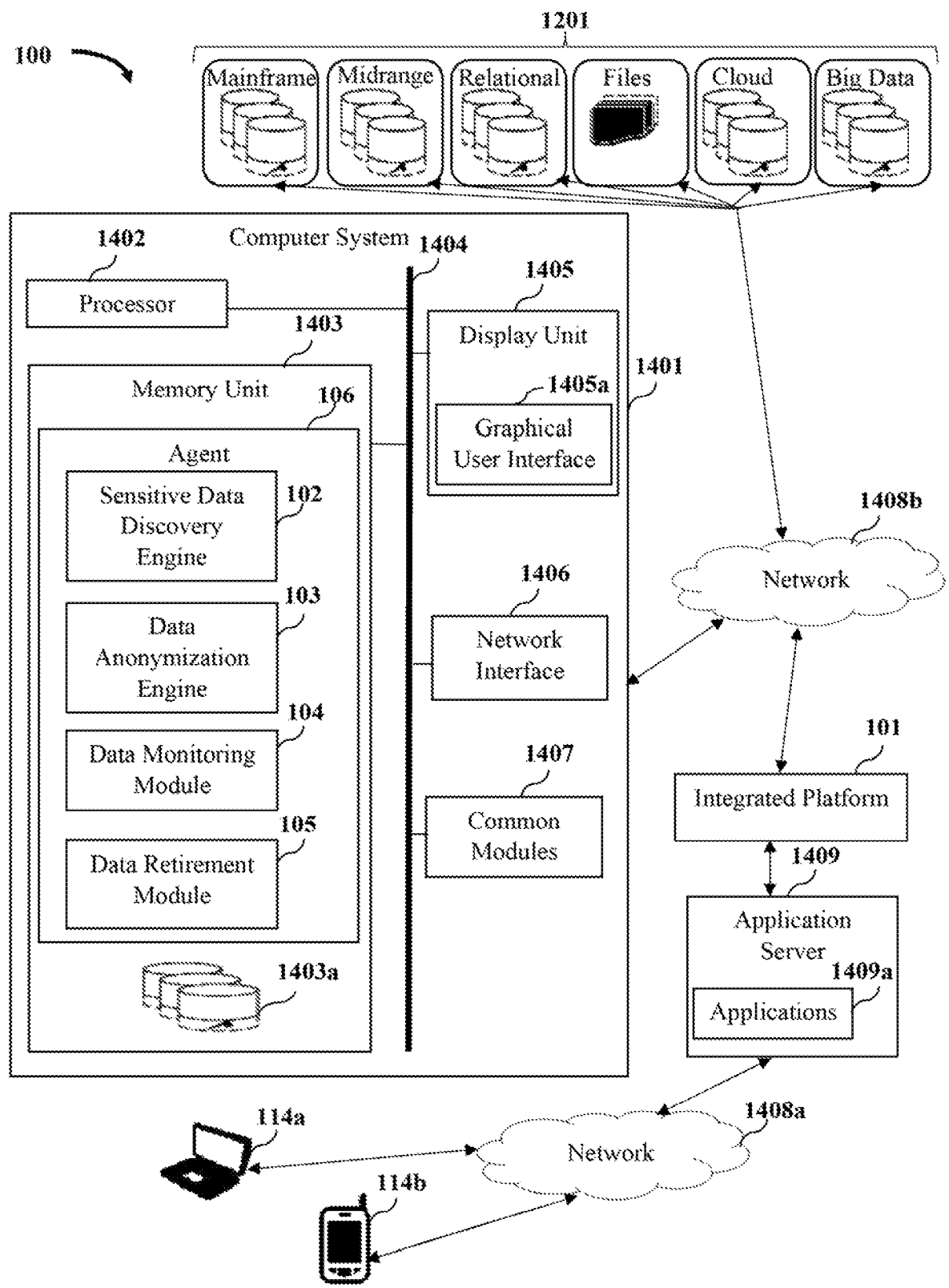
FIG. 14 illustrates an architectural block diagram of the system for integrating and managing security of sensitive data across a lifecycle of the sensitive data, according to an embodiment herein.

FIG. 14 illustrates an architectural block diagram of the system 100 for integrating and managing security of sensitive data across a lifecycle of the sensitive data, according to an embodiment herein. The system 100 disclosed herein comprises the integrated platform 101 that communicates with multiple similar and variant data sources 1201, for example, mainframes, midrange systems, relational databases, files, cloud data sources, big data sources, structured data sources, unstructured data sources, etc., and applications 1409a hosted on an application server 1409. According to an embodiment herein, the integrated platform 101 that communicates with multiple similar and variant data sources 1201 via a network 1408b, for example, a short-range network or a long-range network. The network 1408b is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

According to an embodiment herein, each data source, for example, 1403a, is implemented on a computer system 1401 as exemplarily illustrated in FIG. 14. The integrated platform 101 deploys rules and methods for integrating and managing security of sensitive data across a lifecycle of the sensitive data via an agent 106 deployed at each data source 1403a. According to an embodiment herein, there is a separate agent 106 for each of the data sources, for example, 1403a and 1201. According to an embodiment herein, the agent 106 comprises the sensitive data discovery engine 102, the data anonymization engine 103, the data monitoring module 104, and the data retirement module 105. According to an embodiment herein, agent connections made by the sensitive data discovery engine 102, the data anonymization engine 103, and the data retirement module 105 to the integrated platform 101 are non-persistent, while the connection made by the data monitoring module 104 to the integrated platform 101 is persistent as the data monitoring module 104 fetches logs from the integrated platform 101. The integrated platform 101 stores audit logs, the intelligence of the applications, rules, templates, discovery results, data classifications, etc., in one or more databases (not shown). The databases of the integrated platform 101 refer to any storage area or medium that is used for storing data and files. According to an embodiment herein, the databases of the integrated platform 101 are, for example, data stores, locations on file systems, external databases remotely accessible via the network 1408b, cloud-based databases implemented in a cloud computing environment, etc.

According to an embodiment herein, the computer system 1401 that hosts the data source 1403a is programmable using high-level computer programming languages. According to an embodiment herein, the computer system 1401 is implemented using programmed and purposeful hardware. According to an embodiment herein, the computer system 1401 and the integrated platform 101 are accessible to users, for example, through a broad spectrum of technologies and user devices such as laptops 114a, smart phones 114b, tablet computing devices, endpoint devices, etc., with access to a network 1408a, for example, the internet. As exemplarily illustrated in FIG. 14, the system 100 disclosed herein further comprises a non-transitory, computer-readable storage medium, for example, a memory unit 1403 deployed in the computer system 1401, for storing computer program instructions defined by the modules, for example, 102, 103, 104, 105, etc., in the agent 106. As used herein, "non-transitory, computer-readable storage medium" refers to all computer-readable media, for example, non-volatile media, volatile media, and transmission media, except for a transitory, propagating signal. Non-volatile media comprise, for example, solid state drives, optical discs or magnetic disks, flash memory cards, a read-only memory (ROM), etc. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to a processor.

The system 100 disclosed herein further comprises a processor 1402 operably and communicatively coupled to the memory unit 1403 for executing the computer program instructions defined by the modules, for example, 102, 103, 104, 105, etc., in the agent 106. The memory unit 1403 is used for storing program instructions, applications, and data. The memory unit 1403 is, for example, a random-access memory (RAM) or another type of dynamic storage device that stores information and instructions for execution by the processor 1402. The memory unit 1403 also stores temporary variables and other intermediate information used during execution of the instructions by the processor 1402. The computer system 1401 further comprises read only memories (ROMs) or other types of static storage devices that store static information and instructions for execution by the processor 1402. According to an embodiment herein, the agent 106 comprising one or more of the modules, for example, 102, 103, 104, 105, etc., is stored in the memory unit 1403.

The processor 1402 is configured to execute the computer program instructions defined by the modules, for example, 102, 103, 104, 105, etc., of the agent 106 for integrating and managing security of sensitive data across a lifecycle of the sensitive data. The processor 1402 refers to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. According to an embodiment herein, the processor 1402 is implemented as a processor set comprising, for example, a programmed microprocessor and a math or graphics co-processor. The computer system 1401 is not limited to employing the processor 1402. According to an embodiment herein, the computer system 1401 employs controllers or microcontrollers. The processor 1402 executes the modules, for example, 102, 103, 104, 105, etc., of the agent 106.

As exemplarily illustrated in FIG. 14, the computer system 1401 further comprises a data bus 1404, a display unit 1405, a network interface 1406, and common modules 1407. The data bus 1404 permits communications between the modules, for example, 1402, 1403, 1405, 1406, and 1407 of the computer system 1401. The display unit 1405, via a graphical user interface (GUI) 1405a, displays information, display interfaces, user interface elements such as checkboxes, input text fields, etc., for example, for allowing a user such as a system administrator in an organization to define unique data classifications, select match operations, enter sequence numbers for the selected match operations for configuration of a scanning pathway by the sensitive data discovery engine 102, select templates, etc. The computer system 1401 renders the GUI 1405a on the display unit 1405 for receiving inputs from the system administrator. The GUI 1405a comprises, for example, online web interfaces, web-based downloadable application interfaces, mobile-based downloadable application interfaces, etc. The display unit 1405 displays the GUI 1405a.

The network interface 1406 enables connection of the computer system 1401 to the network 1408b. According to an embodiment herein, the network interface 1406 is provided as an interface card also referred to as a line card. The network interface 1406 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/Internet protocol, interfaces based on wireless communications technology such as satellite technology, radio frequency technology, near field communication, etc. The common modules 1407 of the computer system 1401 comprise, for example, input/output (I/O) controllers, input devices, output devices, fixed media drives such as hard drives, removable media drives for receiving removable media, etc. Computer applications and programs are used for operating the computer system 1401. The programs are loaded onto fixed media drives and into the memory unit 1403 via the removable media drives. According to an embodiment herein, the computer applications and programs are loaded into the memory unit 1403 directly via the network 1408b.

According to an embodiment herein, the agent 106 comprising the sensitive data discovery engine 102, the data anonymization engine 103, the data monitoring module 104, and the data retirement module 105 is stored in the memory unit 1403 and executed by the processor 1402. The sensitive data discovery engine 102, the data anonymization engine 103, the data monitoring module 104, and the data retirement module 105 are disclosed above as software executed by the processor 1402. According to an embodiment herein, the modules, for example, 102, 103, 104, 105, etc., of the system 100 are implemented completely in hardware. According to another embodiment herein, the modules, for example, 102, 103, 104, 105, etc., of the system 100 disclosed herein are implemented by logic circuits to carry out their respective functions disclosed above. According to another embodiment herein, the system 100 is also implemented as a combination of hardware and software including the integrated platform 101, the agent 106, and one or more processors, for example, 1402, that are used to implement the modules, for example, 102, 103, 104, 105, etc., of the system 100 disclosed herein.

The processor 1402 retrieves instructions defined by the sensitive data discovery engine 102, the data anonymization engine 103, the data monitoring module 104, and the data retirement module 105 for performing respective functions disclosed in the detailed description of FIG. 1. The processor 1402 retrieves instructions for executing the modules, for example, 102, 103, 104, 105, etc., from the memory unit 1403. A program counter determines the location of the instructions in the memory unit 1403. The program counter stores a number that identifies the current position in the program of each of the modules, for example, 102, 103, 104, 105, etc. The instructions fetched by the processor 1402 from the memory unit 1403 after being processed are decoded. The instructions are stored in an instruction register in the processor 1402. After processing and decoding, the processor 1402 executes their respective instructions, thereby performing one or more processes defined by those instructions.

At the time of execution, the instructions stored in the instruction register are examined to determine the operations to be performed. The processor 1402 then performs the specified operations. The operations comprise arithmetic operations and logic operations. An operating system of the computer system 1401 performs multiple routines for performing a number of tasks required to assign the input devices, the output devices, and the memory unit 1403 for execution of the modules, for example, 102, 103, 104, 105, etc. The tasks performed by the operating system comprise, for example, assigning memory to the modules, for example, 102, 103, 104, 105, etc., and to data used by the computer system 1401, moving data between the memory unit 1403 and disk units, and handling input/output operations. The operating system performs the tasks on request by the operations and after performing the tasks, the operating system transfers the execution control back to the processor 1402. The processor 1402 continues the execution to obtain one or more outputs.

For purposes of illustration, the detailed description refers to the modules, for example, 102, 103, 104, 105, etc., being run locally on a single computer system 1401; however the scope of the system 100 and the computer-implemented method disclosed herein is not limited to the modules, for example, 102, 103, 104, 105, etc., being run locally on a single computer system 1401 via the operating system and the processor 1402, but may be extended to run remotely over the network 1408b by employing a web browser and a remote server, a mobile phone, or other electronic devices. According to an embodiment herein, one or more portions of the system 100 disclosed herein are distributed across one or more computer systems (not shown) coupled to the network 1408b.

The non-transitory computer-readable storage medium disclosed herein stores computer program instructions executable by the processor 1402 for integrating and managing security of sensitive data across a lifecycle of the sensitive data. The computer program instructions implement the processes of various embodiments disclosed above and perform additional steps that may be required and contemplated for integrating and managing security of sensitive data across a lifecycle of the sensitive data. When the computer program instructions are executed by the processor 1402, the computer program instructions cause the processor 1402 to perform the steps of the method for integrating and managing security of sensitive data across a lifecycle of the sensitive data as disclosed in the detailed description of FIGS. 11A-11B. According to an embodiment herein, a single piece of computer program code comprising computer program instructions performs one or more steps of the method disclosed in the detailed description of FIGS. 11A-11B. The processor 1402 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, according to an embodiment herein, refers to the hardware, which is specifically configured to recognize and/or execute the computer program codes to be held on a non-transitory, computer-readable storage medium. Furthermore, according to an embodiment herein, use of a module, or an engine, or a unit refers to the non-transitory, computer-readable storage medium including the computer program codes, which is specifically adapted to be executed by the microcontroller to perform predetermined operations. According to an embodiment herein, the computer program codes comprising computer executable instructions are implemented in any programming language, for example, C, C++, C#, Java®, JavaScript®, Fortran, Ruby, Perl®, Python®, Visual Basic®, hypertext pre-processor (PHP), Microsoft® .NET, Objective-C®, etc. According to an embodiment herein, other object-oriented, functional, scripting, and/or logical programming languages are also used. According to an embodiment herein, the computer program codes or software programs are stored on or in one or more mediums as object code. According to an embodiment herein, the term "module" or "engine" or "unit" refers to the combination of the microcontroller and the non-transitory, computer-readable storage medium. Often module or engine boundaries that are illustrated as separate commonly vary and potentially overlap. For example, a module or an engine or a unit may share hardware, software, firmware, or a combination thereof, while potentially retaining some independent hardware, software, or firmware. According to an embodiment herein, a module or an engine or a unit includes any suitable logic.

The integrated platform 101 is industry agnostic and is deployable in multiple industries, for example, the financial service industry, the healthcare industry, the retail industry, etc. The integrated platform 101 is extendable for use by any enterprise in any industry intending to deploy data and application security products enterprise-wide. According to an embodiment herein, the applications of the system 100 and the computer-implemented method disclosed herein comprise, for example, cross-border data security, cloud security, data warehousing, sensitive data governance, regulatory compliance, etc. For example, the sensitive data discovery engine 102 allows flagging of sensitive data in source systems of an organization and subsequent use of the sensitive data discovery intelligence for data governance initiatives within the organization. The integrated platform 101 also provides the sensitive data discovery intelligence as an input for data mapping and data lineage. According to an embodiment herein, as data residency requirements drive organizations to implement cross-border data security solutions, the integrated platform 101 assists in the comprehensive discovery of sensitive data and the security of the sensitive data so that sensitive data does not leave the premises of the organizations. The integrated platform 101 discovers and protects sensitive data such that the sensitive data is retained at the premises of an organization to meet data residency requirements and cross border data security requirements. Furthermore, the integrated platform 101 expands the scope of data protection from on-premise to the cloud in applications such as data warehousing, risk elimination of sensitive data in a non-production environment, cross-border production and operations, etc. Furthermore, the sensitive data discovery engine 102 assists in enforcement of the general data protection regulation (GDPR) in the following articles: For example, in Article 4, the sensitive data discovery engine 102 assists in discovery of all personal data in a computer system; in Article 35, the sensitive data discovery engine 102 allows an organization to perform data privacy impact assessment that assesses the impact of processing on personal data using the templates; in Article 25, the sensitive data discovery engine 102 implements a data security mechanism by design and default using the templates; in Articles 33 and 34, the sensitive data discovery engine 102 identifies sensitive data to facilitate immediate notification of any breach to a supervisory authority and data subject as necessary; and in Article 15 that provides data subjects the right to access data, the sensitive data discovery engine 102 identifies and renders the locations of the sensitive data to provide the access. Similarly, the sensitive data discovery engine 102 assists in enforcing new regulations, for example, the California Consumer Privacy Act, passed after the GDPR.

According to an embodiment herein, for maintaining compliance with regulations using the integrated platform 101, an organization performs an inventory of all data sources in the environment, conducts a high-level assessment of the data sources to identify and prioritize the data sources that could potentially have sensitive data, runs the sensitive data discovery engine 102 against each data source to systematically locate all sensitive data in the data source, and collects the results and the sensitive data discovery intelligence for use in downstream data protection, governance and compliance reporting. The match operations, the scanning pathways, and the unique data classifications can be configured from within an existing application as per the use case.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor or a similar device. The "non-transitory, computer-readable storage media" also refer to any medium capable of storing or encoding a set of instructions for execution by a computer, a processor or a similar device and that causes a computer, a processor or a similar device to perform any one or more of the methods disclosed herein. According to an embodiment herein, the computer programs that implement the methods and algorithms disclosed herein are stored and transmitted using a variety of media, for example, the computer-readable media in various manners. According to an embodiment herein, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the embodiments disclosed herein are implemented as programmed elements, or non-programmed elements, or any suitable combination thereof.

Where databases are described it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. According to an embodiment herein, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. According to another embodiment, despite any depiction of the databases as tables, other formats including relational databases, object-based models, and/or distributed databases are used to store and manipulate the data types disclosed herein. According to an embodiment herein, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to work in a network environment comprising one or more computers that are in communication with one or more devices via a network. According to an embodiment herein, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. According to an embodiment herein, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of the embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

What is claimed is:

1. A system for integrating and managing security of sensitive data across a lifecycle of the sensitive data, the system comprising:

a non-transitory, computer-readable storage medium configured to store computer program instructions defined by modules of an integrated platform to run and execute one or more applications/algorithms;

at least one processor communicatively coupled to the non-transitory, computer-readable storage medium and configured to execute the computer program instructions defined by the modules of the integrated platform to run and execute one or more applications/algorithms; and wherein the modules of the integrated platform comprising:

a sensitive data discovery engine defining one or more of the computer program instructions, which when executed by the at least one processor, cause the at least one processor to run one or more applications/algorithms to:

determine sensitive data by executing one or more of a plurality of match operations in a scanning pathway on data in each of a plurality of similar and variant data sources and applications for a selected one of a plurality of unique data classifications, wherein the plurality of similar and variant data sources comprises relational databases, hierarchical databases, file systems, text, documents, external files, complex data locations, composite data locations, unvalidated fields, binary large objects, character large objects, key value pairs, phantom tables, structured data sources, unstructured data sources, mainframes, cloud data sources, and big data sources;
identify application codes that operate on the determined sensitive data;
generate sensitive data discovery intelligence comprising metadata, results of the determination of the sensitive data, locations of the determined sensitive data, and information of users and programs that access the determined sensitive data by inspecting the identified application codes;
generate one or more templates comprising the sensitive data discovery intelligence and data security rules for managing the security of the determined sensitive data across the lifecycles of the determined sensitive data; and
distribute the generated one or more templates to a data anonymization engine, a data monitoring module, and a data retirement module of the integrated platform deployed on the each of the plurality of similar and variant data sources;
the data anonymization engine defining one or more of the computer program instructions, which when executed by the at least one processor, cause the at least one processor to flexibly and consistently perform integrated anonymization on the determined sensitive data of a plurality of data types accessible by one or more of the applications using the generated one or more templates based on the selected one of the unique data classifications and a nature of an application environment, wherein the integrated anonymization comprises one of masking, encryption, tokenization, and any combination thereof;
the data monitoring module defining one or more of the computer program instructions, which when executed by the at least one processor, cause the at least one processor to continuously monitor access of the determined sensitive data by the users and the applications using the generated one or more templates; and
the data retirement module defining one or more of the computer program instructions, which when executed by the at least one processor, cause the at least one processor to determined and retire inactive sensitive data from the determined sensitive data without removing transactional data therefrom using the generated one or more templates;
wherein the data anonymization engine defines one or more of the computer program instructions, which when executed by the at least one processor, cause the at least one processor to statically mask the determined sensitive data in the locations of the determined sensitive data, incrementally when new sensitive data is introduced in the plurality of similar and variant data sources and the applications, when the determined sensitive data is in transition between the plurality of similar and variant data sources and the applications, and via an application programming interface, and wherein the data anonymization engine defines one or more of the computer program instructions, which when executed by the at least one processor, cause the at least one processor to dynamically mask the determined sensitive data at one or more of a database layer, an application layer via a database, and application layer via an application programming interface, and an application layer via a proxy, and wherein the determined sensitive data is dynamically masked based on conditional criteria, and wherein the conditional criteria comprise conditions and the users accessing the determining sensitive data, locations of the users, and programs accessing the determined sensitive data, and wherein, wherein the data anonymization engine defines one or more of the computer program instructions, which when executed by the at least one processor, cause the at least one processor to replace the determined sensitive data with tokens using one or more of a plurality of tokenizers implements a reversible cryptographic tokenization with a vault, a reversible non-cryptographic tokenization, an irreversible cryptographic authenticable tokenization, an irreversible cryptographic non-authenticable tokenization, an irreversible non-cryptographic non-authenticatable tokenization, and a reversible cryptographic tokenization without the vault.

2. The system according to claim 1, wherein the plurality of match operations comprises a master data field match operation, a plurality of dictionary match operations, a code match operation, a plurality of pattern match operations, and a plurality of extract data match operations.

3. The system according to claim 1, wherein the sensitive data discovery intelligence further comprises historical data related to the determination of the sensitive data and relationships of the users with the sensitive data.

4. The system according to claim 1, wherein the generated one or more templates are configured to secure the determined sensitive data across the lifecycle of the determined sensitive data in a pre-production environment, a production environment, a production environment, and a non-production environment.

5. The system according to claim 1, wherein the data security rules comprise configuration rules for anonymization, monitoring, and retirement of the determined sensitive data, and wherein the configuration rules for the anonymization of the determined sensitive data comprise anoymization, authorization and monitoring information of the users.

6. The system according to claim 1, wherein the generated one or more templates comprise one or more anonymization templates, one or more monitoring templates, and one or more retirement templates.

7. The system according to claim 1, wherein the data anonymization engine defines one or more of the computer program instructions, which when executed by the at least one processor, cause the at least one processor to perform blended data masking of the determining sensitive data accessible by a cluster of applications.

8. The system according to claim 1, wherein the data anonymization engine defines one or more of the computer program instructions, which when executed by the at least one processor, cause the at least one processor to perform hybrid data masking of the determined sensitive data accessible by a single application.

9. The system according to claim 1, wherein the data anonymization engine defines one or more of the computer program instructions, which when executed by the at least one processor, cause the at least one processor cause the at least one processor to encrypt the determined sensitive data of the plurality of data types, while preserving a format of the plurality of data types of the determined sensitive data.

10. The system according to claim 1, wherein the integrated platform is configured to deploy agents on the plurality of similar and variant data sources and the applications for implementing the sensitive data discovery engine, the data anonymization engine, the data monitoring module, and the data retirement module locally at the plurality of similar and variant data sources and the applications.

11. A computer-implemented method comprising instructions stored on a non-transitory computer-readable storage medium, and executed/run on a hardware processor provided in a computer system for integrating and managing security of sensitive data across a lifestyle of the sensitive data, through one or more applications/algorithms, the computer-implemented method comprising steps of:

integrating a sensitive data discovery engine, a data anonymization engine, a data monitoring module, and a data retirement module in an integrated platform, wherein the integrated platform is in communication with each of a plurality of similar and variant data sources and applications, and wherein the plurality of similar and variant data sources comprises relational databases, hierarchical databases, file systems, text, documents, external files, complex data locations, composite data locations, unvalidated fields, binary large objects, character large objects, key value pairs, phantom tables, structured data sources, unstructured data sources, mainframes, cloud data sources, and big data sources;

determining, by the sensitive data discovery engine, sensitive data by executing one or more of a plurality of match operations, through one or more applications/algorithms, in a scanning pathway on data in the each of the plurality of similar and variant data sources and applications for a selected one of a plurality of unique data classifications;

identifying application codes that operate on the determined sensitive data by the sensitive data discovery engine, through one or more applications/algorithms;

generating by the sensitive data discovery engine, sensitive data discovery intelligence comprising metadata, results of the determination of the sensitive data, locations of the determined sensitive data, and information of users and programs that access the determined sensitive data by inspecting the identified application codes, through one or more applications/algorithms;

generating one or more templates comprising the sensitive data discovery intelligence and data security rules, through one or more applications/algorithms, by the sensitive data discovery engine for managing the security of the determined sensitive data across the lifecycle of the determined sensitive data;

distributing the generated one or more templates by the sensitive data discovery engine to the data anonymization engine, the data monitoring module, and the data retirement module deployed on the each of the plurality of similar and variant data sources, through one or more applications/algorithms;

flexibly and consistently performing integrating anonymization, through one or more applications/algorithms, by the data anonymization engine, on the determined sensitive data of a plurality of data types accessible by one or more of the applications using the generated one or more templates based on the selected one of the unique data classifications and a nature of an application environment, wherein the integrated anonymization comprises one of masking, encryption, tokenization, and any combination thereof;

continuously monitoring, through one or more applications/algorithms, by the data monitoring module, access of the determined sensitive data by the users and the applications using the generated one or more templates; and determining and retiring inactive sensitive data from the determined sensitive data without removing transactional data therefrom by the data retirement module using the generated one or more templates, through one or more applications/algorithms;

wherein the anonymization of the determined sensitive data is performed by statically masking the determined sensitive data by the data anonymization engine in the locations of the determined sensitive data, incrementally when new sensitive data is introduced in the plurality of similar and variant data sources and the applications, when the determined sensitive data is in transition between the plurality of similar and variant data sources and the applications, and via an application programming interface, and wherein the anonymization of the determined sensitive data is performed by dynamically masking the determined sensitive data by the data anonymization engine at one or more of a database layer, an application layer via a database, an application layer via an application programming interface, and an application layer via a proxy, and wherein the determined sensitive data is dynamically masked based on conditional criteria, and wherein the conditional criteria comprise conditions and users accessing the determined sensitive data, locations of the users, and programs accessing the determined sensitive data, and wherein the anonymization of the determined sensitive data is performed by replacing the determined sensitive data with tokens by the data anonymization engine using one or more of a plurality of tokenizers, wherein the plurality of tokenizers implements a reversible cryptographic tokenization with a vault, a reversible non-cryptographic tokenization, an irreversible cryptographic authenticatable tokenization, an irreversible cryptographic non-authenticable tokenization, an irreversible non-cryptographic authenticatable tokenization, an irreversible non-cryptographic non-authenticatable tokenization, and a reversible cryptographic tokenization without the vault.

12. The computer-implemented method according to claim 11, wherein the plurality of match operations comprises a master data field match operation, a plurality of dictionary match operations, a code match operation, a plurality of pattern match operations, and a plurality of exact data match operations.

13. The computer-implemented method according to claim 11, wherein the generated one or more templates are configured to secure the determined sensitive data across the lifestyle of the determined sensitive data in a pre-determined environment, a production environment, and a non-production environment.

14. The computer-implemented method according to claim 11, wherein the data security rules comprise configuration rules for anonymization, monitoring, and retirement of the determined sensitive data, and wherein the configuration rules for the anonymization of the determined sensitive data comprise anonymization, authorization and monitoring information of the users.

15. The computer-implemented method according to claim 11, wherein the generated one or more templates comprise one or more anonymization templates, one or monitoring templates, and one or more retirement templates.

16. The computer-implemented method according to claim 11, wherein the anonymization of the determined sensitive data is performed by executing blended data masking of the determined sensitive data accessible by a cluster of applications, by the data anonymization engine.

17. The computer-implemented method according to claim 11, wherein the anonymization of the determined sensitive data is performed by executing hybrid data masking of the determined sensitive data accessible by a single application, by the data anonymization engine.

18. The computer-implemented method according to claim 11, wherein the anonymization of the determined sensitive data is performed by encrypting the determined sensitive data of the plurality of data types by the data anonymization engine, while preserving a format of the plurality of data types of the determined sensitive data.

19. The computer-implemented method according to claim 11, further comprises deploying agents on the plurality of similar and variant data sources and the applications by the integrated platform for implementing the sensitive data discovery engine, the data anonymization engine, the data monitoring module, and the data retirement module locally at the plurality of similar and variant data sources and the applications.

* * * * *